United States Patent
Kawakami et al.

(10) Patent No.: US 6,391,492 B1
(45) Date of Patent: *May 21, 2002

(54) SECONDARY BATTERY

(75) Inventors: Soichiro Kawakami; Shinya Mishina; Naoya Kobayashi, all of Nara (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/482,569

(22) Filed: Jun. 7, 1995

Related U.S. Application Data

(62) Division of application No. 08/159,141, filed on Nov. 30, 1993, now Pat. No. 5,824,434.

(30) Foreign Application Priority Data

| Apr. 5, 1992 | (JP) | 5-078342 |
| Nov. 30, 1992 | (JP) | 4-320557 |
| Nov. 30, 1992 | (JP) | 4-320558 |
| Nov. 30, 1992 | (JP) | 4-320559 |
| Nov. 30, 1992 | (JP) | 4-320560 |
| Dec. 24, 1992 | (JP) | 4-344563 |

(51) Int. Cl.$^7$ ............................... H01M 4/02
(52) U.S. Cl. ..................... 429/209; 429/218; 29/623.1
(58) Field of Search ............... 429/209, 215, 429/217, 218, 222; 29/623.1, 623.5; 423/561.1; 252/439

(56) References Cited

U.S. PATENT DOCUMENTS

| 4,071,662 A | 1/1978 | Mead et al. ............... 429/178 |
| 4,323,480 A | * 4/1982 | Dines et al. |
| 4,326,014 A | 4/1982 | Dey ............................ 429/48 |

(List continued on next page.)

FOREIGN PATENT DOCUMENTS

| DE | 2360026 | 6/1975 |
| DE | 3826281 | * 7/1988 |
| DE | 3838329 | 5/1989 |

(List continued on next page.)

OTHER PUBLICATIONS

Shinichi Kikkawa, "New Materials for Advanced Lithium Battery–Especially on Plasma–Assisted CVD of titanium (IV) sulfide"*Mem. Inst. Ind. Res., Osaka Univ.*, 46, pp. 63–70, (Abstract only), 1989.*

V. Joshi, et al. "Microscopy studies of sol–gel derived lithium niobate" Proc. of the synthesis and processing of ceramics p. 459–464. (Abstract) Dec. 1991.*

H. Franke, "Li+ ionic conductivity in LiNbO3", Phys. Status Solidi A v. 83(1), p. K73–K76. (Abstract) Dec. 1991.*

(List continued on next page.)

*Primary Examiner*—Caridad Everhart
(74) *Attorney, Agent, or Firm*—Fitzpatrick, Cella, Harper & Scinto

(57) ABSTRACT

A secondary battery exhibiting a long cycle life and comprising a negative pole activating material made of lithium or zinc is provided, the battery at least having a negative pole made of lithium or zinc serving as the negative pole activating material, an electrolyte (electrolytic solution), a separator, a positive pole made of a positive pole activating material, a collecting electrode and a battery case, wherein at least the surface of the negative pole is covered with a film having a structure which allows ions relating to the battery reactions to pass through. Since growth of dendrites of lithium or zinc at the time of charge can be prevented, short circuiting between the negative pole and the positive pole can be prevented. Therefore, the charge/discharge cycle life can significantly be lengthened. As a result, a lithium secondary battery, a nickel-zinc secondary battery, an air-zinc secondary battery, a bromine-zinc secondary battery and a silver oxide-zinc secondary battery of long cycle life can be manufactured.

26 Claims, 7 Drawing Sheets

U.S. PATENT DOCUMENTS

| | | | |
|---|---|---|---|
| 4,518,397 A | * 5/1985 | Leitheiser et al. | |
| 4,520,084 A | 5/1985 | Tinker et al. | 429/101 |
| 4,567,031 A | 1/1986 | Riley | 423/593 |
| 4,654,281 A | 3/1987 | Anderman et al. | 429/209 |
| 4,677,041 A | 6/1987 | Specht | 429/206 |
| 4,751,157 A | * 6/1988 | Uchiyama et al. | |
| 4,812,375 A | 3/1989 | Foster | 429/101 |
| 4,822,590 A | * 4/1989 | Morrison et al. | 423/561.1 |
| 4,917,976 A | * 4/1990 | Wakihara et al. | 429/218 |
| 5,001,023 A | * 3/1991 | Cheshire et al. | 429/94 |
| 5,110,696 A | * 5/1992 | Shokoohi et al. | 429/218 |
| 5,135,732 A | * 8/1992 | Barboux et al. | |
| 5,147,739 A | 9/1992 | Beard | 429/194 |
| 5,169,736 A | 12/1992 | Bittihn et al. | 429/194 |
| 5,180,574 A | 1/1993 | VonSacken | 423/594 |
| 5,196,281 A | * 3/1993 | Pensabene et al. | 429/211 |
| 5,264,201 A | * 11/1993 | Dahn et al. | |
| 5,310,553 A | 5/1994 | Simon et al. | 429/212 |
| 5,328,782 A | 7/1994 | Binder et al. | 429/101 |
| 5,354,631 A | 10/1994 | Chaloner-Gill et al. | 429/137 |
| 5,370,950 A | 12/1994 | Kageyana | 429/232 |

FOREIGN PATENT DOCUMENTS

| | | | |
|---|---|---|---|
| DE | 38 26 281 | | 2/1990 |
| EP | 0130049 | | 1/1985 |
| EP | 0195684 | | 9/1986 |
| EP | 0 394 917 | | 10/1990 |
| EP | 0517070 | | 12/1992 |
| EP | 0 571 858 | | 12/1993 |
| GB | 2024500 | | 1/1980 |
| GB | 2070847 | | 9/1981 |
| JP | 55-16342 | * | 2/1980 |
| JP | 61-295235 | * | 12/1986 |
| JP | 02-148653 | * | 6/1990 |
| WO | 84/02333 | | 6/1984 |

OTHER PUBLICATIONS

Joshi, V., et al. "Microscopy studies of sol–gel derived lithium niobate", Proc. of the synthesis and processing of ceramics scientific issues. Material Research Society Symposium. vol. 249. Dec. 1991 p. 459–464.*

Franke, H., "Li ionic conductivity in LiNbO3", Phys. Status Solidi A V. 83 (1), pp. K73–K76, May 1984.*

Chem. Abstracts, vol. 111, No. 16, Oct. 16, 1989, ab. No. 137458.

Chem. Abstracts, vol. 104, No. 22, Jun. 2, 1986, ab. No. 189696.

E.J. Plichta, "The Rechargeable $Li_xTiS_2/LiAlCl_4/Li_{1-x}CoO_2$ Solid–State Cell", J.Electrochem. Soc., vol. 139, No. 6, Jun. 1, 1992, pp. 1509–1513.

Database WPI, Section Ch, Week 8706, AN 87–039672 (corresponding to JP 61–295235).

Patent Abstracts of Japan, vol. 11, No. 167 (C–425), May 28, 1987 (corresponding to JP 61–295235).

Database WPI, Section Ch, Week 8202, AN 82–02774E (corresponding to JP 56–149771).

Patent Abstracts of Japan, vol. 6, No. 28 (E–095), Feb. 19, 1982 (corresponding to JP 56–149771).

R. Moshtev, "Vanadium–doped lithium thiochromite: properties, crystal structure and electrochemical performance in rechargeable Li cells", J. Power Sources, vol. 34, No. 2, Mar. 1, 1991, pp. 129–139.

Chem. Abstracts, vol. 111, No. 14, Oct. 2, 1989, ab. No. 122659.

J.J. Auborn, "Lithium Intercalation Cells Without Metallic Lithium", J. Electrochem. Soc., vol. 134, No. 3, Mar. 1987, pp. 638–641.

Chem. Abstracts, vol. 116, No. 26, Abst. No. 259054, Jun. 29, 1992.

Chem. Abstracts, vol. 110, No. 14, Abst. No. 118 380, Apr. 3, 1989.

Chem. Abstracts, vol. 107, No. 12, Abst. 99798, Sep. 21, 1987.

Chem. Abstracts, vol. 116, No. 20, Abst. 197706c, May 18, 1992.

Chem. Abstracts, vol. 116, No. 22, Abst. 218168w, Jun. 1, 1992.

Chem. Abstracts, vol. 118, No. 2, Abst. 9423c, Jan. 11, 1993.

Chem. Abstracts, vol. 116, No. 12, Abst. 110107m, Mar. 23, 1992.

Patent Abstracts of Japan, vol. 8, No. 39 (E–228), Feb. 1984.

Patent Abstracts of Japan, vol. 13, No. 147 (E–741), Apr. 1989.

Patent Abstracts of Japan, vol. 6, No. 147 (E–123), Aug. 1982.

Patent Abstracts of Japan, vol. 5, No. 55 (E–052), Apr. 1981.

Patent Abstracts of Japan, vol. 7, No. 288, (E–218), Dec. 1983.

Patent Abstracts of Japan, vol. 7, No. 258 (E–211) (1403), Nov. 1983.

J. Electrochem. Soc., vol. 134, No. 11, pp. 2650–2656, Nov. 1987, Thevenin et al, "Study of the Li/Li3N electrode in an Organic Electrolyte".

* cited by examiner

SECONDARY BATTERY

This application is a division of application Ser. No. 08/159,141 filed Nov. 30, 1993 U.S. Pat. No. 5,824,434.

BACKGROUND OF THE INVENTION

1. Field of the Invention

The present invention relates to a secondary battery which can repeatedly be used. More particularly, this invention relates to a reliable secondary battery capable of preventing-short circuits due to dendrite growth, even when the battery is repeatedly charged and discharged.

2. Related Background Art

Since global warming is expected due to the greenhouse effect caused by an increase in $CO_2$ and so forth, the construction of thermal power plants has become problematic. Accordingly, it has been considered feasible to perform so-called load levelling for the purpose of effectively using generators by accumulating electric power at night in secondary batteries at homes to level the load.

Another desire has arisen to develop a secondary battery which exhibits a high energy density for use in an electric car that does not exhaust air contamination substances. Further, development of a high performance secondary battery has been needed for use as a power source for portable equipment, such as book-type personal computers, word processors, video cameras and portable telephones.

A locking chair type lithium ion battery capable of serving as the foregoing high performance secondary battery and comprising a positive pole activating material comprising lithium ions introduced into an interlayer compound thereof and a negative pole activating material comprising carbon has been developed and partially put into practical use.

However the lithium ion battery has not achieved the high energy density that is the original characteristic of the lithium battery which uses the metal lithium as the negative pole activating material. The reason why a large capacity lithium accumulator of the type that uses lithium metal as the negative pole has not been put into practical use is that the generation of dendrites of lithium (tree branch-like crystals), which are the main cause of short circuiting, cannot be prevented.

The lithium battery, nickel-zinc battery and the air-zinc battery are problematic in that lithium or zinc is, as described above, deposited on the surface of the negative pole at the time of charge. At this time, the current density is locally raised on the negative pole surface depending upon the surface condition, causing lithium or zinc to be selectively deposited in the foregoing place. The deposited metal grows (dendrites) in the form of tree branches upon charging and discharging, while penetrating the separator until it reaches the positive pole, causing a short circuit.

The dendrite reaction mechanism is considered as follows. Since lithium or zinc that deposits at the time of charge has a considerable reactivity, it reacts with electrolytic solution or water or the like in the electrolytic solution, causing an insulating film to be formed which has a large resistance. Therefore, the current density in the foregoing portion is raised at the time of the next charge, resulting in easy dendrite growth. It leads to a short circuit between the negative pole and the positive pole, resulting in that charging cannot be performed.

If the short circuit is extensive, the energy of the battery will be consumed in a very short time, causing the generation of heat. As a result, the solvent of the electrolytic solution can be decomposed, resulting in the generation of gas. When gas is generated, the internal pressure is raised. In the worst, an accidental exposure or fire can be generated. Therefore, there has been a desire for a long life lithium accumulator that does not easily cause internal short circuit even if the charge and discharge cycles are repeated.

Also nickel-zinc batteries and air-zinc batteries generate dendrites of zinc due to repetition of charging and discharging, with the dendrites penetrating the separator. As a result, the zinc negative pole and the positive pole exhibit a short circuit. Therefore, the foregoing conventional technology suffers from an excessively short cycle life.

SUMMARY OF THE INVENTION

An object of the present invention is to provide a lithium, lithium alloy, zinc or zinc alloy secondary battery capable of overcoming the foregoing problems associated with the conventional secondary batteries and exhibiting a long cycle life.

In order to overcome the foregoing problems of the conventional technology, the inventors of the present invention have made energetic studies. As a result, it was found that generation of dendrites of lithium or zinc can be prevented by forming a film permitting ions relating to battery reactions to pass through on the surface of the negative pole.

The present invention is characterized in that a secondary battery comprises a negative pole made of a negative pole activating material, a separator, a positive pole made of a positive pole activating material, an electrolyte (electrolytic solution), a collecting electrode and a battery case, wherein the surface of the negative pole is covered with a film permitting ions relating to battery reactions to pass through.

The material of the film has a molecular structure or small apertures which do not permit the negative pole activating material which precipitates on the negative pole, but which permit ions relating to the battery reactions, to pass through.

The present invention is characterized in that the foregoing material of the film has been electron donative elements or groups for enabling the ions relating to the battery reactions to be easily conducted in the film.

The electron donative element is exemplified by oxygen atoms, nitrogen atoms, sulfur atoms and transition metal atoms, respectively, having a paired electron, a non-paired electron or electron d (electrons in the d quantum shell). The electron donative group is exemplified by a ring compound and a compound having a carbon double bond having electron π (π electron resonance) or an aromatic ring.

The film formed on the surface of the negative pole according to the present invention is characterized in that it cannot be dissolved by the electrolyte.

The inventor of the present invention found that treatment of the surface of the negative pole with a nitrogen compound or a halogen compound, which is active in a gas phase, will prevent the generation of lithium dendrites.

According to the present invention, there is provided a secondary battery having a negative pole activating material composed of lithium, a separator, a positive pole activating material, an electrolyte, a collector and a battery case, wherein at least the surface of the lithium negative pole opposing the positive pole is treated with a reactive and gaseous material containing nitrogen or a halogen element.

According to the present invention, there is provided a battery comprising a negative pole, a separator, a positive pole and an electrolyte, wherein one or more layers selected from a group consisting of a conductor layer, a semiconductor layer and an insulating layer are formed between the negative pole and the separator.

If the negative pole activating material is lithium or lithium alloy, the foregoing layer is formed into a micropore structure having small apertures permitting at least lithium ions to pass through. If zinc or zinc alloy is used, the small apertures permit hydride ions to pass through.

The small apertures permitting ions to pass through may be realized by the molecular structure of the material or by a manufacturing method. The small apertures can be easily formed by, for example, injecting an electrolyte into the foregoing layer at the time of forming the layer to manufacture the battery, the electrolyte being eluted to form the micropores. Another method may be employed in which a foaming material is added at the time of forming the foregoing layer, with the micropores being formed by heat treatment or the like.

The structure of the stacked layers may be a single layer or a multi-layer composed of two or more layers or composed of a conductor layer, a semiconductor layer, an insulating layer and a composite layer containing two or more types of elements or compounds.

Further, it was found that a separator partially including a film-shaped member (hereinafter sometimes called a "metal oxide film") of a metal oxide formed by a mold made of a bimolecular film forming compound is able to prevent short circuits in the battery from occurring between the negative pole and the positive pole, even when dendrites are generated in the negative pole.

According to the present invention, there is provided a secondary battery comprising a negative pole made of a negative pole activating material, a positive pole made of a positive pole activating material and a separator which separates the positive pole activating material and the negative pole activating material from each other, wherein at least a multi-layer metal oxide is present between the positive pole and the negative pole.

Also it was found that an arrangement wherein the surface of the positive pole is covered with a thin film made of an insulating material or a semiconductor which is free from electron conduction and which permits ions relating to battery reactions to pass through will prevent short circuits in the battery between the negative pole and the positive pole, even when dendrites are generated in the negative pole.

According to the present invention, there is provided a secondary battery at least comprising a negative pole, a separator, a positive pole, an electrolyte, a collector and a battery case, wherein at least the surface of the positive pole opposing the negative pole is covered with one or more thin film layers selected from a group consisting of an insulating layer, a semiconductor layer, a layer composed of an insulating material and a semiconductor which permit ions relating to the battery reactions to pass through.

Also it was found that the use of a positive pole activating material 13104 of a lithium secondary battery made of a compound of one or more types of transition metals having a crystal grain size of 500 Å or less enables high capacity, large energy and long cycle life to be realized. The secondary battery of the foregoing type has a cross sectional shape schematically shown in FIG. 13. The same reference numerals as those shown in FIG. 1 represent the same structures.

According to the present invention, there is provided a lithium secondary battery at least comprising a negative pole activating material, a separator, a positive pole activating material through which ions can be introduced/discharged due to charge/discharge, an electrolyte which is an ion conductor, a collecting electrode and a battery case, wherein the main component of the positive pole activating material 13104 is a compound of one or more types of transition metal and a group VIA element and having a crystal grain size of 500 Å or less.

The main component material of the positive pole activating material has a structure of an aggregate selected from a group consisting of amorphous, microcrystal, a mixture of amorphous, microcrystal and a mixture of amorphous, microcrystal and multi-crystal.

The arrangement wherein the positive pole activating material of the lithium secondary battery is made of a compound of the transition metal having a structure of the aggregate selected from a group consisting of amorphous, microcrystal, a mixture of amorphous and a microcrystal and a mixture of an amorphous, a microcrystal and a multi-crystal, and the group VIA element and having a crystal grain size of 500 Å or less, more preferably 200 Å, enables the following effects to be obtained:

(1) Since the reactive area of the positive pole activating material can be enlarged, the electrochemical reactions at the time of charge and discharge can be made smooth, and therefore the chargeable capacity can be enlarged.

(2) The introduction and the discharge of lithium ions at the time of the charge and the discharge prevent the distortion of the positive pole activating material, causing the cycle life to be lengthened.

It is preferable that the specific area of the positive pole activating material mainly composed of the compound of the transition metal and the group VIA element be 50 $m^2/g$ or more in a state before the material is formed into the positive pole, more preferably 100 $m^2/g$ or more.

The employment of the compound of the transition metal and the group VIA element containing hydrogen will improve the charge and discharge cycle characteristics.

By subjecting the positive pole activating material to a lipophilic treatment using an organic metal compound, the solid-liquid reactions between the electrolyte and the positive pole activating material can be made further smooth at the time of charge and discharge.

The compound of the transition metal and the group VIA element is exemplified by a metal oxide such as a nickel oxide, a cobalt oxide, a titanium oxide, an iron oxide, a vanadium oxide, a manganese oxide, a molybdenum oxide, a chrome oxide or a tungsten oxide, a metal sulfide such as a molybdenum sulfide, an iron sulfide or a titanium sulfide, a hydride such as an oxy iron hydride or their mixtures.

By employment of metal lithium having a film through which lithium ions are able to pass to form the negative pole activating material of the secondary battery, a lithium secondary battery exhibiting a long life and a high energy density can be obtained.

According to the present invention, there is provided a method of manufacturing a positive pole activating material of a lithium secondary battery at least comprising the step of forming a compound of a transition metal and a group VIA element, the raw material of which is one or more types of materials selected from a group consisting of the transition metal, the salt of the transition metal, an organic metal compound of the transition metal, a hydride of the transition metal, a transition metal oxide, a carbonyl compound of a transition metal and a transition metal oxide and which has a structure of an aggregate having a crystal grain size of 500 Å or less, more preferably 200 Å or less and selected from a group consisting of amorphous, microcrystal, a mixture of amorphous and microcrystal and a mixture of amorphous, microcrystal and multi-crystal.

According to the present invention, there is provided a method of manufacturing a positive pole activating material which is a compound of a transition metal and a group VIA element, the method comprising the steps of:

employing one or more types of reactions selected from a group consisting of a reaction between a salt of the transition metal and alkali, a hydrolysis decomposition reaction of an organic transition metal compound and a reaction between the transition metal and alkali to prepare a hydride of the transition metal;

employing a dehydrating reaction or decomposition of the salt of the transition metal or the organic transition metal compound in a gas phase or a reaction between the salt of the transition metal or the decomposed material of the organic transition metal compound or vapor of the transition metal and the group VIA element or the group VIA compound;

melting one or more types of materials selected from a group consisting of the transition metal and the transition metal compound to be allowed to react with one or more types of materials selected from a group consisting of the group VIA element and the compound of the group VIA element; and rapidly cooling the materials to form an aggregate having a crystal grain size of 500 Å or less and formed into a structure selected from a group consisting of amorphous, microcrystal, a mixture of amorphous and microcrystal and a mixture of amorphous, microcrystal and multi-crystal.

DETAILED DESCRIPTION OF THE PREFERRED EMBODIMENTS

Structure of Battery

As used herein, the terms "positive pole" or "negative pole" are identical to "positive electrode" or "negative electrode", respectively; the phrase "activating material" is used interchangeably with "active material" and the phrases "electrolytic solution" or "electrolytic liquid" are used interchangeably with "electrolyte solution" or "electrolyte liquid", respectively.

Figure 1:
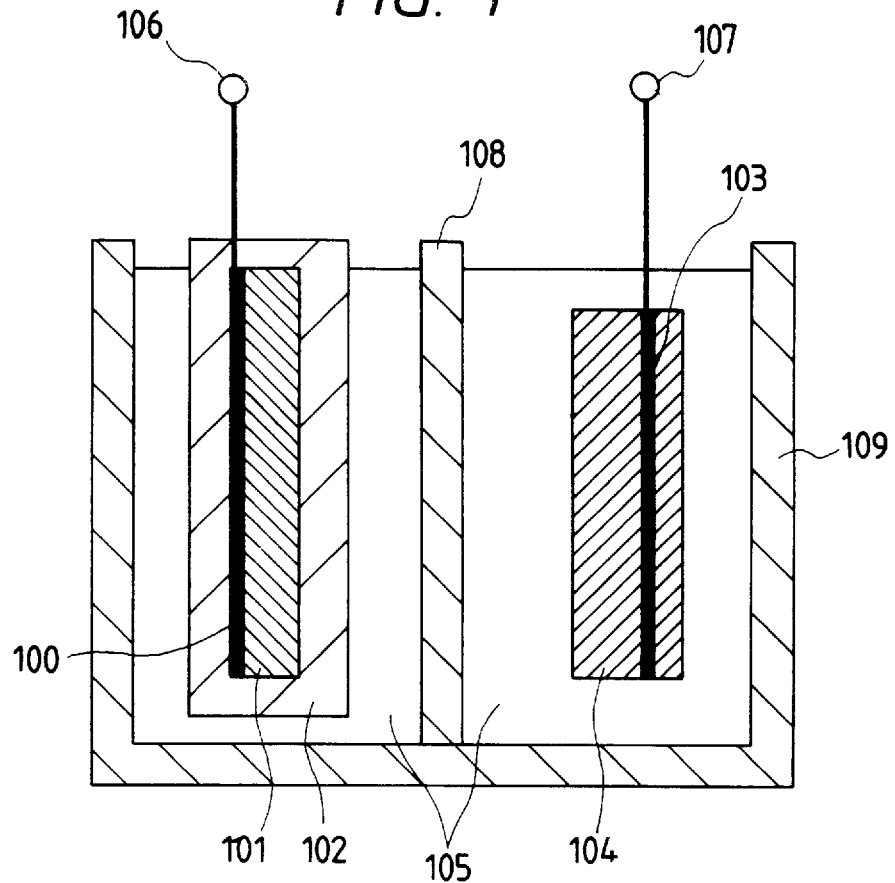
FIG. 1 is a basic structural view which illustrates a secondary battery according to the present invention.
Figure 5:
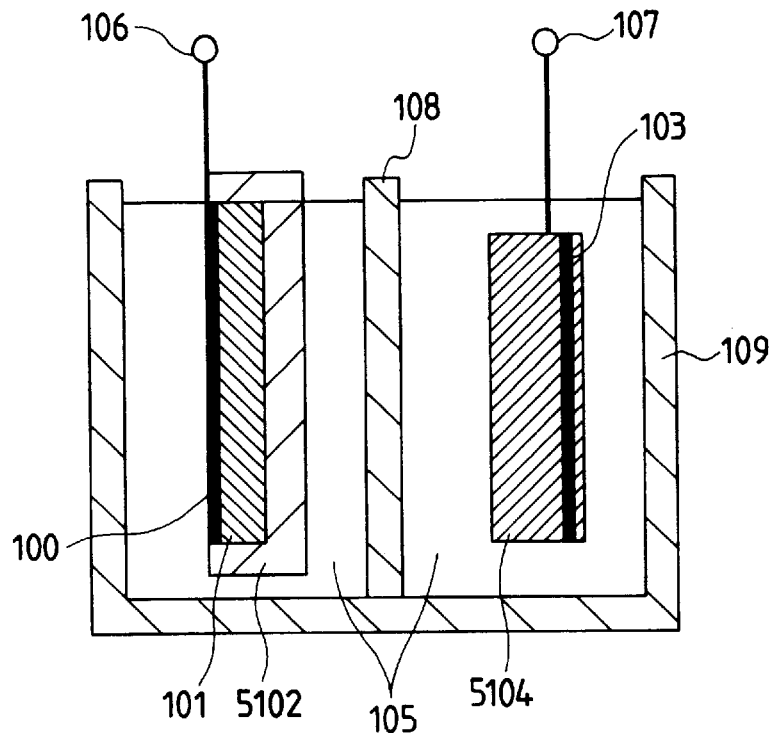
FIG. 5 is a basic structural view which illustrates another embodiment of the secondary battery according to the present invention.
Figure 10:
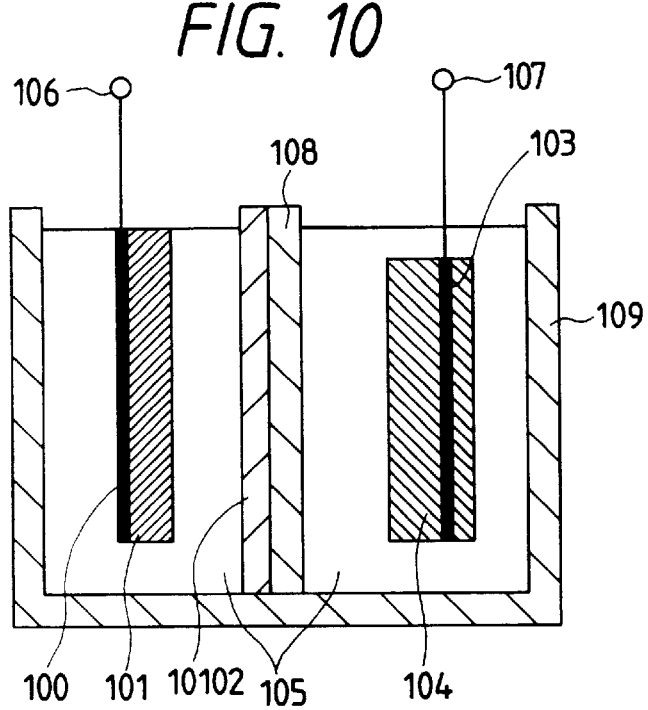
FIG. 10 is another basic structural view which illustrates the secondary battery according to the present invention.
Figure 11:
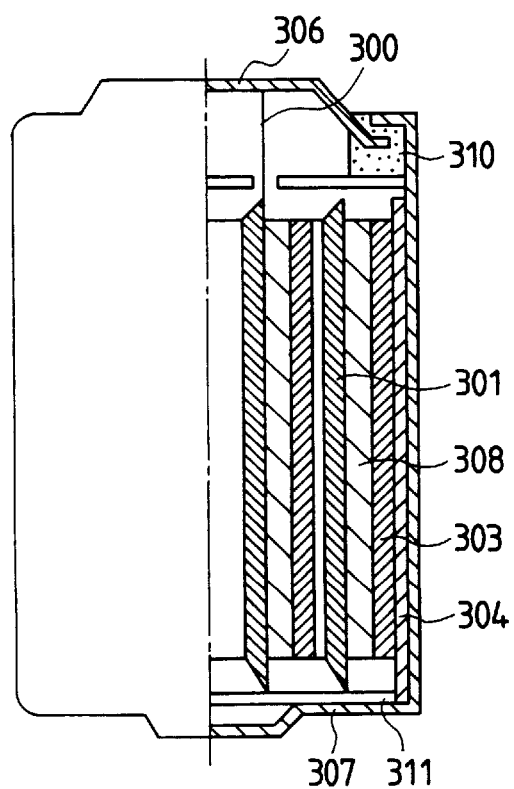
FIG. 11 is a schematic cross-sectional view which illustrates another cylindrical battery to which the present invention is applied.
Figure 12:
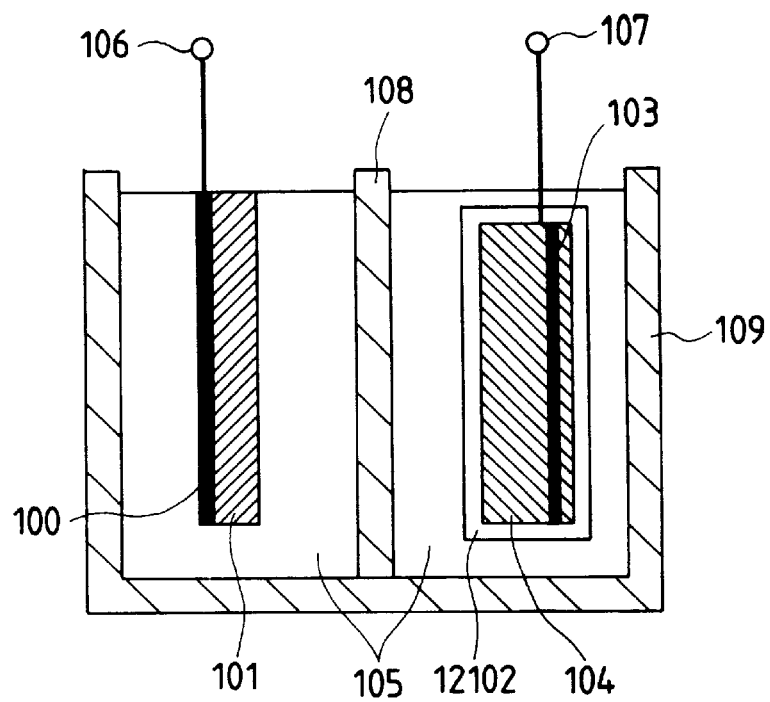
FIG. 12 is another basic structural view which illustrates the secondary battery according to the present invention.
Figure 13:
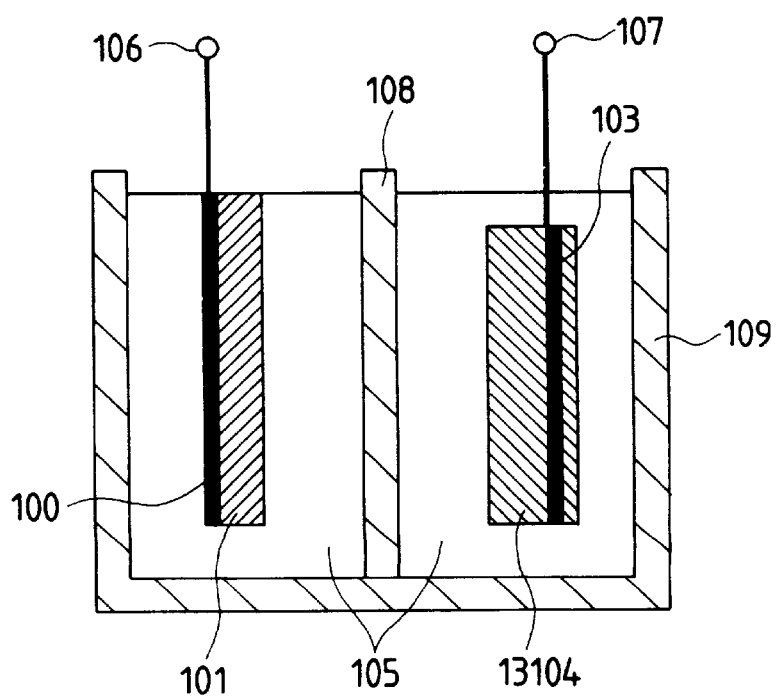
FIG. 13 is another basic structural view which illustrates the secondary battery according to the present invention.

A secondary battery according to the present invention comprises a negative pole, a separator, a positive pole, an electrolyte and a collector. FIG. 1 is a basic structural view which illustrates the secondary battery. Referring to FIG. 1, reference numeral 100 represents a negative collector, 101 represents a negative pole substantially made of negative pole activating material, 102 represents a film, 103 represents a positive collector, 104 represents a positive pole substantially made of positive pole activating material, 105 represents an electrolytic solution (electrolyte), 106 represents a negative terminal, 107 represents a positive terminal, 109 represents a case for the secondary battery, and 108 represents a separator. FIGS. 5, 10 and 12 illustrate another basic structure in which a multi-layer oxide film 10102, an ion permeable film 12102 and a layer 5102 applied with lithium surface treatment in place of the film 102. If the lithium battery comprises the negative pole 101 made of the negative active material which is lithium or lithium alloy, lithium ions in the electrolytic solution 105 are introduced into the space between the layers of the positive pole activating material of the positive pole 104 through the permeable film due to the discharge reaction in a case of the structure shown in FIG. 12. Simultaneously, lithium ions are dissolved and discharged from the negative pole activating material 101 into the electrolyte 105 through the film 102 and the multi-layer metal oxide 10102. In the charging reaction, lithium ions in the electrolyte solution 105 are, in the form of lithium metal, precipitated into the negative pole activating material through the film 102 (dendrites can easily grow if the film 102 is not present). Simultaneously, lithium between the layers of the positive pole activating material 104 is dissolved and discharged into the electrolytic solution 105. Although lithium ions precipitated during the charging reaction are in a very active state to react with a small quantity of water, oxygen, impurities or solvent contained in the electrolyte, the structure in which the surface of the negative pole 101 is covered with the film 102 prevents direct contact between the precipitated lithium and the electrolytic solution. Therefore, the generation of dendrites, which causes battery short circuit to occur, can be prevented.

In the case of an alkali battery comprising the negative pole activating material 101 made of zinc or zinc alloy, the discharge reaction takes place in such a manner that hydroxyl ions in the electrolytic solution 105, similarly to the above, react with the negative pole activating material 101 of the negative pole 101 through the film 102. Simultaneously, hydroxyl ions are discharged into the electrolytic solution 105 from the positive pole activating material of the positive pole 104. The charging reaction is performed in such a manner that hydroxyl ions are discharged from the negative pole 101 into the electrolytic solution 105 through the film 102 (if the film 102 is not present at this time, zinc ions in the electrolytic solution 105 easily cause dendrites to grow on the negative pole). Simultaneously, hydroxyl ions in the electrolytic solution 105 react with the positive pole 104. Similarly-to the case where the negative pole activating material is lithium, the presence of the film 102 prevents generation of zinc dendrites at the time of charging.

Therefore the present invention is able to prevent short circuits in the battery, lengthen the life of the secondary battery and improve safety.

If the foregoing negative pole activating material is lithium or lithium alloy, lithium ions are used in the reactions in the battery. In the case of the alkali battery containing zinc as the negative pole activating material, hydroxyl ions are used in the reactions. The batteries comprising zinc as the negative pole activating material is typified by nickel-zinc battery, air-zinc battery and bromine-zinc battery (however, the bromine-zinc battery comprises zinc ion as the negative side ion that is used in the inside reactions).

Method of Forming Negative Pole

The negative pole can be formed by any one of the following methods as well as the method for forming the same by directly covering the surface of the negative pole activating material with a coating material by a dipping method, a spraying method or a CVD method.

It is effective to employ a method in which a conductive and porous matrix (the base), for example, a sponge-like or fibrous metal or carbon having communication holes, is covered with a coating material through which ions for use in the reactions in the battery can be passed through, and then lithium or zinc, which is the negative pole activating material, is caused to electro-deposit so that the negative pole is formed. If a porous and conductive matrix has a wide specific area, the current density per unit area at the time of charge and discharge can be lowered. Therefore, the growth of dendrites can be prevented and accordingly the charging/discharging efficiency can be improved.

It is preferable that the film made of a coating material, through which ions can pass, wherein small apertures serve as the spaces, in which the lithium can be deposited, be formed into a 3D net shape.

Another effective method may be employed which includes steps of directly immersing a porous and conductive matrix in the melted negative pole activating material, taking out the matrix, covering the surface of the conductive matrix with the negative active material or electrochemically covering the same with the negative pole activating material, and applying a coating material through which ions for use in the reactions in the battery can be passed to the surface.

Figure 4:
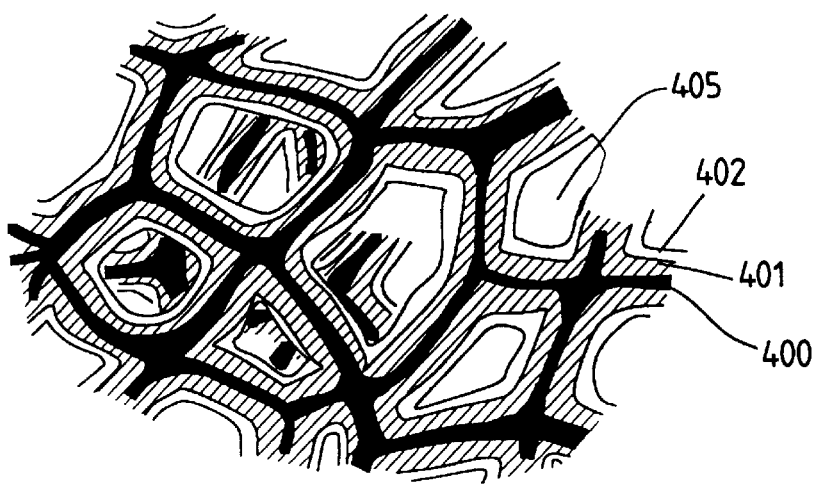
FIG. 4 is a schematic view which illustrates an example of a partial structure of a negative pole covered with a film through which ions relating to battery reactions are able to pass.

FIG. 4 is a schematic view which illustrates a partial structure of a negative pole formed by covering a conductive matrix 400 with a negative pole activating material 401 and a coating material 402 through which ions for use in the reactions in the battery can be passed.

Material for Covering the Surface of Negative Pole

The coating material for-covering the surface of the negative pole will now be described (1 to 7).

1. Film Having an Inorganic Glass Structure

By covering the surface of the negative pole activating material with a film having an inorganic glass structure, through which ions for use in the reactions in the battery can be passed, the reactions between lithium and water or oxygen can be prevented, causing ease in handling if the negative pole activating material is lithium. Further, the direct contact between the lithium and the electrolytic solution does not take place. Therefore, the growth of the polymer film formed from the solvent of the electrolytic solution on the surface of lithium can be prevented. If the negative active material is zinc, the elution of zinc into the electrolytic solution can be prevented. As a result, formation of dendrites can be prevented and therefore the cycle life against charge and discharge can be lengthened. Since the film having the inorganic glass structure is flame retardant or incombustible, safety in emergency breakage or the like can be improved. The foregoing inorganic glass may be made of any metal oxide selected from the group consisting of silica, titanium oxide, alumina, zirconia oxide, magnesium oxide, tantalum oxide, molybdenum oxide, tungsten oxide, tin oxide, indium oxide, iron oxide, chrome oxide, aluminum phosphate, iron phosphate, silicon phosphate and their mixtures. In particular, it is preferable to employ silica, titanium oxide, alumina, zirconia oxide or aluminum phosphate.

A sol-gel method is one adequate method for forming the inorganic glass. However, due to the low melting point (181° C.) of lithium, the foregoing material must be directly applied to the surface of lithium at low temperature. Since lithium reacts with water and alcohol, the operation must be performed such that no water and alcohol is present (the case in which the inorganic glass is previously applied to the conductive matrix or the case where the negative pole activating material is zinc are excluded).

Therefore, the sol-gel methods which is the typical inorganic coating method at low temperature, must be performed with any particular means. The raw material for the material having the inorganic glass structure is obtained in such a manner that an acid or a base and water are added to a solution of alcohol of an organic metal compound such as a metal alkoxide to hydrolyze the raw material so as to form colloid particles having metal atom-oxygen atom bonds, and then the solvent is substituted by a non-hydric solvent except alcohol.

The surface coating of the negative pole activating material is formed in a manner comprising steps of directly applying the foregoing colloid solution, or applying a solution, in which a monomer or an organic polymer or both organic polymer and a crosslinking material are dissolved in the colloid solution, and polymerizing it or drying and hardening it. By combining the organic polymers, strength against cracks and separations can be improved. If the electrolyte for forming the battery is dissolved in the colloid solution to form the film, wettability with the electrolytic solution can be improved, causing ions to be moved easily.

As an alternative to alkoxide, any one of the following organic metal compounds may be employed: acetyl acetone salt, an alkyl metal compound, acetyl acetone metal salt, naphthalene acid metal salt, and octyl acid metal salt.

The organic polymer for combining the organic polymers is exemplified by epoxy resin, polyester, polyimide, polyethylene, polypropylene, polyurethane, polystyrene, polyethylene glycol, nylon, fluorine resin and silicon resin.

The polymer crosslinking material is exemplified by diisocyanate, polyisocyanate prepolymer, block isocyanate, organic peroxide, polyamine, oximes, nitroso compound, sulfur or sulfur compound, selenium, magnesium oxide, lead oxide and zinc oxide. As an alternative to using the crosslinking material, a method may be employed in which radial rays or, electron rays or ultraviolet rays are applied to polymerize or crosslink the polymer.

As an application method, a dipping method, screen printing, spraying or a roll coating method may be employed. The viscosity of the liquid to be applied must adequately be adjusted to be adaptable to the application method.

In order to facilitate the movement of the charge at the time of the charging operation, powder or fiber Dr whisker of conductive material such as carbon or titanium may be mixed with the foregoing film forming solution.

It is preferable that the thickness of the film to be formed on the surface of the negative pole activating material ranges from 50 Å to 100 $\mu$, further preferably ranges from 100 Å to 10 $\mu$. The optimum thickness of the film differs depending upon the density or the porosity of the film and considerably differs depending upon the type of the electrolytic solution.

The thickness of the film can be adjusted by hanging the concentration of the main material in the coating liquid for forming the film.

2. Polymer Film of Derivative of Aromatic Hydrocarbon Compound

By covering the surface of the negative pole activating material with a polymer film of a derivative of an aromatic hydrocarbon compound, the reaction between lithium and water or oxygen can be prevented in the case where the negative pole activating material is lithium. Handling can be facilitated in this way. Further, the contact between lithium and electrolytic solution can be prevented. Therefore, the growth of a polymer film, which is formed from the solvent of the electrolytic solution, on the surface of lithium can be prevented. If the negative pole activating material is zinc, elution of zinc into the electrolytic solution is prevented by the film.

As a result, formation of dendrites can be prevented and therefore the life against the charge and discharge cycle can be lengthened. The derivative of the aromatic hydrocarbon for forming the charge moving complex with lithium is one or more derivatives selected from the group consisting of naphthalene, anthracene, phenanthrene, naphthalene, pyrene, triphenylene, perylene, picene, benzopyrene, coronene and ovalene. The polymer for use to form the coating material can be prepared by polymerization or copolymerization of vinyl monomer, monomer of acetylene derivative or dicarboxylic acid and a monomer such as glycol. The polymerization of the vinyl monomer can be performed by radical or ion polymerization. The monomer of the acetylene derivative can be polymerized while using a chloride of tungsten as a catalyzer. The dicarboxylic acid and diamine can be polycondensed and the dicarboxylic acid and glycol can be polycondensed as well. The monomer of the aromatic derivative for forming the polymer is exemplified by 2-vinyl naphthalene, 2-vinyl pyridine, 9-vinyl anthracene, 9,10-anthracene dipropionic acid, 9,10-bis (phenyl ethyl) anthracene and 5,12-bis (phenyl ethynyl) naphthalene. It is preferable to use 2-vinyl naphthalene or 9-vinyl anthracene.

A starting material for the radical polymerization is exemplified by azobisisobutyronitrile (AIBN), benzoylperoxide (BPO) and t-butylhydroperoxide. A starting material for the cation polymerization is exemplified by an acid such as $H_2SO_4$, $H_3PO_4$, $HClO_4$, $CCl_3$, or $CO_2H$ and a Friedel-Craft catalyst such as $BF_3$, $AlCl_3$, $TiCl_4$ or $SnCl_4$. A large ring compound having an aromatic ring can be polymerized by dehydrogenation in which the Friedel-Craft catalyzer and an oxidizer are combined with each other. A starting material for the anion polymerization may be an alkaline metal compound or an organic metal compound.

As an alternative to the foregoing method, a polymer into which an aromatic group can be substituted can be obtained by subjecting the side chain of each polymer to a substitution reaction with a derivative of an aromatic compound. Another method may be employed in which an electrolytic polymerization reaction performed in an electrolytic solution containing a monomer mixed therein to form directly a polymer of an aromatic compound on the surface of lithium.

When the surface of lithium is coated using the foregoing polymer solution, it is referable to use a polymer solution dehydrated and deoxidized sufficiently in inactive gas. It is preferable to use a solvent in the foregoing solution which has been dehydrated with active alumina, molecular sieve, phosphorus pentaoxide or calcium chloride. As an alternative to this, it is preferable, depending upon the type of solvent, that the solvent be distilled in the presence of alkaline metal in inactive gas to remove impurities and be dehydrated (however, the necessity of strictly controlling water can be eliminated when the polymer is previously applied to the conductive matrix or when the negative pole activating material is zinc).

An electrolyte may previously be mixed when the foregoing film is formed. Wettability between the electrolytic solution and the film can be improved in this way, causing ions to easily pass through the film. In order to facilitate the transfer of the charge at the time of charging, conductive powder, such as carbon or titanium, fiber or whisker may be mixed at the time of forming the film.

Since the performance of the battery deteriorates if the polymer coating firm is dissolved in an organic solvent of the electrolyte, it is preferable to be crosslinked in such a manner, for example ultraviolet rays, electron rays or radial rays are applied or a crosslinking material, such as a radical generating agent, is used.

It is preferable that the thickness of the film to formed on the surface of the negative pole activating material ranges from 50 Å to 100 $\mu$, and more preferably ranges from 100 Å to 10 $\mu$.

The optimum thickness of the film differs depending upon the density or the porosity of the film and considerably differs depending upon the type of the electrolytic solution. The thickness of the film can be adjusted by changing the concentration of the main material in the coating liquid for forming the film.

Organic Metal Compound

When the surface of lithium and an organic metal compound react with each other, bonding with lithium atoms takes place so that a film having a surface which is organic-bonded is formed. As a result, the wettability (the lipophilic property) is improved, causing lithium ions to be easily introduced/discharged at the time of the charge and discharge. Further, the surface coating film prevents direct contact between lithium and the organic solvent, and therefore the formation of a polymerized film of the organic solvent, which increases the resistance of the battery, can be prevented. As a result, formation of dendrites can be prevented, and therefore life against the charge and discharge cycle can be lengthened. Further, reactions between lithium and water during the manufacturing process can be prevented and accordingly handling can be made easier. If the content of lithium Ln the film is high in the lithium battery according to the present invention, rapid reactions of lithium at an emergency breakage can be prevented.

The foregoing organic metal compound may be a material selected from the group consisting of: metal alkoxide alkaline metal compound, acetyl acetone metal salt, naphthene acid metal salt, or octyl acid metal alt of metal, such as titanium, aluminum, silicon, zirconium, tantalum, magnesium, indium, tin, molybdenum, tungsten or germanium. Among the foregoing organic metal compounds, it is preferable to use a metal compound of silicon or titanium or aluminum due to ease of film formation and excellent stability of the formed film.

The organic silicon compound may be alkoxysilane, alkylsilane, halogenated silane, siloxane, silane containing vinyl group, amino group, epoxy group, methacrylic group or mercaptal group introduced thereto, hydrogen-denatured, vinyl-denatured, hydroxyl group denatured, amino denatured, carboxylic group denatured, chloro-denatured, epoxy denatured, methacryloxy-denatured, mercapto-denatured, fluorine denatured, long-chain alkyl denatured or phenyl denatured polysiloxane, alkylene oxide denatured siloxane copolymer, silicon-denatured copolymer, alkoxysilane-denatured polymer, silicon-denatured urethane or silicon-denatured nylon.

The organic titanium compound may be alkoxytitanium, titanium chelate, titanium acrylate or titanium polymer.

The organic aluminum compound may be alkoxyaluminum, alkylaluminum or a halogenated aluminum.

The organic silicon-titanium compound may be a tyranopolymer of a silicon polymer crosslinked to the main chain of a polycarbosilane skeleton with a titanium compound.

Also a material prepared by introducing a derivative of an organic metal compound into a polymer by substitution may be used as the coating material.

The film may be formed by directly applying the organic.compound or by applying it after diluting with a solvent if the organic compound is in the form of liquid. If the organic compound is in the form of a solid, a solution in an appropriate solvent can be applied. The organic compound may be applied by dipping, screen printing, spraying or roll coating. The viscosity of the foregoing coating liquid must adequately be adjusted to be suitable for the employed, coating method.

By mixing the organic metal compound at the time of forming the film, the wettability of the electrolytic solution can be improved and accordingly ions can easily be introduced/discharged at the time of the charge and discharge. Further, the transfer of the charge can be made easier at the time of the battery charge by mixing powder or fiber or whisker of conductive material such as carbon or titanium at the time of applying the organic metal compound.

It is preferable that the thickness of the film to be formed on lithium ranges from 50 Å to 100 $\mu$, and more preferably from 100 $\mu$ to 10 $\mu$. The optimum thickness of the film differs depending upon the density or the porosity of the film and considerably differs depending upon the type of the electrolytic solution. The thickness of the film can be adjusted by changing the concentration of the main material in the coating liquid for forming the film. 4.
Fluororesin Coating Material By using fluorine resin of a type having an ether bond to cover the surface of lithium, the surface coating process can be completed easily and the contact between lithium and the film can be improved.

The presence of oxygen atoms in the fluorine resin having the ether bond makes easier the coordination of lithium ions, enabling lithium ions to be moved easily in the fluorine resin.

Further, the surface coating film prevents direct contact between the lithium metal and the organic solvent, and therefore the formation of a polymerized film of the organic solvent, which increases the internal resistance of the battery, on the surface of lithium can be prevented.

As a result, the formation of dendrites can be prevented and therefore the Life against the charge and discharge cycle can be lengthened.

By covering the surface of lithium with the fluorine resin, reactions of lithium with water or oxygen can be prevented, facilitating handling.

Since the fluorine resin is a flame retardant resin, it promotes safety with respect to an emergency fire accident.

The fluorine resin for covering the surface of lithium is exemplified by: a copolymer with a vinyl monomer, such as vinyl ether, dioxysol, dioxyne or dioxycene having an ether bond with fluoroethylene or diene monomer derivative or a copolymer with a vinyl monomer, such as vinyl ether, dioxysol or dioxyne, dioxycene having a fluorized ether bond with a diene compound, such as ethylene. In particular, it is preferable to use a copolymer with vinyl ether having an ether bond with fluoroethylene. The fluoroethylene may be a fluoroethylene derivative such as tetrafluoroethylene, chlorotrifluoroethylene, vinylidene fluoride or vinyl fluoride. The fluoroethylene copolymer containing the ether bond can be polymerized by a solution, suspension, block or emulsion polymerization. As a starting material, a peroxide, alkyl boron, light or radial rays may be employed.

The fluororesin can be coated on lithium metal by any one of the following methods:

a. A solution of the fluororesin is applied by spraying, screen printing, by using a coater or by dipping.

b. The fluororesin is directly coated to the surface of lithium by a vacuum evaporation method such as sputtering.

c. A polymer film is directly formed by plasma polymerization under an atmosphere of monomer which is the raw material for the fluororesin.

If the lithium surface is coated by using the fluororesin solution, it is preferable to use, in an inactive gas dehydrated sufficiently, a fluororesin solution dehydrated and deoxidized sufficiently. It is preferable to use a solvent in the foregoing solution which has been dehydrated with active alumina, molecular sieve, phosphorus pentaoxide or calcium chloride. As an alternative to this, it is preferable depending upon the type of the solvent that the solvent be distilled under presence of alkaline metal in inactive gas to remove impurities and to be dehydrated. However, the necessity of strictly controlling water can be eliminated when lithium is electrochemically inserted and allowed to deposit between the fluororesin and the conductive matrix.

An electrolyte may previously be mixed when the foregoing film is formed. Wettability between the electrolytic solution and the film can be improved in this way, causing ions to pass easily through the film. In order to facilitate the transfer of charge at the time of charging, conductive powder, such as carbon or titanium, fiber or whisker may be mixed at the time of forming the film.

Since the performance of the battery deteriorates if the fluororesin film is dissolved in an organic solvent of the electrolytic solution, it is preferable that the film is crosslinked.

As an alternative to the foregoing method of coating the lithium surface with the fluororesin solution, another method may be employed in which a fluorocompound, such as tetrafluoroethylene is polymerized with, he main raw material with plasma to be applied to the surface. It is preferable to employ another method for improving the contact and strength of the film in which oxygen, hydrogen, helium, argon, nitrogen, silane, hydrocarbon or the like is mixed with the fluorocompound which is the, main material. The plasma can effectively be generated by a DC or RF glow discharge method, a microwave discharge method or a laser beam irradiation method.

It is preferable that the thickness of the film to be formed on the surface of lithium ranges from 50 Å to 100 $\mu$, and more preferably ranges from 100 Å to 10 $\mu$. The optimum thickness of the film differs depending upon the density or the porosity of the film and considerably differs depending upon the type of the electrolytic solution. The thickness of the film can be adjusted by changing the concentration of the main material in the coating liquid for forming the film.

5. Large Ring Compound

By coating the surface of the negative pole activating material with a large ring compound through which ions for use in the reactions in the battery can be passed, the reactions between lithium and water or oxygen can be prevented if the negative active material is lithium. As a result, handling can easily be performed. Further, the direct contact between lithium and the electrolytic solution can be prevented, and therefore the growth of a polymer film on the surface of lithium to be formed from the solvent of the electrolytic solution can be prevented. If the negative pole activating material is zinc, the dissolution of zinc into the electrolytic solution can be prevented. As a result, the formation of dendrites can be prevented, causing the life against the charge and discharge cycle to be lengthened.

The large ring compound is a large ring compound having heteroatoms composed of one or more types of atoms selected from a group consisting of oxygen, nitrogen and sulfur. In order to pass ions for use in the reactions in the battery satisfactorily, a compound having one or more structures selected from a group consisting of ring polyether, ring polyamide, ring polythioether, azacrown ether, ring thioether, thiocrown ether, cryptand, cycrum, nonactyne and bariomicine each having a hole having a radius larger than the radius of ions to be used in the reactions in the battery, thyracrown, cyclodextrin, cyclophane, phthalocyanine and porphyrin each of which is a crown ether having silicon atoms. It is preferable to use crown ether polymer, bariomicine, phthalocyanine or porphyrin.

By covering the surface of the negative pole activating material with the large ring compound, the transfer of ions for use in the battery reactions between the electrolytic solution and the negative pole activating material can be made easier. Therefore, local generation of zinc or lithium dendrites on the negative pole can be prevented. Further, reactions between fresh lithium or zinc generated at the time of the charge with the solvent of the electrolytic solution can be prevented.

The surface coating of the large ring compound to be applied to the surface of the negative active agent can be performed in any of the following methods:

a. A polymer solution obtained, by polymerization, from the derivative of the large ring compound is applied by dipping, spraying, screen printing or coater coating.

b. A mixture of the binder polymer and the derivative of the large ring compound is applied, and then it is crosslinked so that the film is formed.

c. The derivative of the large ring compound is, as a monomer, dissolved in an electrolytic solution, an electric field is applied to the solution, and then the film is formed on the surface of the negative pole activating material or the conductive matrix by electrolytic polymerization.

d. Lithium is immersed in a solution of the derivative of the large ring compound, which can be anion-polymerized by lithium, so that the polymer film is formed.

e. A polymer is applied, the polymer being obtained by heating and condensing a large ring compound having an aromatic ring and formaldehyde in formic acid.

f. The film is formed by sputtering the large ring compound or the polymer of-the same or by plasma-polymerizing the same.

An electrolyte may be mixed at the time of forming the foregoing film. As a result, the wettability between the electrolytic solution and the film can be improved, causing ions to be easily passed through the film. In order to facilitate the transfer of charge at the time of the charging operation, powder or fiber or whisker of conductive material such as carbon or titanium may be mixed at the time of forming the film.

As the polymer for use in the coating solution, poly (dibenzo-18-crown-6)-coformaldehyde] or the like can be used. A polymer for coating can be prepared by the following polymerization reactions. By condensation polymerization of a large ring compound having, at the terminative croup thereof, carboxylic group or amino group or a hydroxyl group, polyamide can be obtained if the carboxylic group and the amino group react with each other. Polyester can be obtained if the carboxylic group and the hydroxyl group react with each other. The vinyl compound of the large ring compound or diene of the large ring compound enables an additive polymer to be obtained by radical polymerization, cation polymerization or anion polymerization. The starting material of the radical polymerization may be azobisisobutyronitrile (AIBN), benzoylperoxide (BPO) or butylhydroperoxide. A starting,material for the cation polymerization is exemplified by an acid such as $H_2SO_4$, $H_3PO_4$, $HClO_4$, $CCl_3$, or $CO_2H$ and a Friedel-Craft catalyst such as $BF_3$, $AlCl_3$, $TiCl_4$, or SnCl4. A large ring compound having an aromatic ring can be polymerized by dehydrogenation in which the Friedel-Craft catalyst and an oxidizer are combined with each other. A starting material for the anion polymerization may be an alkaline metal compound or an organic metal compound.

As the monomer of the large ring compound for use in the polymerization may be crown ether/(+)-18-crown-6-tetracarboxylic acid, 1,5,9,13,17,21-hexathiacyclotetracosan-3,11,19-triol, 1,5,9,13-tetrathiacyclohexadecan-3,11-diol, 1-aza-12-crown-4,1-aza-15-crown-5,1 -aza-18-crown-6,1,4,10,13-tetraoxy-7,16-diazocyclooctadecane, 1,4,10-trioxa-7,13-diazacyclopentadecane, or 6,8-dioxabicyclo[3.2.1]-oxetane-7-on. As an alternative to this, dibenzocrown ether can be used.

In the foregoing polymerization, a copolymer of two more types of derivatives of the large ring compounds or a copolymer of the large ring compound and another monomer may be used as well as the polymer of the derivatives of the large ring compounds. A polymer obtainable by introducing the derivative of the large ring compound into a polymer by substitution may be employed.

When a battery is manufactured, a polymer must be selected so as not to be dissolved in the solvent of the electrolytic solution or the polymer crosslinking reactions are caused to proceed so as not to be dissolved in the electrolytic solution.

The derivative of the large ring compound having, as the terminative group thereof, carboxylic group or amino group or a hydroxyl group or having a vinyl bond or a diene bond and a cross.inking material are mixed in the polymer serving as the binder, and then the mixed material is hardened. The crosslinking material is selected from the group consisting of diisocyanate, a polyisocyanate prepolymer, block isocyanate, an organic peroxide, polyamine, oximes, a nitroso compound, sulfur, a sulfur compound, selenium, a magnesium oxide, a lead oxide and a zinc oxide. The organic peroxide is exemplified by dicumyl-peroxide, 2,5-dimethyl-2,5-di(t-butylperoxy)hexane, 1,3-bis-(t-butylperoxy isopropyl)benzene, 1,1-bis-(t-butylperoxy)- 3,3,5-trimethylcyclohexane, n-butyl-4,4-bis(t-butylperoxy) valelate, 2,2-bis-(t-butylperoxide)butane, t-butylperoxy benzene, and vinyl-tris-(t-butylperoxy)silane. As an accelerating agent, a guanidine, aldehyde-amine, aldehyde-ammonia, thiazole, sulfonamide, thiourea, thiuram, dithiocarbamate, or xanthate is used.

Another coating method using the binder polymer is exemplified by a method in which a mixture of the large ring compound and the binder polymer is applied, and then radial rays, electron rays or ultraviolet rays are applied to cause the applied material to be crosslinked.

As a method for covering the negative pole activating material pole by the electrolytic polymerization, a monomer, such as dibenzocrown ether, is mixed in the electrolytic: solution, and then the electrolytic polymerization is performed while using the negative pole activating material or the conductive matrix as an anode. The solvent of the electrolytic solution is exemplified by acetonitrile ($CH_3CN$), benzonitrile ($C_6H_5CN$), propylene carbonate (PC), dimethylformamide (DMF), tetrahydrofuran (THF), nitrobenzene ($C_6H_5NO_2$), dichloroethane, diethoxyethane, chlorobenzene, γ-butyrolactone and dioxolane and their mixtures. It is preferable that the solvent be dehydrated with active alumina, molecular sieve, phosphorus pentaoxide or calcium chloride. As an alternative to this, it is preferable, depending upon the type of solvent, that the solvent be distilled in the presence of alkaline metal in inactive gas to remove impurities and to be dehydrated. The supporting electrolyte is an acid, such as $H_2SO_4$, HCl or $HNO_3$ or salt composed of monovalent metal ion ($Li^+$, $K^+$, $Na^+$, $Rb^+$ or $Ag^+$) or tetraammonia ion (tetrabutyl ammonia ion ($TBA^+$) and tetraethyl ammonia ion ($TEA^+$)) and Lewis acid ion ($BF_4—$, $PF_6—$, $AsF_6—$ or $ClO_4—$). It is preferable that the foregoing salt is refined by re-crystallization or heated under lowered pressure to sufficiently dehydrate and deoxidize the salt.

As the monomer, crown ether/benzo-15-crown-5, crown ether/benzo-18-crown-6, crown ether/N-phenylaza-15-crown-5, crown ether/dibenzo-18-crown-6, crown ether/dibenzopyridino-18-crown-6, crown ether/dibenzo-24-crown-8,1,13-bis(8-quinolyl)-1,4,7,10, 13-pentaoxatridecane, 5,6-benzo-4,7,13,16,21,24-hexaoxa-1,10-diazabicyclo[8.8.8]-hexacosan, 5,6-14,15-dibenzo-4,7, 13,16,21,24-hexaoxa-1,10-diazabicyclo[8.8.8]-hexacosan, bis[(benzo-15-crown-5-)-15-ylmethyl]pimelate, crown ether/dibenzo-30-crown-10,N,N'-dibenzyl-1,4,10,13-tetraoxa-7,16-diazacyclooctadecane, dilithiumphthalocyanine, 4'-nitrobenzo-15-crown-5,3,6,9, 14-tetrathiabicyclo [9.2.1]tetradeca-11,13-diene and their mixtures.

Since the performance of the battery deteriorates if the polymer film for covering the surface of the negative pole activating material is dissolved in the electrolytic solution, it is preferable to be crosslinked.

It is preferable that the thickness of the film to be formed on the surface of lithium ranges from 50 Å to 100 μ, and further preferably ranges from 100 Å to 10 μ. The optimum thickness of the film differs depending upon the density or the porosity of the film and considerably differs depending upon the type of the electrolytic solution. The thickness of the film can be adjusted by changing the concentration of the main material in the coating liquid for forming the film.

6. Polymer (polyphosphazene) Film in Which Phosphor Atoms and Nitrogen Atoms are Alternately Bonded in a Phosphor-Nitrogen Double Bond Manner

The surface of the negative pole activating material is covered with a polymer (polyphosphazene) film through which ions for use in the reactions in the battery can be passed, and in which phosphor atoms and nitrogen atoms are alternately phosphor-nitrogen double bonded. As a result, lithium and the electrolytic solution do not come in contact with each other if the negative pole activating material is lithium. Therefore, formation of the polymer film from the solvent of the electrolytic solution on the surface of lithium can be prevented. If the negative pole activating material is zinc, elution of zinc into the electrolytic solution can be prevented. As a result, formation of dendrites can be prevented, and therefore the life against the charge and discharge cycle can be lengthened.

Since the lithium battery according to the present invention comprises a flame retardant polyphosphazene film covering lithium, safety against emergency breakage can be improved.

The polymer for use as the covering material can be obtained by heating a dichloropolyphosphazene trimer to 200 to 300" C. and by ring-opening polymerization. The dichloropolyphosphazene trimer can be synthesized from phosphorus pentachloride and ammonia chloride or ammonia. Any one of the following catalysts is used at the time of the polymerization: benzoic acid, sodium benzonate, 2,6-di-p-cresol, water, methanol, ethanol, nitromethane, ether, heteropolyacid, sulfur, zinc, tin and sodium. Further, various types of polyorganophosphazene can be obtained by substituting chloride atoms of polydichlorophosphazene by an organic reagent or an organic metal reagent.

If the surface of lithium is coated with the foregoing polymer solution, it is preferable that the polymer solution be dehydrated and deoxidized sufficiently and be used in sufficiently dehydrated inactive gas (however, the necessity of strictly controlling water can be eliminated when the polymer is previously applied to the conductive matrix or when the negative pole activating material is zinc).

It is preferable to use a solvent in the foregoing solution which has been dehydrated with active alumina, molecular sieve, phosphorus pentaoxide or calcium chloride. As an alternative to this, it is preferable, depending upon the type of solvent, that the solvent be distilled in the presence of alkaline metal in inactive gas to remove impurities and to be dehydrated (however, the necessity of strictly controlling water can be eliminated when the polymer is previously applied to the conductive matrix or when the negative pole activating material is zinc).

An electrolyte may previously be mixed when the foregoing film is formed. Wettability between the electrolytic solution and the film can be improved in this way, causing ions to easily pass through the film. In order to facilitate the transfer of charge at the time of charging, conductive powder, such as carbon or titanium, fiber or whisker may be mixed at the time of forming the film.

Since the performance of the battery deteriorates if the polymer coating film is dissolved in an organic solvent of the electrolyte, it is preferable to be crosslinked in such a manner, for example, ultraviolet rays, electron rays or radial rays are applied or a crosslinking material, such as a radical generating agent, is used.

It is preferable that the thickness of the film to be formed on the surface of the negative pole activating material ranges from 50 Å to 100 μ, and more preferably ranges from 100 Å to 10 μ.

The optimum thickness of the film differs depending upon the density or the porosity of the film and considerably differs depending upon the type of the electrolytic solution. The thickness of the film can be adjusted by changing the concentration of the main material in the coating liquid for forming the film.

7. Other Organic Polymer Film

The surface of the negative pole is covered with an organic polymer containing one or more types of elements selected from a group consisting of oxygen, nitrogen and sulfur and permitting ions relating the battery reactions to pass through. The direct contact of fresh negative active materials precipitated during the charging reactions can be prevented due to the foregoing cover film. Therefore, the negative pole is not covered with a substance prepared due to the reactions with the electrolytic solution and having low conductivity. As a result, the growth of dendrites can be prevented.

The organic polymer containing oxygen is exemplified, by cellulose, alkyl cellulose, nitrocellulose, acetyl cellulose, chitin, chitosan, polyethylene glycol, polyethylene oxide, polypropylene oxide, polyvinyl alcohol, polyvinyl acetate, polylactide, polylactone, poly-3-hydroxyalcanoate, polyglycol acid, polyacetic acid, polydioxanone, glycol acid-lactone copolymer, polyethylene terephthalate, polyphenylene oxide, polyether etherketone and the like. It is preferable to use acetyl cellulose, chitin or polyvinyl alcohol.

The organic polymer containing nitrogen is exemplified by collagen, chitin, chitosan, polyurethane, polyimide, polyether imide and the like.

The organic polymer containing sulfur is exemplified by polyphenylene sulfide, polysulfone and polyether sulfone.

The negative pole is covered with the foregoing organic polymer film formed in such a manner that the solution of the organic polymer is applied and dried and then crosslinking reactions are performed.

Another method of forming the film may be employed in such a manner that the organic polymer is used as a target in a sputtering method. Another method may be employed in which a monomer serving as the organic polymer is plasma-polymerizes to form the film.

The application may De completed by dipping, spraying or screen printing.

The crosslinking reactions can be performed by any one of the following methods: irradiation of ultraviolet rays, electron rays or radial rays; or decomposition of a radical generating material such as azobisisobutyronitrile or peroxybenzoyl. The reason why the organic polymer of the film is crosslinked is that elution of the film into the electrolytic solution must be prevented.

The thickness of the film must range so far as ions in the electrolytic solution relating to the battery reactions are able to pass through the same. It differs depending upon the material and the porosity of the film and the type of the ion. It is preferable that the mean thickness ranges from 10 Å to 100 $\mu$, and more preferably from 100 Å to 10 $\mu$. If the ion permeability through the film is unsatisfactory, an electrolyte may be mixed at the time of forming the film.

If the electrolytic solution of the battery is a water soluble solution and it is not hydrophilic, it is preferable to perform a treatment using a silane coupling material or a titanate coupling material to attain hydrophilic characteristics.

Although the various covering materials and coating methods have been described with respect to directly covering the negative pole activating material with the film, another method may be employed in which the conductive matrix is covered with the coating material and then the negative pole activating material is introduced.

Negative Pole Activating Material

As the negative pole activating material 101, lithium, lithium alloy, zinc or zinc alloy is used. The lithium alloy may contain one or more types of elements selected from the group consisting of magnesium, aluminum, titanium, tin, indium, boron, gallium, potassium, sodium, calcium, zinc, lead and the like. The zinc alloy may containing one or more types of elements selected from a group consisting of aluminum, indium, magnesium, tin, titanium, copper, lead, tin, lithium, mercury and the like.

The negative pole activating material for the alkali-zinc battery may be inc, zinc alloy, zinc oxide or zinc hydroxide, the negative pole activating material being uniformly kneaded with a bonding material or a kneading solution to obtain paste. The paste is applied to a collector followed by drying, so that a negative plate is obtained.

The binding material is exemplified by polyvinyl alcohol, a cellulose material such as methyl cellulose or carboxymethyl cellulose, a polyolefin material such as polyethylene, a fluororesin such as polytetrafluoroethylene and a polyamide resin such as nylon.

The kneading solution may be an organic solvent such as ethylene glycol or water containing oxo acid salt such as sodium phosphate or the like.

The collector may be an iron plate applied with nickel plating and having apertures, a foam metal, nickel mesh or the like.

Positive Pole

The positive pole is formed by mixing a positive pole activating material, conductive powder and a binding material on the collector. In order to easily form the positive pole activating material, a solvent resisting resin, such as po.-propylene or polyethylene or fluororesin is used as the binding material if necessary. In order to further easily collect electric currents, the conductive powder is mixed at the time of formation. The material of the conductive powder is exemplified by carbon, copper, nickel, titanium and the like.

Positive Pole for Lithium Secondary Battery

The positive pole activating material 104 of the lithium secondary battery is made of a compound having layers through which lithium ions can be passed, the compound being a transition metal such as a metal oxide exemplified by manganese oxide, vanadium oxide, molybdenum oxide, chrome oxide, cobalt oxide, nickel oxide, titanium oxide, iron oxide, and tungsten oxide or a metal sulfide exemplified by titanium sulfide, molybdenum sulfide, iron sulfide and shebrell phase sulfide ($MyMo_6S_{8-z}$ (M: metal such as copper, cobalt or nickel)). The transition metal element may be an element having partially shell d or shell f. The metal selenide is exemplified by niobium selenide. The metal hydroxide is exemplified by oxyhydroxide. The conductive polymer is exemplified by polyacetylene, polyparaphenyline, polyaniline, polythiophene, polypyrrole and polytriphenylamine. The composite oxide is exemplified by $LiMn_{2-x}M_xO_4$ and $LiCo_xNi_{1-x}O_2$.

The positive pole is manufactured in such a manner that paste obtained by adding a binding material, such as polyethylene, polypropylene or a fluororesin, to the positive pole activating material 104 is pressed against the positive pole collector 103. In order to improve the collecting performance of the positive pole, it is preferable to add conductive powder to the paste.

The conductive powder may be a carbon material such as acetylene black or metal such as copper, nickel or titanium. The collector 103 may be fiber-like, porous or mesh-shape carbon material, stainless steel, titanium, nickel, copper, platinum or gold.

Positive Pole for Nickel-Zinc Battery

The positive pole of the nickel-zinc battery is either a paste type pole formed by directly charging nickel hydroxide powder into the collector or a sintering type formed by immersing nickel hydroxide into small apertures of the nickel sintered plate.

The paste type positive pole is formed in such a manner that paste obtained by uniformly kneading an additive, such as nickel or cobalt, with a binding material or a kneading solution is applied to the collector followed by drying them.

The binding material and the collector are made of materials of the same type as those of the zinc negative pole.

The sintered type positive pole is manufactured in such a manner that a sintered plate, obtained by sintering nickel powder on the nickel-plated iron plate having apertures, is immersed in a mixed solution of nickel salt serving as a main active material and cobalt salt serving as an additive and then reacted with an alkali solution of, for example, sodium hydride so that nickel hydroxide is impregnated into the sintered plate.

Positive Pole for Air-Zinc Secondary Battery

The positive pole of the air-zinc secondary battery is made of a material composed of an air pole, water-repellent film and a diffuser paper sheet.

The catalyst of the air pole is prepared in such manner that silver, manganese dioxide, nickel-cobalt composite oxide or platinum is added to a carbon material, such as porous carbon (active carbon) or carbon black, porous nickel, copper oxide or the like having a specific area of 200 to 1000 $m_2/g$.

The water-repellent film is provided to prevent leakage of the electrolytic solution passed through the air pole to the outside of the battery. The water-repellent film is made of a fluororesin such as polytetrafluoroethylene. The diffuser paper sheet is provided for the purpose of uniformly supplying oxygen to the overall surface of the air pole, the diffuser paper sheet being made of cellophane or the like.

A zinc-bromine battery comprising the negative ole activating material which is zinc includes bromine o serve as the positive pole activating material.

Coating of Positive Pole

In order to prevent generation of dendrites which cause short circuiting at the time of charge, the surface of the positive pole is covered with a film through which ions for use in the reactions in the battery can be passed, so that the life of the battery against the cyclic usage can be lengthened.

The coating material may be a polymer of the derivative of a large ring compound, a polymer of the derivative of an aromatic hydrocarbon, fluororesin, silicon resin, titanium resin, polyolefin, inorganic oxide, nitride, carbide or halide. It is effective to improve the safety of the lithium secondary battery to cover the positive pole with a flame retardant or noncombustible material, such as fluororesin, polyphosphazene, an inorganic oxide, nitride, carbide or halide.

If the film through which ions for use in the reactions in the battery can be passed is a multi-layer metal oxide film formed by using a bimolecular film as a mold, in effect, a separator can be obtained and short circuiting can be prevented between the negative pole and the positive pole.

Electrolyte

The electrolyte is used as it is or in the form of a solution in which it is dissolved in a solvent or after it has been solidified by adding a gelatinizing material, such as a polymer, to the solution. Generally an electrolytic solution, in which the electrolyte is dissolved in a solvent, is held in a porous separator.

The conductance of the electrolyte must be raised as much as possible because it relates to the internal resistance of the battery and considerably affects the current density at the time of the charge and the discharge. It is preferable that the conductance at 25° C. be $1\times10^{-3}$ S/cm or higher, more preferably $5\times10^{-3}$ S/cm or higher.

In a Case Where Negative Pole Activating Material is Lithium or Lithium Alloy

The electrolyte is made of an acid, such as $H_2SO_4$, HCl or $HNO_3$, a salt composed of Lewis acid ion ($BF_4-$, $PF_6-$, $AsF_6-$ or $ClO_4-$) or their mixture. Further, positive ions, such as sodium ions, potassium ions, tetraalkylammonium ions, and the Lewis acid ions may be used together. It is preferable that the foregoing salt is heated under lowered pressure to sufficiently dehydrate and deoxidize the salt.

The solvent of the electrolyte is exemplified by acetonitrile ($CH_3CN$), benzonitrile ($C_6H_5CN$), propylenecarbonate (PC), ethylene carbonate (EC), dimethyl formamide (DMF), tetrahydrofuran (THF), nitrobenzene ($C_6H_5NO_2$), dichloroethane, diethoxyethane, chlorobenzene, γ-butyrolactone, dioxolane, sulfolane, nitromethane, dimethylsulfide, dimethylsulfoxide, dimethoxyethane, methyl formate, 3-methyl-2-oxydazolidinone, 2-methyltetrahydrofuran, sulfur dioxide, phosphoryl chloride, thionyl chloride, sulfuryl chloride, dimethylformaldehyde, Y-butyrolactone, tetrahydrofuran and their mixtures.

It is preferable that the foregoing solvent be dehydrated with active alumina, molecular sieve, phosphorus pentaoxide or calcium chloride. As an alternative to this, it is preferable depending upon the type of the solvent that the solvent be distilled under presence of alkaline metal in inactive gas to remove impurities and to be dehydrated.

It is preferable to gel the electrolytic solution to prevent leakage of the electrolytic solution. As the gelling material, it is preferable to use a polymer of a type which swells when it absorbs the solvent of the electrolytic solution, the gelling material being a polymer exemplified by a polyethylene oxide, polyvinyl alcohol and polyacryl amide.

In a Case Where the Negative Pole Activating Material is Zinc or Zinc Alloy

As the electrolytic solution, salt of alkali or zinc borate is used which is a sole or a mixed solution of potassium hydroxide, sodium hydroxide, lithium hydroxide or ammonium hydroxide.

It is preferable to gel the electrolytic solution to prevent leakage of the electrolytic solution. As the gelling material, it is preferable to use a polymer of a type which swells when it absorbs the solvent of the electrolytic solution, the gelling material being a polymer exemplified by a polyethylene oxide, polyvinyl alcohol and polyacryl amide.

In the case of a battery such as a bromine-zinc battery except for the alkali battery, a salt such as zinc borate is used.

The solid electrolyte is manufactured in such a manner that a polymer compound of a polyethylene oxide (PEO) type and salt of the electrolyte are dissolved in the foregoing non-water-soluble solvent to be gelled and then they are developed on, for example, a flat board to evaporate the non-water-soluble solvent. The PEO polymer compound is exemplified by polyethylene oxide or a poly (methoxyethoxyphosphazene) crosslinked by polyethylene oxide or isocyanate.

The electrolytic solution for the alkali-zinc secondary battery may be a solution of sodium hydroxide, potassium hydroxide or lithium hydroxide or their mixture.

Separator

The separators (108, 208 and 308) are provided to prevent short circuits between the positive pole and the negative pole. They also act to hold the electrolytic solution.

The separator must meet the following conditions:

(1) The separator cannot be dissolved in the electrolytic solution and must be stable with respect to the same.

(2) The separator is able to absorb a large quantity of the electrolytic solution and must exhibit satisfactory holding force.

(3) The separator must have small apertures through which lithium ions and hydroxide ions can be passed.

(4) The separator must have small apertures each having a size which is able to prevent the penetration of dendrites.

(5) The separator must be mechanically strong so as not to be broken or deformed excessively when it is wound.

The material that is able to meet the foregoing conditions is exemplified by an unwoven fabric or a micropore structure of glass, polypropylene, polyethylene, or fluororesin.

Also, a metal oxide film having small apertures or a resin film formed by combining metal oxides may be used. If a metal oxide film in the form of a multi-layer structure is used, dendrites cannot easily pass through it and therefore an effect of preventing the short circuits can be obtained. If a fluororesin film which is a flame retardant or a glass or a metal oxide film which is a noncombustible material is used, the safety can further be improved.

Since the electrolytic solution of the alkali-zinc secondary battery is a water-type solvent, a hydrophilic separator must be used which is exemplified by a non-woven fabric or a micropore structure of nylon, polypropylene or hydrophilic polypropylene.

Collector

Collectors 100, 103, 200 and 300 are made of fiber, porous or mesh-like carbon, stainless steel, titanium, nickel, copper, platinum or gold.

Shape and Structure of Battery

The battery is formed into a flat, cylindrical, square (rectangular) or a sheet shape battery. The spiral and cylindrical structure is enabled to have a large electrode area by winding while interposing the separator between the negative pole and the positive pole so that a large electric current can be caused to flow at the time of the charge and the discharge. The rectangular type battery enables an accommodation space for accommodating the secondary battery to be used effectively. The structure may be a single-layer structure and a multi-layer structure.

Figure 2:
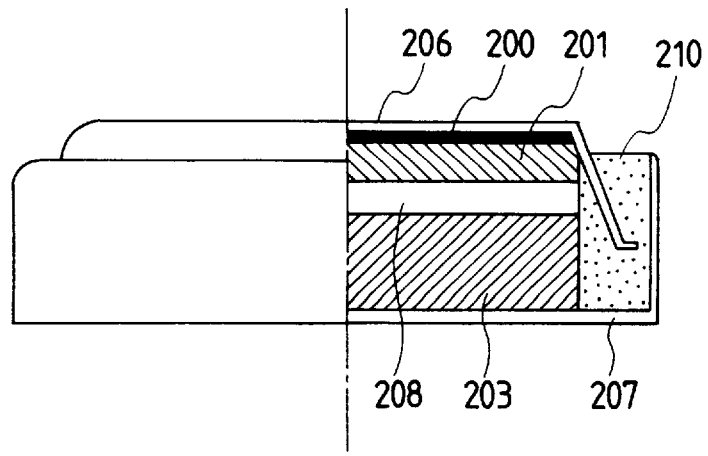
FIG. 2 is a schematic cross-sectional view which illustrates a flat battery to which the present invention is applied.
Figure 3:
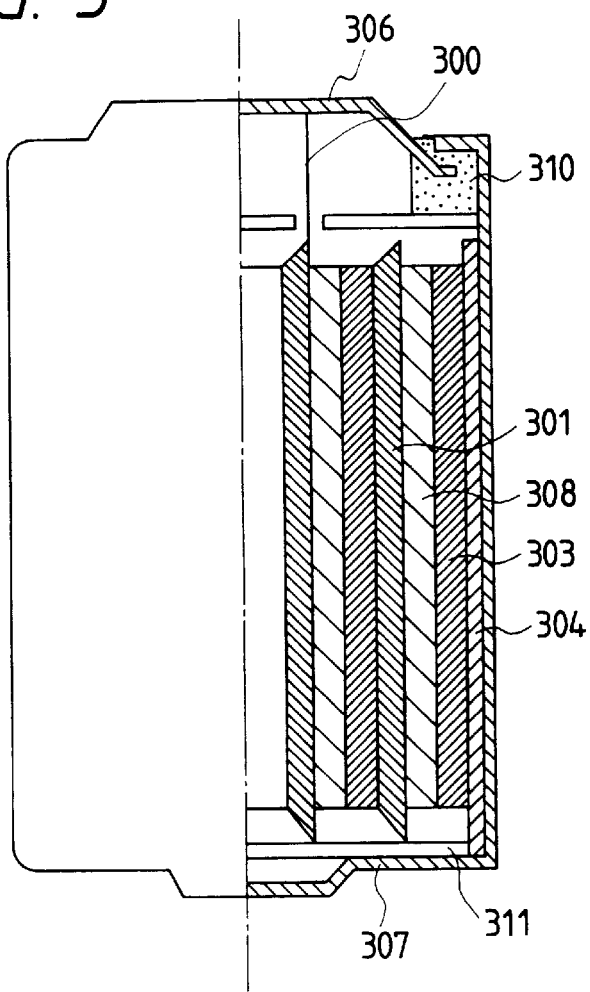
FIG. 3 is a schematic cross-sectional view which illustrates an example of a cylindrical battery to which the present invention is applied.

FIGS. 2 and 3 illustrate the schematic cross-sectional views which respectively illustrate an example of a single-layer flat battery and a spiral and cylindrical battery. Referring to FIGS. 2 and 3, reference numerals 201 and 301 represent negative poles covered with films, and 200 and 300 represent collectors for the negative poles 201 and 301. Reference numerals 203 and 303 represent positive poles made of the positive pole activating material. Reference numeral 304 represents a collector for the positive pole, and 206 and 306 represent negative terminals (caps for the negative poles 201 and 301). Reference numeral 207 and 307 represent outer cases (cases serving as positive pole cases and battery cases), 208 and 308 represent separators which hold the electrolytic solution, 210 and 310 represent insulating packings, and 311 represents an insulating plate.

Referring to FIG. 5, reference numeral 5102 represents a lithium member subjected to surface treatment.

The batteries shown in FIGS. 2 and 3 are manufactured in such a manner that the separators 208 and 308 are held between the negative poles 201, 301 subjected to the surface treatment and the positive poles 203 and 303 to be placed in the positive pole cases 207 and 307 followed by injecting the electrolytic solution. Then, the negative pole caps 206, 306, the insulating packings 210 and 310 are assembled so that the batteries are manufactured.

In the case of the lithium battery, it is preferable that the preparation of the material and assembling of the battery are performed in dry air from which water has sufficiently been removed or in a dry inactive gas.

Battery Case (Outer Case)

The battery case may be a metal outer case also serving as an output terminal or a plastic resin case.

The positive pole cases 207, 307, the negative pole caps 206 and 306 are made of stainless steel, and in particular, titanium clad stainless steel or copper clad stainless steel or a steel plate applied with nickel-plating.

Although the structures shown in FIGS. 2 and 3 comprise the positive pole cases 207 and 307, they also represent the battery cases and the output terminals. The battery case may be made of metal such as aluminum or zinc, plastic such as polypropylene or a composite material of metal, glass fiber and plastic as well as the stainless steel.

Insulating Packing

The insulating packings 210 and 310 may be made of fluororesin, polyamide resin, polysulfone resin or rubber.

Cap

The capping method may be a bonding method, welding method, soldering method or a glass sealing method as well as a caulking method using a gasket such as an insulating packing.

Insulating Plate

The insulting plate 311 for insulating the inside of the battery may be made of an organic resin or ceramics.

Safety Valve

A safety valve (not shown in FIGS. 2 and 3) using rubber, a spring or a metal ball may be used to serve as a safety means to act if the internal pressure in the battery has been raised.

The basic structure of another embodiment of the lithium secondary battery according to the present invention comprises a side opposing at least the positive pole, the side being composed of a lithium negative pole subjected to treatment using a reactive gas containing nitrogen or halogen, a separator, a positive pole activating material, electrolyte and a collector. FIG. 5 is a basic structural view which illustrates the lithium secondary battery according to the present invention. Referring to FIG. 5, reference numeral 100 represents a collector for a negative pole, 101 represents a negative pole activating material (lithium or lithium alloy), 5102 represents a surface treatment layer for the lithium portion, 103 represents a collector for the positive pole, 5104 represents a positive pole activating material, 105 represents an electrolytic solution, 106 represents a negative terminal, 107 represents a positive terminal, 108 represents a separator, and 109 represents a battery case. In the discharge reactions, lithium ions in the electrolytic solution 105 are introduced into the interlayer of the positive pole activating material 5104.

Simultaneously, lithium ions are eluted from the lithium negative pole 101 into the electrolytic solution 105 by way of a treatment-applied surface 5102. In the charging reactions, lithium ions in the electrolytic solution 105 are precipitated to the lithium negative pole 101 by way of the treatment-applied surface 5102. Simultaneously, lithium in the interlayer of the positive pole activating material 5104 is eluted into the electrolytic solution 105.

Surface Treatment for Lithium Negative Pole

The nitrogen compound for treating the surface of lithium or the lithium alloy is exemplified by nitrogen, ammonia and nitrogen trifluoride. If nitrogen is used as the nitride, it must be activated as to be formed into a plasma form by DC or high frequency discharge or by laser beam application. Also other nitrides are enabled to have improved reactivity when formed into plasma.

The halogen compound is exemplified by fluorine, chlorine, bromine, iodine, hydrogen fluoride, hydrogen chloride, hydrogen bromide, chlorine trifluoride, methane tetrafluoride, methane tetrachloride, methane trifluoride, methane fluoride trichloride, sulfur hexafluoride and boron trichloride. The inactive gas such as carbon halide must be formed into plasma so as to have improved reactivity. It is preferable that the very active gas such as fluorine, chlorine, hydrogen fluoride, hydrogen chloride or chloride trifluoride be diluted with inactive gas such as argon gas or helium gas.

The nitrogen compound and the halogen compound may be mixed with each other or contain oxygen gas, hydrogen gas, argon gas, helium gas, xenon gas or the like added thereto to improve the activity of the reactive gas or to control the activity. The negative pole may be treated with plasma of hydrogen gas or argon gas prior to treating the surface of the negative pole so that a fresh negative pole surface is caused to appear.

More specifically, according to the present invention, there is provide a secondary battery manufactured in such a manner that active nitrogen plasma or fluorine plasma or hydrogen fluoride is brought into contact with the surface of lithium to cause reactions to take place, an inactive thin film made of lithium nitride or lithium fluoride and allowing lithium ions to pass through is formed on the surface of lithium, and the lithium portion is used as the negative pole. As a result, the direct contact of lithium precipitated at the time of the charge with the electrolytic solution is prevented so that the generation of dendrites at the time of the charge is prevented. Therefore, a lithium battery exhibiting a long life against the charge and discharge cycle can be obtained. Further, the application of the foregoing treatment to the surface of lithium prevents the reactions between lithium and water. Further, handling can be made easier.

It is preferable that the thickness of the treatment layer to be formed on the surface of lithium ranges from 10 Å to $1\mu$, more preferably 50 Å to 1000 Å. The thickness is adjusted by the reaction time or the concentration of the reaction gas.

It is preferable that the concentration of nitrogen atoms or halogen atoms in the treatment layer formed on the surface of lithium be gradually lowered from the surface to the inside portion of lithium.

Positive Pole Activating Material

The positive pole activating material 5104 may be a material into which lithium can be introduced into the interlayer thereof, the material being exemplified by a metal oxide such as a nickel oxide, cobalt oxide, titanium oxide, iron oxide, vanadium oxide, manganese oxide, molybdenum oxide, chrome oxide or tungsten oxide, or a metal sulfide such as molybdenum sulfide, iron sulfide or titanium sulfide, a hydroxide such as oxy iron hydroxide, or a conductive polymer such as polyacetylene, polyaniline, polypyrrole or polythiophene.

In order to make easier the formation of the positive pole activating material, solvent-resisting resin, such as polypropylene, polyethylene or fluororesin is used as a bonding material if necessary.

In order to further facilitate collection of electric current, it is preferable to mix conductive powder at the time of molding the positive active material. The conductive powder may be carbon black, copper, nickel or titanium.

Figure 8:
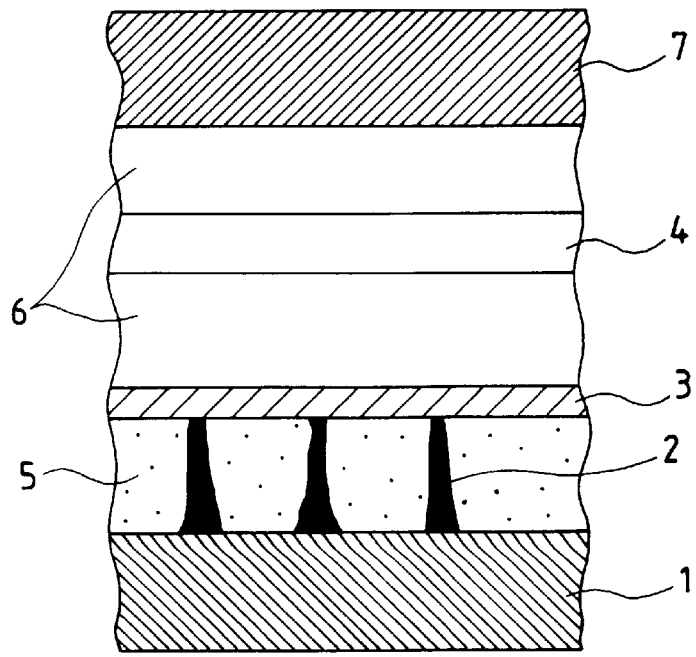
FIG. 8 is a schematic view which illustrates an effect of the present invention.

FIG. 8 illustrates an example of a pattern of stacked layers according to the present invention in which a conductive layer, a semiconductor layer and an insulating layer are formed between the negative pole and the separator. Referring to FIG. 8, reference numeral 001 represents a negative pole, 002 represents a dendrite, 003 represents the conductive layer or the semiconductor layer, 004 represents a separator, 005 represents an insulating layer, 006 represents an electrolytic solution, and 007 represents a positive pole.

FIG. 8 is a schematic view which illustrates an effect of the present invention in an example in which the insulating layer through which lithium ions can be passed and a conductive layer are stacked on the surface of the lithium negative pole.

In the charging mode, lithium (or zinc) is precipitated on to the negative pole 001. At this time, a portion in which the current density is high is locally generated on the negative pole 001 depending upon the projections and pits of the surface and upon the thickness of the insulating film. Lithium (or zinc) is selectively deposited, causing the dendrite 002 to grow. With proceeding of the charging or discharging cycle, the dendrite 002 reaches the conductive layer 003. When a short circuit state between the dendrite 002 and the conductive layer 003 is realized, the current density at the negative pole is lowered at the time of the charge. Therefore, the further growth of the dendrite 002 is prevented, and therefore penetration of the dendrite 002 through the separator 004 to reach the positive pole 007 can be prevented.

By covering the negative pole with the ion permeable insulating layer 005, active lithium (or zinc) precipitated at the time of the charge cannot easily react with the electrolytic solution. Therefore, the generation of the growth of the insulating film can be prevented.

FIGS. 9A to 9H illustrate various examples in which one or more types of layers selected from the ion permeable conductor, semiconductor and insulating material are formed between the negative pole and the separator. Reference numerals shown in FIGS. 9A to 9H are the same as those shown in FIG. 8. The present invention is not limited to the structure shown in FIGS. 9A to 9H.

It is preferable that the conductive layer to be formed between the negative pole and the separator be made of carbon, Ni, Ti, Pt, Al, Pb, Cr, Cu, V, Mo, W, Fe, Co, Zn or Mg, more preferably made of carbon, Ni or Ti.

If the semiconductor layer is formed in place of the conductive layer, a similar effect obtainable from the conductive layer can be obtained. If the semiconductor layer is employed, the current density at the time of the growth of dendrite is higher than that in the case where the conductive layer is formed. However, the conductivity is lowered as compared with the case where the conductive layer is formed. Therefore, an advantage can be realized that the easy conduction with the positive pole is prevented.

The semiconductor layer-may be made of diamond, Si, nickel oxide, copper oxide, manganese oxide, titanium oxide, zinc oxide, zirconium oxide, tungsten oxide, molybdenum oxide or vanadium oxide.

The insulating layer may be made of a halide such as lithium fluoride or magnesium fluoride, a nitride such as silicon nitride, a carbon such as silicon carbide, or a polymer such as polyethylene, polypropylene or fluororesin.

The forming method and materials of the conductive layer, the semiconductor layer, the insulating layer and the composite layer will now be described. When lithium is used, the following two conditions must be met.

If water is left in the raw material, water and lithium react with each other. Therefore, water must be previously removed by a method by dehydration using active alumina, molecular sieve, phosphorus pentaoxide or calcium chloride. If a solvent is used, it is sometime preferable that the solvent be distilled in the presence of alkaline metal in inactive gas to remove impurities and to be dehydrated.

The temperature at which the foregoing layer is applied to the surface of the negative pole must be lower than a level at which the negative pole activating material is melted.

Conductive Layer

As a typical example of the conductive layer, manufacturing method of carbon conductive layer or a metal conductive layer made of, for example, Ni or Ti, will now be described.

Carbon

The form of the carbon crystal is categorized to crystal, amorphous, and a mixture of them. The carbon to be applied may be carbon powder or carbon fiber or a carbon paper sheet or the like obtainable by paper machining.

The surface of the negative pole can be covered with carbon by any one of the following methods:

(1) A solution obtained by uniformly dispersing carbon powder or carbon fiber in an organic solvent such as toluene or xylene is, under inactive atmosphere of Ar, applied to the surface of the negative pole by a spraying method, screen printing method, a coater method or a dipping method followed by drying the solution, and then carbon are pressed against the surface.

(2) The carbon paper is stacked on the surface of the negative pole, and then the carbon is pressed against the surface.

(3) A vacuum evaporation method such as sputtering using carbon as the target as performed so that the surface of the negative pole is covered with carbon.

(4) A CVD (Chemical Vapor Deposition) method is performed in the presence of an organic compound which is the raw material of carbon so that the negative pole is covered with carbon.

In the foregoing coating method, the carbon powder or the carbon fiber must be pressed against the surface so that the contact is improved. The pressing work is performed by using a pressing machine or a roller press. The temperature at the time of the pressing work must be lower than a level at which the negative pole activating material is melted. It is preferable that the thickness of the coating range from 10 to 100 $\mu$m, more preferably from 50 $\mu$m or thinner in order to prevent reduction of the quantity of the contained negative pole activating material.

The pressing method to be performed after the carbon paper has been stacked may be a method using a pressing machine or a roller press, a method in which the positive pole plate and the negative pole plate are wound while interposing the separator, and a method in which winding pressure or stacking pressure is applied while interposing the carbon paper at the time of stacking the carbon paper. The latter method is able to eliminate a process of previously pressing the carbon paper against the negative pole and the carbon paper can be pressed in the winding or the stacking process. It is preferable that the carbon paper having a thickness ranging from 150 to 300 $\mu$m pressed to have a thickness ranging from 75 to 150 $\mu$m.

The sputtering coating method is performed in such a manner that carbon is used as the target in an inactive atmosphere of argon and DC or RF discharge is performed so that the surface of the negative pole is covered with carbon.

The raw material of the CVD carbon coating method may be saturated hydrocarbon such as methane, unsaturated hydrocarbon such as acetylene, ethylene, propylene or benzene, carbon monoxide, alcohol or acetone. The exciting method is exemplified by a method using plasma, laser or heating filament. It is preferable that the thickness of the carbon applied be 1 $\mu$m or thinner, more preferably 1000 Å.

In the case of the plasma CVD method, the power source for the glow discharge may be a high frequency or a DC power source. The high frequency source may be a usual band source such as radio frequency (RF), VHF or microwave source. The wavelength of the radio waves is typified by 13.56 MHz, while that of the microwave is typified by 2.45 GHz.

If the laser CVD is employed, an ultraviolet ArF excimer laser or infrared ray $CO_2$ is used as the laser beam source.

Metal Such as Ni or Ti

The metal such as Ni or Ti is applied to the surface of the negative pole by a sputtering method as is employed to apply carbon, a CVD method, an electron beam evaporation method or a cluster ion beam evaporation method.

The target for use in the sputtering method may be Ni or Ti or the like. When a composite film is formed, two or more kinds of targets are used; either or both of the targets are subjected to the sputtering process. The sputtering method must be performed under an inactive atmosphere of argon similarly to carbon.

The CVD coating method employs the following materials as the raw materials.

As the raw material for Ni and Ti, a solution in which organic metal such as acetylacetone complex of nickel (or titanium) is dissolved in non-water-soluble solvent such as hexane, acetone or toluene or a solution in which a halide such as nickel chloride (or titanium) is dissolved in a non-water-soluble solvent such as ethanol is subjected to bubbling in a carrier gas (hydrogen or the like) and then the solution is introduced into the CVD reaction chamber to cause the CVD reactions to take place to that coating is performed.

When a composite film of Ni and carbon is formed, a hydrocarbon such as methane is used together with a metal compound.

Semiconductor Layer

The semiconductor layer is exemplified by diamond, Si, nickel oxide, copper oxide, cobalt oxide, manganese oxide, titanium oxide, zinc oxide, zirconium oxide, tungsten oxide, molybdenum oxide or vanadium oxide. The coating method may be a sputtering method, an electron beam evaporation method, a plasma CVD method, a light CVD method, a laser CVD method or a heat CVD method.

Si

As the target for use in the sputtering method, Si or the like is used.

In the CVD method, the raw material for Si may be hydroxide gas such as $SiH_4$ or $Si_2H_6$, fluorine gas such as $SiHF_3$, $SiH_2F_2$ or $SiH_3$, or a chlorine gas such as $SiHCl_3$, $SiH_2Cl_2$ or $SiHCl_3$. If the foregoing raw material is in the form of a liquid, it is heated so as to be in the form of vapor or subjected to bubbling by a carrier gas before it is introduced. If a composite film of Si and carbon material is formed, a hydrocarbon such as methane is used together with the foregoing gas. A compound comprising carbon, P or B may be adequately mixed.

Oxide such as Nickel oxide and Titanium Oxide

The nickel oxide and titanium oxide can be prepared by a sol-gel method in which alkoxide such as nickel or titanium or organic metal is dissolved in alcohol and then it is hydrolyzed, an anodic oxidation method in which a solution in which nickel salt or titanium salt is dissolved is electrolyzed, or a CVD method or an electron beam evaporation method to introduce oxygen gas into the reaction chamber.

Insulating Layer

As the insulating layer, a halide, a nitride, a carbide or resin such as polyethylene (PE), polypropylene (PP) or fluororesin is used. As the coating method, a sputtering method, a plasma CVD method or a coating method is used.

Other resins may be used such that a resin obtained by gasifying a monomer of an organic polymer and by plasma polymerizing it or a resin obtained by sputtering an organic polymer or a film of an organic polymer may be used. In this case, the resin member must have small apertures through which ions can be passed and must not react with the electrolytic solution.

Nitride

In the sputtering method, a target comprising nitride exemplified by silicon nitride or lithium nitride is used. As an alternative to this, Si or Li is used as the target, nitrogen gas or ammonia is used as the reaction gas and sputtering is performed in the foregoing state.

PE and PP

In the plasma, CVD method, $SiH_4$ or $Si_2H_6$ and ammonia, nitrogen gas or $NF_3$ are used together as the raw materials.

In the sputtering method, a PE or PP target is used to perform sputtering to cover the insulating layer.

In the plasma, polymerization method, ethylene is used as the raw material in the case of PE, while propylene is used in the case of PP.

Fluororesin

In the sputtering method, the target comprises a polymer or a copolymer such as polytetrafluoroethylene, polytrifluoroethylene, vinyl fluoride, vinylidene fluoride or dichlorodifluoroethylene.

As the raw material gas for use in the plasma polymerization method, tetrafluoroethylene, trifluoroethylene, vinyl fluoride, vinylidene fluoride or dichlorofluoroethylene is used.

A fluororesin film having micropores can be used.

Composite Layer

The composite layer is selected from a group consisting of the foregoing conductor, semiconductor and insulating material. By using two or more types or raw materials, the composite layer is formed by a sputtering method or a CVD method. As an alternative to this, two or more types of powder selected from a group consisting of conductor powder, semiconductor powder and insulating material powder are melted in a melted or dissolved resin so that the film for use as the composite film is manufactured.

Another structure may be employed as a preferred structure in which the concentrations (content) of the conductor, semiconductor and the insulating material in the composite layer are change continuously or discontinuously in the direction of the thickness of the layer.

The apertures in the layer can be formed in such a manner that an electrolyte is mixed with the raw material at the time of applying the conductor, semiconductor and the insulating material by the sputtering method or the CVD method to add the electrolyte into the conductor, semiconductor and the insulating material. The foregoing electrolyte is eluted into the electrolytic solution of the battery so that micropore structures are formed in the conductor, semiconductor and the insulating material. Since lithium ions and hydroxide ions can easily be introduced and discharged in the micropores, the charging and discharging efficiencies car be improved. Since the pore has a small size, the growth of the dendrite can be prevented, and therefore the life of the charging and discharging cycle can be lengthened.

Stacked Structure

The conductor, semiconductor and the insulating material layers may be formed into a single layer or a multi-layer composed of two or more layers.

The stacking method comprises a step of stacking a film selected from the group consisting of the conductor, semiconductor and the insulating material between the negative pole and the separator. The film is stacked on the surface of the negative pole, or stacked between the negative pole and the separator in a non-contact manner or stacked on the surface of the separator. As an alternative to this, the negative pole or the separator or a substance through which ions can be passed may be used as the base on which the conductor, semiconductor and the insulating material are stacked by a sputtering method or a CVD method.

Thickness

The optimum thickness of the single, multi-layer or the composite layer composed of the one or more types of layers selected from the group consisting of the conductor, semiconductor and the insulating material differs depending upon the porosity, the aperture distribution, the material of the layers and the number of layers. If the material includes a large volume gaps as the polymer material, it is preferable the thickness be 10 $\mu$m or thinner, more preferably 1 $\mu$m or thinner. If a precise material such as the inorganic compound is used, it is preferable to make the thickness to be 1 $\mu$m or thinner, more preferably 1000 Å or thinner.

Multi-Layer Metal Oxide

The multi-layer metal oxide 10102 must contain one or more types of materials selected from a group consisting of alumina, titanium oxide, silica, selenium oxide, zirconia oxide, magnesium oxide, chrome oxide, calcium oxide, tin oxide, indium oxide and germanium oxide.

The multi-layer metal-oxide film is formed by molding a bimolecular film ii a mold. By forming the metal oxide film by using the bimolecular film, a metal oxide film having small apertures and a large specific area and formed into a multi-layer film structure can be obtained.

Method of Preparing Multi-Layer Metal Oxide

The preparation is usually in such a manner that a sol in which very fine particles of the metal oxide is, in a colloid, dispersed in a solvent, such as water, is added to a dispersion solution with ultra sonication of water or buffer solution of a film forming compound for forming a bimolecular film selected depending upon the type of the sol and upon the surface charge so that a uniformly-dispersed solution is prepared; then it is developed on a fluororesin film or a glass plate followed by developing the solution; and a cast film is manufactured. If the uniformly-dispersed film cannot be obtained, then any one of the following methods is employed:

(1) A cast film is formed by adding a low-melting point organic solvent, such as alcohol, chloroform, acetone or tetrahydrofuran, is added to the film forming compound and dispersing the materials, and then water or a buffer solution is added to the solution from which the solvent has been gradually evaporated, and then the mixture is dispersed with ultrasonic waves.

(2) Water or a buffer solution is added to the cast film described in (1), and the material is heated to a level higher than the phase transition temperature of the film.

(3) The film forming compound is dissolved in an organic solvent, such as diethylether or ethylalcohol, and the solution is injected into water and a buffer solution.

As a method of obtaining the bimolecular film which serves as the mold of the film shape of the metal oxide, the mechanical strength can De improved by any one of the following methods:

(a) The film forming compound is impregnated into a porous polymer film to form the bimolecular solid film.

(b) A hydrophobic polymer or a hydrophilic polymer and the film forming compound are dissolved in a solvent, and the solution is developed so that a cast film is obtained.

(c) A solution of a polymer electrolyte having a charge opposing that of the ionic film forming compound is mixed with a solution in which the ionic film forming compound is dispersed so that sedimentation of polyion complex is obtained, and then the polyion complex is dissolved in an organic solvent followed by developing it so that the cast film is obtained.

Alternatively, any ore of the following methods may be employed: a chloric acid (surface active agent) method which is used at the time of preparing ribosome; a freezing-melting method; an inverse-phase evaporation method; and a macro-ribosome preparation method.

The film forming compound may be a compound having both a hydrophobic group and a hydrophilic group (substance having amphipathic property) is used. The film forming compound may be an ammonia compound, an anion compound, a nonion compound and a polymerable compound depending upon the molecular structure. The hydrophobic group of the film forming compound is categorized as a hydrocarbon, fluorine carbide, unsaturated hydrocarbon, and unsaturated fluorine carbide. A material containing a chromophore structure introduced thereto in order to improve the molecular orientation in the film forming compound may be used.

The film forming compound is exemplified by p-octyloxyaniline hydrochloride,
p-(octyloxy)-p'-hydroxyazobenzene,
p-(10-octyloxy)-p'-octyloxyazobenzene,
dodecyl-N-[p-{p-(10-bromodecyloxy)phenylazo}benzoyl] L-alaninate, L-glutamic acid didodecylester hydrochloride, N-[11-bromoundecanoyl]-L-glutamic acid didodecylester, dimethyldihexadecylammonium bromide, N-[β-(trimethylammonio)ethyloxybenzoyl]didodecyl-L-glutamic acid bromide,
dioctadecylmethyldimethylammonium bromide, N-[11-hydroxyundecanoyl]-L-glutamic acid ditetradecylester, N-[11-phosphoroundecanoyl]-L-acid ditetradecylester, 1,2-bis(hexadecyloxycarbonyl)ethane-1-sulfonic acid sodium, N-[(2-oxo-1,3,2-oxazaphosphoryl)-11-oxadodecanoyl]-L-glutamic acid didodecylester, N-[(2-trimethylammonio-ethylphosphonate)undecanoyl]-L-glutamic acid didodecylester, N-[(2-ammonio-ethylphosphonate)undecanoyl]-L-glutamic acid didodecyl ester and 1,3-hexadecyl-2-polyethylene glycolylglycine.

It is preferable that the surface of the multi-layer metal oxide film of a non-water-soluble battery of a type comprising the negative pole activating material which is lithium is subjected to lipophilic treatment using an organic metal compound such as a silane coupling material or titanate coupling agent.

In order to lower the current density at the leading portion of the dendrite at the time of the charge and to prevent the growth of dendrite, the surface of the multi-layer metal oxide film on the negative pole side may be applied with a conductive material by evaporation or plating.

Very Fine Particle Sol of Metal Oxide

The dispersed sol of very fine particles of the metal oxide is usually obtained by an acid, a base and water are added to an alcohol solution of an organic metal compound such as metal alkoxide as to be hydrolyzed to form colloid off the very fine particles of the metal oxide. The dispersion medium of the very fine particle sol is obtained by substituting an organic solvent if necessary.

The alkoxide is typified by tetramethoxysilane, tetraethoxysilane, aluminum isopropoxide, and titanium isopropoxide. Another metal organic compound such as acetyl acetone complex salt, alkyl metal compound, acetylacetone metal salt, naphthenate metal salt or octylate metal salt may be used.

The very fine particles of the metal oxide can be obtained by another method for obtaining the same from the gas phase reaction of the vapor of the organic metal compound or the metal. The obtained very fine particles of the oxide are dispersed in a solvent so that a dispersed sol is prepared.

If the negative pole activating material is lithium or lithium alloy, lithium ions relate to the battery reactions. In the case of ar alkali battery comprising the negative pole activating material which is zinc, hydroxyl ions relate to the same. The typical battery of a type comprising the negative pole activating material which is zinc is exemplified by a nickel-zinc battery and an air-zinc battery.

By covering the surface of the positive pole 104 of the battery with a film 12102 which is made of an insulating material or a semiconductor through which ions relating to the battery reactions can be passed, dendrites of lithium or zinc grown from the negative pole 101 through the separator 108 during the repetition of the charge and the discharge are not substantially brought into contact with the conductor or a collector in the positive pole 104. As a result, short circuits in the battery can be prevented, and therefore the life of the secondary battery can be lengthened. Further, the safety can be improved.

Covering of Positive Pole of Secondary Battery

As the insulating material of the coating material of the positive pole of the secondary battery, any one of the following materials may be used which is selected from a group consisting of a polymer of the derivative of a large ring compound, a polymer of the derivative of an aromatic hydrocarbon, fluororesin, silicon resin, titanium resin, polyolefin, inorganic oxide, nitride, carbide and halide. It is effective for the positive pole of the lithium secondary battery to be covered with the polymer of the derivative of the large ring compound, the polymer of the derivative of the aromatic hydrocarbon or the fluororesin.

Polymer of Derivative of Large Ring Compound

The large ring compound is a ring compound of a type comprising hetero-atoms of one or more types selected from a group consisting of oxygen, nitrogen, sulfur and phosphorus. The large ring compound is a ring polyether having hole each having a radius larger than the radius of the lithium ion. The large ring compound has one or more structures selected from a group consisting of ring polyamine, ring polythioether, azacrown ether, ring thioether, thiocrown ether, cryptand, cyclam, nonactine, variomicine, thyracrown which is a crown ether containing silicon atoms, cyclodextrin, cyclofan, phthalocyanine and porphyrin compound.

The surface of the positive pole is covered with the large ring compound by any one of the following methods:

a. A polymer solution obtainable from polymerization of the derivative of the foregoing large ring compound is applied by a coating method such as dipping, spraying, screen-printing or coating application method.

b. A mixture in which the derivative of the large ring compound mixed with the polymer serving as the binder is applied and then crosslinked to form the film.

c. The derivative of the large ring compound is used as a monomer to be dissolved in an electrolytic solution, and then an electric field is applied to electrolyze and polymerize the material so that the film is formed on the surface of the positive pole.

d. The molded positive pole is immersed in a solution of the derivative of the large ring compound, which anion-polymerizes, so that the polymer film is formed.

e. A polymer obtainable by heating and condensing the large ring compound having an aromatic ring and formaldehyde in a formic acid is applied.

f. The film is formed by sputtering of a polymer of the large ring compound or the derivative of the large ring compound or by plasma-polymerizing the large ring compound.

An electrolyte may be mixed at the time of forming the film. As a result, the wettability between the electrolytic solution and the film can be improved, causing ions to easily pass through the film.

The polymer for use as the coating solution may be poly[(dibenzo-18-crown-6)co-formaldehyde] or the like.

The coating polymer can be newly formed by the following polymerizing reactions: a large ring compound having a carboxylic group or an amino group or a hydroxyl group at the terminal group thereof is condensed and polymerized so that polyamide is obtained if the carboxylic group and the amino group react with each other. If the carboxylic group and the hydroxyl group react with each other, polyester can be obtained. The vinyl compound of the large ring compound or diene of the large ring compound can be obtained in the form of an addition polymer by radical polymerization, cation polymerization or anion polymerization. The starting material in the radical polymerization may be azobisisobutyronitrile (AIBN), benzoylperoxide (BPO) or t-butylhydroperoxide. A starting material for the cation polymerization is exemplified by an acid such as $H_2SO_4$, $H_3PO_4$, $HClO_4$, $CCl_3CO_2$ and Friedel-Craft catalyst such as $BF_3$, $AlCl_3$, $TiCl_4$ or $SnCl_4$. A large ring compound having an aromatic ring can be polymerized by dehydrogenation in which the Friedel-Craft catalyst and an oxidizer are combined with each other. A starting material for the anion polymerization may be an alkaline metal compound or an organic metal compound.

As the monomer of the large ring compound for use in the polymerization may be crown ether/(+)-18-crown-6-tetracarboxylic acid, 1,5,9,13,17,21-hexathiacyclotetracosan-3,11,19-triol, 1,5,9,13-tetrathiacyclohexadecan-3,11-diol, 1-aza-12-crown-4,1-aza-15-crown-5,1-aza-18-crown-6,1,4,10,13-tetraoxy-7,16-diazacyclooctadecan, 1,4,10-trioxa-7,13-diazacyclopentadecane, or 6,8-dioxabicyclo[3.2.1]-oxetane-7-one. As an alternative to this, dibenzocrown ether can be used.

In the foregoing polymerization, a copolymer of two more types of derivatives of the large ring compounds or a copolymer of the large ring compound and another monomer may be used as well as the polymer of the derivatives of the large ring compounds. A polymer obtainable by introducing the derivative of the large ring compound into a polymer by substitution may be employed.

When a battery is manufactured, a polymer must be selected so as not to be dissolved in the solvent of the electrolytic solution or the polymer crosslinking reactions are caused to proceed so as not be dissolved in the electrolytic solution.

The derivative of the large ring compound having, at the terminative croup thereof, carboxylic group or amino group or a hydroxyl group or having a vinyl bond or a diene bond and a crosslinking material are mixed in the polymer serving as the binder, and then the mixed material is hardened. An accelerating material may be mixed at this time. The crosslinking material is selected from a group consisting of diisocyanate, a polyisocyanate prepolymer, block isocyanate, an organic peroxide, polyamine, oximes, a nitroso compound, sulfur, a sulfur compound, selenium, a magnesium oxide, a lead oxide and a zinc oxide. The organic peroxide is exemplified by di-cumyl-peroxide, 2,5-dimethyl-2,5-di-(t-butylperoxy)hexane, 1,3-bis-(t-butylperoxy isopropyl)benzene, 1,1-bis-(t-butylperoxy)-3,3,5-trimethyl-cyclohexane, n-butyl-4,4-bis-(t-butylperoxy) valerate, 2,2-bis-(t-butylperoxide)butane, t-butylperoxy-benzene, and vinyl-tris-(t-butylperoxy)silane. As an accelerating agent, a guanidine, aldehyde-amine, aldehyde-ammonia, thiazole, sulfonamide, thiourea, thiuram, dithiocarbamate, xanthate accelerating agent is used.

Another coating method using the binder polymer is exemplified by a method in which a mixture of the large ring compound and the binder polymer is applied, and then radial rays, electron rays or ultraviolet rays are applied to cause the applied material to be crosslinked.

As a method for covering the positive pole by the electropolymerization, a monomer, such as dibenzocrown ether, is mixed in the electrolytic solution, and then the electrolytic polymerization is performed while using the negative pole activating material or the conductive matrix as an anode. The solvent of the electrolytic solution is exemplified by acetonitrile ($CH_3CN$), benzonitrile ($C_6H_5CN$), propylene carbonate (PC), dimethylformamide (DMF), tetrahydrofuran (THF), nitrobenzene ($C_6H_5NO_2$), dichloroethane, diethoxyethane, chlorobenzene, γ-butyrolactone, dioxolane and their mixture.

It is preferable that the solvent be dehydrated with active alumina, molecular sieve, phosphorus pentaoxide or calcium chloride.

The supporting electrolyte is an acid, such as $H_2SO_4$, HCl or $HNO_3$ or salt composed of monovalent metal ion ($Li^+$, $K^+$, $Na^+$, $Rb^+$, or $Ag^+$) or tetraammonia ion (tetrabutyl ammonia ion ($TBA^+$) and tetraethyl ammonia ion ($TEA^+$)) and Lewis acid Ion ($BF_4^-$, $PF_6^-$, $AsF_6^-$ or $ClO_4^-$). It is preferable that the foregoing salt is refined by re-crystallization or it is heated under lowered pressure to sufficiently dehydrate and deoxidize the salt.

As the monomer, crown ether/benzo-15-crown-5, crown ether/benzo-18-crown-6, crown ether/N-phenylaza-15-crown-5, crown ether/dibenzo-18-crown-6, crown ether/dibenzopyridino-18-crown-6, crown ether/dibenzo-24-crown-8,1,13-bis(8-quinolyl)-1,4,7,10,13-pentaoxatridecan, 5,6-benzo-4,7,13,16,21,24-hexaoxa-1,10-diazabicyclo[8.8.8]-hexacosan, 5,6-14,15-dibenzo-4,7,13,16,21,24-hexacosan, 1,10-diazabicyclo[8.8.8]-hexacosan, bis[(benzo-15-crown-5-)-15-ylmethy]pimelate, crown ether/dibenzo-30-crown-10,N,N'-dibenzyl-1,4,10,13-tetraoxa-7,16-diazacyclooxadecan, dilithiumphthalocyanin, 4'-nitrobenzo-15-crown-5,3,6,9,14-tetrathiabicyclo[9.2.1]tetradeca-11,13-diene and their mixtures.

Since the performance of the battery deteriorates if the polymer film for covering the surface of the negative pole activating material is dissolved in the electrolytic solution, it is preferable to be cross linked.

It is preferable that the thickness of the film to be formed on the surface of lithium ranges from 10 Å to 100μ, further preferably ranges from 50 Å to 10μ. The optimum thickness of the film differs depending upon the density or the porosity of the film and considerably differs depending upon the type of the electrolytic solution. The thickness of the film can be adjusted by changing the concentration of the main material in the coating liquid for forming the film.

Polymer of Derivative of Aromatic Hydrocarbon

As the derivative of the aromatic hydrocarbon for forming the charge moving complex is one or more types of derivatives selected from a group consisting of naphthalene, anthracene, phenanthrene, naphthalene, pyrene, triphenylene, perylene, picene, benzopyrene, coronene and ovalene.

The polymer for use to form the coating material can be prepared by polymerization or copolymerization of vinyl monomer, monomer of acetylene derivative or dicarboxylic acid and diamine, and dicarboxylic acid and glycol. The polymerization of the vinyl monomer can be performed by radical or ion polymerization. The monomer of the acetylene derivative can be polymerized while using a chloride of tungsten as a catalyst. The dicarboxylic acid and diamine can be polycondensed and the dicarboxylic acid and glycol can be polycondensed as well.

The monomer of the aromatic derivative for forming the polymer is exemplified by 2-vinyl naphthalene, 2-vinyl pyridine, 9-vinyl anthracene, 9,10-anthracene dipropionic acid, 9,10-bis(phenylethyl) anthracene and 5,12-bis (phenylethynyl) naphthalene.

A starting material for the radical polymerization is exemplified by azobisisobutyronitrile (AIBN), benzoylperoxide (BPO) and t-butylhydroperoxide. A starting material for the cation polymerization is exemplified by an acid such as $H_2SO_4$, $H_3PO_4$, $HClO_4$, $CCl_3$ or $CO_2H$ and Friedel-Craft catalyst such as $BF_3$, $AlCl_3$, $TiCl_4$ or $SnCl_4$. A large ring compound having an aromatic ring can be polymerized by dehydrogenation in which the Friedel-Craft catalyst and an oxidizer are combined with each other. A starting material for the anion polymerization may be an alkaline metal compound or an organic metal compound.

As an alternative to the foregoing method, a polymer into which an aromatic group can be obtained by subjecting the side chain of each polymer to a substitution reaction with a derivative of an aromatic compound. Another method may be employed in which an electrolytic polymerization reaction is caused to take place in an electrolytic solution containing a monomer mixed therein to form directly a polymer of an aromatic compound on the surface of a positive pole.

When the surface of the positive pole is applied with a coating by using the foregoing polymer solution, it is preferable to use a polymer solution dehydrated and deoxidized sufficiently in inactive gas dehydrated sufficiently. It is preferable to use a solvent in the foregoing solution which has been dehydrated with active alumina, molecular sieve, phosphorus pentaoxide or calcium chloride. As an alternative to this, it is preferable depending upon the type of the solvent that the solvent be distilled in the presence of alkaline metal in inactive gas to remove impurities and to be dehydrated.

An electrolyte may previously be mixed when the foregoing film is formed. It leads to a fact that wettability between the electrolytic solution and the film can be improved, causing ions to easily pass through the film.

Since the performance of the battery deteriorates if the polymer coating film is dissolved in an organic solvent of the electrolyte, it is preferable to be crosslinked in such a manner, for example, ultraviolet rays, electron rays or radial rays are applied or a crosslinking material, such as a radical generating agent, is used.

Fluororesin

The fluororesin for covering the surface of the positive pole is exemplified by ethylene tetrafluoride-ethylene copolymer, ethylene tetrafluoride chloride, ethylene tetrafluoride-per-fluoroalkylvinyl ether copolymer, ethylene tetrafluoride-propylene hexafluoride copolymer, vinylidene fluoride resin, vinyl fluoride resin, and ethylene tetrafluoride resin. Since the foregoing materials are not dissolved in a solvent, it is preferable to employ sputtering or plasma polymerization to cover the surface of the positive pole with the fluororesin.

Among the fluororesins, those having an ether bond are able to facilitate the surface covering because they can easily be dissolved in a solvent and to improve the affinity with lithium ions. The fluororesin having the ether bond is exemplified by a copolymer of ethylene fluoride and vinyl monomer such as vinyl ether, dioxysol, dioxyne or dioxyne having an ether bond or dienemonomer derivative or a copolymer with a vinyl monomer, such as vinyl ether, dioxysol or dioxyne, dioxycene having a fluorized ether bond with a diene compound, such as ethylene. The fluoroethylene may be a fluoroethylene derivative such as tetrafluoroethylene, chlorotrifluoroethylene, vinylidenefluoride or vinyl fluoride. The fluoroethylene copolymer containing the ether bond can be polymerized by a solution, suspension, block or emulsion polymerization. As a starting material, a peroxide, alkyl boron, light or radial rays may be employed.

The fluororesin can be coated on the surface of the positive pole by any one of the following methods:

a. A solution of the fluororesin is applied by spraying, screen printing, By using a coater or by dipping.

b. The fluororesin is directly coated to the surface of the positive pole by a vacuum evaporation method such as sputtering.

c. A polymer film is directly formed by plasma polymerization under an atmosphere of monomer which is the raw material for the fluororesin.

If the lithium surface is coated by using the fluororesin solution, it is preferable to use, in an inactive gas dehydrated sufficiently, a fluororesin solution dehydrated and deoxidized sufficiently. It is preferable to use a solvent in the foregoing solution which has been dehydrated with active alumina, molecular sieve, phosphorus pentaoxide or calcium chloride. As an alternative to this, it is preferable depending upon the type of the solvent that the solvent be distilled under presence of alkaline metal in inactive gas to remove impurities and to be dehydrated.

An electrolyte may previously be mixed when the foregoing film is formed. It leads to a fact that wettability between the electrolytic solution and the film can be improved, causing ions to easily pass through the film.

Since the performance of the battery deteriorates if the fluororesin film is dissolved in an organic solvent of the electrolytic solution, it is preferable that the film is crosslinked.

As an alternative to the foregoing method of coating the surface with the fluororesin solution having the ether bond, another method may be employed in which ethylene fluoride and vinyl monomer are used as the main raw material so as to be plasma-polymerized so that the surface is covered. In order to cause the plasma polymerization to take place easily or to improve the contact of the film and the strength of the same, it is preferable to add, to the fluorine compound serving as the raw material, oxygen, hydrogen, helium, argon, nitrogen, silane, hydrocarbon or the like. The plasma can effectively be generated by a DC or RF glow discharge method, a microwave discharge method or a laser beam irradiation method. The fluororesin having the ether bond may be sputtered to cover the surface of the positive pole.

It is preferable that the thickness of the film to be formed on the surface of lithium ranges from 10 Å to $100\mu$, more preferably ranges from 50 Å to $10\mu$. The optimum thickness of the film differs depending upon the density or the porosity of the film and considerably differs depending upon the type of the electrolytic solution. The thickness of the film can be adjusted by changing the concentration of the main material in the coating liquid for forming the film. If the plasma polymerization or sputtering is performed, the thickness can be adjusted by controlling the deposition time period.

Silicon Resin

The organic silicon compound may be any one of a material selected from a group consisting of alkoxysilane, alkylsilane, halogenated silane, siloxane, silane containing vinyl group, amino group, epoxy group, methacrylic group or mercapto group introduced thereto, hydrogen-denatured, vinyl-denatured, hydroxyl group denatured, amino-denatured, carboxylic group denatured, chloro-denatured, epoxy denatured, methacryloxy-denatured, mercapto-denatured, fluorine-denatured, long-chain-alkyl denatured or phenyl-denatured polysiloxane, alkylene oxide denatured siloxane copolymer, silicon-denatured copolymer, alkoxysilane-denatured polymer, silicon-denatured urethane or silicon-denatured nylon.

If the organic compound is liquid, the film can be formed by a direct coating method or the organic compound is diluted in a solvent and then applied. If the organic compound is solid, a solution dissolved in a solvent may be applied. The application method may be a dipping method, a screen printing method, a spraying method, a roll coating method or the like. The viscosity of the coating solution must adequately be adjusted to be adaptable to the coating method.

Titanium Polymer

A titanium polymer obtained by causing an organic titanium compound to act on an organic polymer may be used. For example, a thiranopolymer of silicon polymer formed by cross-linking the main chain of a polycarbosilane skeleton with the titanium organic compound may be used.

As an alternative to the titanium polymer, a material obtained by introducing the derivative of an organic metal compound, such as an organic aluminum compound, into a polymer by substitution reactions may be used as the coating material.

Polyphosphazene

Polyphosphazene which is a polymer in which phosphor atoms and nitrogen atoms alternately form phosphor-nitrogen double bonds can be obtained by heating a dichloropolyphosphazene trimer to 200 to 300° C. and by ring-opening polymerization. The dichloropolyphosphazene trimer can be synthesized from phosphorus pentachloride and ammonia chloride or ammonia. Any one of the following catalysts is used at the time of the polymerization: benzoic acid, sodium benzonate, 2,6-di-p-cresol, water, methanol, ethanol, nitromethane, ether, heteropoly acid, sulfur, zinc, tin and sodium.

Further, various types of polyorganophosphazene can be obtained by substituting chloride atoms of polydichlorophosphazene by an organic reagent or an organic metal reagent.

If the surface of positive pole is coated with the foregoing polyphosphazene, it is preferable that the polymer solution dehydrated and deoxidized sufficiently be used in inactive gas dehydrated sufficiently. It is preferable to use a solvent in the foregoing solution which has been dehydrated with active alumina, molecular sieve, phosphorus pentaoxide or calcium chloride. As an alternative to this, it is preferable depending upon the type of the solvent that the solvent be distilled in the presence of alkaline metal in inactive gas to remove impurities and to he dehydrated.

An electrolyte may previously be mixed when the foregoing film is formed. It leads to a fact that wettability between the electrolytic solution and the film can be improved, causing ions to easily pass through the film.

Since the performance of the battery deteriorates if the polymer coating film is dissolved in an organic solvent of the electrolyte, it is preferable to be crosslinked in such a manner that, for example, ultraviolet rays, electron rays or radial rays are applied or a crosslinking material, such as a radical generating agent, is used.

It is preferable that the thickness of the film to be formed on the surface of lithium ranges from 10 Å to 100 $\mu$, more preferably ranges from 50 Å to 10 $\mu$. The optimum thickness of the film differs depending upon the density or the porosity of the film and considerably differs depending upon the type of the electrolytic solution. The thickness of the film can be adjusted by changing the concentration of the main material in the coating liquid for forming the film.

Polyolefin

As polyolefin, polyethylene or polypropylene may be used. Polyolefin is used in such a manner that the positive pole is dipped in a solution dissolved in a solvent such as tetrahydrofuran or o-dichlorobenzene, the positive pole is then dried and crosslinked by ultraviolet, electrons, radial rays or the like so that the film is formed on the surface of the positive pole.

The film can be formed by sputtering or plasma CVD method. In the material in the plasma CVD method, ethylene gas or propylene gas may be used.

Inorganic Oxide

The inorganic glass is made of a material, such as silica, titanium oxide, alumina, zirconia oxide, magnesium oxide, tantalum oxide, molybdenum oxide, tungsten molybdenum, tin oxide, indium oxide, iron oxide, chrome oxide, aluminum phosphate, iron phosphate, silicon phosphate and their mixtures. A sol-gel method is one of adequate methods for forming the inorganic glass. The raw material for the material having the inorganic glass structure is obtained in such a manner that an acid or a base and water are added to a solution of alcohol of an organic metal compound such as a metal alkoxide to hydrolyze the raw material so as to form colloid particles having metal atom-oxygen atom bonds, and then the colloidal solution is directly applied to the surface of the positive pole. As an alternative to this, a solution in which a monomer or an organic polymer or the organic polymer and a crosslinking material are dissolved in the colloidal solution is applied, and then the solution is polymerized or dried and polymerized so that tie film is formed. By forming the composite organic poler, strength against cracks and separation can be improved. If the electrolyte forming the lithium battery is dissolved in the colloidal solution to form the film, the wettability with the electrolytic solution can be improved and ions are enabled to move easily.

As an alternative to alkoxide, any one of the following organic metal compounds may be employed: acetyl acetone complex salt, an alkyl metal compound, acetyl acetone metal salt naphthene acid metal salt, and octyl acid metal salt.

The organic polymer for combining the organic polymers is exemplified by epoxy resin, polyester, polyimide, polyethylene, polypropylene, polyurethane, polystyrene, polyethylene glycol, nylon, fluorine resin and silicon resin.

The polymer crosslinking material is exemplified by diisocyanate, polyisocyanate prepolymer, block isocyanate, organic peroxide, polyamine, oximes, nitroso compound, sulfur or sulfur compound, selenium, magnesium oxide, lead oxide and zinc oxide.

As an alternative to using the crosslinking material, a method may be employed in which radial rays or electron rays or ultraviolet rays are applied to polymerize or crosslink the polymer.

As an application method, a dipping method, screen printing, spraying or a roll coating method may be employed. The viscosity of the liquid to be applied must be adequately adjusted to be adaptable to the application method.

Another method of forming the film by the glass inorganic oxide may be employed; for example, any one of the following evaporation methods or a CVD method may be employed: a sputtering method, an electron beam evaporation method, a plasma CVD (Chemical Vapor Deposition) method, and a laser CVD method.

The sputtering process and the electron beam evaporation can be performed by a method in which the oxide material is directly evaporated or by a method in which silicon or metal vapor and oxygen gas are caused to react with each other to form the film.

The plasma CVD method and the laser CVD method is performed in such a manner that oxygen gas and any one of a hydroxide or halide of silicon or metal and an organic metal compound are used as the raw materials to be decomposed by discharge or laser so that the film is formed.

The inorganic oxide can be used to form the film by another method, that is, an electrochemical method comprising the steps of forming a metal film made of aluminum, titanium, tantalum, niobium by sputtering or electron beam, anode-oxidizing the film by using an oxalic acid, a phosphoric acid or ammonia borate as an electrolytic solution to form the oxide film.

A film-forming method may be employed which utilizes the equilibrium reaction in the water solution to precipitate and cause the oxide film to grow on the surface of the dipped substrate. In this case, silica. (a silicon oxide), titanium oxide or vanadium oxide film can be formed. A specific method of forming the silica film comprises the step of dipping the positive pole in a solution in which silica is saturated in a water solution of hydrofluorosilicic acid to form the film.

Nitride

The nitride can be obtained from silicon nitride, titanium nitride, aluminum nitride or boron nitride or the like. The nitride film can be formed on the positive pole by sputtering, an electron beam evaporation method, a plasma CVD method or a laser CVD method.

The sputtering and the electron beam evaporation methods are categorized to a method in which the nitride material is directly evaporated and a method in which vapor of silicon, titanium or aluminum and nitrogen plasma generated from nitrogen gas or ammonia gas are caused to react with each other to form the film.

The plasma CVD method and the laser CVD method respectively comprise the step of decomposing the raw material gas, such as nitrogen gas, ammonia gas or nitrogen trifluoride and a hydroxide such as silicon, titanium or vanadium or tungsten or aluminum trifluoride or aluminum, halide or an organic metal compound by discharge or laser to form the film.

Carbide

The carbide can be obtained from a material exemplified by amorphous carbon, silicon carbide, titanium carbide, vanadium carbide and tungsten carbide.

The carbide film can be formed by a similar method employed to form the nitride.

The sputtering and the electron beam evaporation methods are categorized to a method in which the material from which the carbide is obtained is directly evaporated and a method in which silicon, titanium, vanadium or tungsten and carbon are used as the raw materials to form the film.

The plasma CVD method and the laser CVD method respectively comprise the step of, by laser, decomposing the material, such as hydrocarbon, from which carbon is obtained and a hydroxide such as silicon, titanium, vanadium or tungsten or a halide or an organic metal compound to form the film.

Halide

The halide can be obtained from a material selected from a group consisting of lithium fluoride, magnesium fluoride, sodium fluoride, potassium fluoride, barium fluoride or lithium chloride.

The halide film cat be formed by a sputtering method or an electron beam evaporation method. A CVD method such as the plasma CVD method or the laser CVD method may be employed.

Semiconductor

The semiconductor for covering the positive pole is made of a material exemplified by diamond (carbon), silicon, nickel oxide, copper oxide, vanadium oxide, tin oxide and zinc oxide.

Alkali metal, phosphorus or boron may be added as impurities.

The semiconductor film may be formed by sputtering, electron beam evaporation, plasma CVD or laser CVD as well as the foregoing method of forming the inorganic acid film.

Covering of Positive Pole of Nickel-Zinc Secondary Battery or Air-Zinc Secondary Battery The material and the method of covering the positive pole of a nickel-zinc secondary battery or air-zinc secondary battery may be the same as those employed to cover the positive pole of the lithium secondary battery. Also, a polymer of a type which is dissolved in an organic solvent but which is not dissolved in water may be used. If the covering material has water-repellant characteristics, a hydrophilic group must be introduced or must be subjected to hydrophilic treatment using a silane coupling material.

Thickness of Film Covering the Surface of Positive Pole

The thickness of the film for covering the surface of the positive pole can he controlled by adjusting the concentration of the solution if the surface is covered by utilizing the liquid layer reactions performed by the polymer solution or the sol-gel method. The same can be controlled by adjusting the deposition time if sputtering, the electron beam evaporation, the CVD method or the plasma polymerization is employed.

Apertures in Coating Film on Positive Pole Surface

The apertures and the porosity of the coating film for covering the surface of the positive pole can be controlled by adjusting the concentration of the solution or the drying condition if covering is performed by using the polymer solution or by utilizing the sol-gel method. Further, any one of the following methods may be employed: a method for forming the film while causing foam to be generated by adjusting the concentration of the foaming material; a method having the steps of forming a film in which the content of the electrolyte is adjusted, and dissolving the electrolyte; a method for controlling the evaporation rate; and a method for adjusting the mixture ratio of the reactive materials.

If the negative pole is covered with the coating material of a type employed to cover the positive pole, growth of dendrites from the negative pole can be prevented. Therefore, short circuits in the battery can be prevented by covering the positive pole. As a result, the battery cycle can further be lengthened.

Then, a positive pole according to the present invention composed of transition metal and group VIA element will now be described.

Transition Metal Element

The transition metal element in the positive pole activating material according to the present invention may be an element having partially shell d or shell f and selected from a group consisting of T, Zr, Hf, V, Nb, Ta, Cr, Mo, W, Wn, Tc, Re, Fe, Ru, Os, Co, Rh, Ir, Ni, Pd, Pt, Cu, Ag and Au. Any one of the first transition system metals is mainly used which is exemplified by Ti, V, Cr, Mn, Fe, Co, Ni or Cu. A compound of the transition metal and the group VIA element is manufactured by a material exemplified by the transition metal, the salt of the transition metal, an oxide of the transition metal and a hydroxide of the transition metal.

Group VIA Element

The positive pole activating material according to the present invention comprises the group VIA element exemplified by O, S, Se, Te and Po. Among the foregoing elements, O or S is mainly employed. A compound of the transition metal and the group VIA element can be manufactured by a material exemplified by a compound of a hydroxide, halide, halide oxide or oxide of sulfur, selenium, tellurium, poloniun.

Additive Element

By adding elements except the transition metal, the distortion of the positive pole activating material occurring due to the introduction/discharge of lithium ions can be relaxed. The element can be effectively added by a method comprising the step of adding the salt, the halide or an organic metal compound of one or more types of elements selected from a group consisting of lithium, magnesium, sodium, potassium, aluminum, zinc, calcium, barium, lead, indium, boron, silicon, tin, phosphorus, arsenic, antimony, bismuth, chlorine and fluorine. It is preferably that the atom ratio of the additive element with respect to the transition metal element be 1 or less.

Method of Manufacturing Compound of Transition Metal and Group VIA Element

The compound of the transition metal and the group VIA element according to the present invention is manufactured by any one of the following methods: a method in which the compound is prepared from the solution of the salt of the transition metal or the organic transition metal compound by way of a hydroxide, a method comprising the steps of melting the transition metal or the transition metal compound and rapidly cooling it, and a method in which the transition metal compound is caused to react in a gas phase.

The method of preparing the transition metal oxide from the hydroxide is exemplified by a method comprising the step of baking or drying hydroxide in air or in an oxygen atmosphere to prepare powder. A specific example of preparing the transition sulfide from the hydroxide is exemplified by a method comprising the step of baking a hydroxide in a hydrogen reduction atmosphere in which a hydrogen sulfide is mixed to prepare powder.

The rapid cooling method for preparing the transition metal oxide comprises the steps of melting the transition metal compound, such as the transition metal or the transition metal oxide, and spraying oxygen gas containing inactive gas mixed thereto to a rotating disc to prepare the powder.

The method of preparing the transition metal oxide by the gas phase reactions comprises the step of oxidizing or hydrolyzing the salt of the transition metal or causing vapor of the transition.metal to react with the group VIA element Or a compound of the group VIA element or decomposing the organic transition metal compound to prepare the powder.

It is preferable that each process be performed at 400° C. or lower, more preferably 300° C. or lower.

The liquid phase reaction method, the gas phase reaction method and the melting and rapid cooling method will now be described.

Liquid Phase Reaction

A method of preparing the hydroxide for use in the main reaction in the Method of manufacturing the material from the solution by way of the hydroxide is exemplified by:

Method of Preparing Hydroxide

It is preferable that the transition metal hydroxide be prepared by reactions between the salt of the transition metal and alkali or by hydrolysis of the organic transition metal compound or by reactions between the transition metal and alkali. It is preferable that the preparation temperature be 150° C. or lower, more preferably 100° C. or-lower.

Reactions Between Salt of Transition Metal and Alkali

By causing alkali to react with the salt of the transition metal, a hydroxide of the transition metal is sedimented to be prepared. By mixing salts of two or more types of the transition metals, a hydroxide of a composite transition metal can be obtained.

The salt of the transition metal is typified by a carbonate, a nitrate, a halide, a sulfate, a sulfamate, acetate, oxalate, citrate, tartrate, formate or ammoniate.

The alkali may be lithium hydroxide, sodium hydroxide, potassium hydroxide or ammonia hydroxide. As an alternative to this, urea or thiourea may be used which raises the pH by generating hydroxide ions when heated.

It is preferable that an organic acid or inorganic acid or an amine is, in a small quantity, added or an organic solvent such as alcohol is added at the time of causing alkali to react with the water solution of the transition metal salt in order to make fine the sediment particles of the hydroxide.

By vibrating the sediment with ultrasonic waves, the sediment particles can be made fine. Therefore, the specific area can be enlarged.

Hydrolysis Reaction of Organic Transition Metal Compound

The hydroxide of the transition metal can be prepared by hydrolyzing an organic metal compound of the transition metal, such as alkoxide, acetyl acetonate, octylate or naphthalate.

The hydrolysis of alkoxide is specifically performed in such a manner that alkoxide of the transition metal is dissolved by water, alcohol or ethanol amine or the like, and an inorganic acid such as hydrochloric acid or an organic acid such as acetic acid or ammonia hydroxide or amine is added.

The alkoxide of the transition metal may be a material selected from a group consisting of $Mn(OC_2H_5)_2$, $Mn(OC_3H_7)_2$, $Mn(OC_4H_9)_2$, $Ni(OC_2H_5)_2$, $Ni(OC_3H_7)_2$, $Ni(OC_4H_9)_2$, $Co(OC_2H_5)_2$, $Co(OC_3H_7)_2$, $Co(OC_4H_9)_2$, $Ti(OC_2H_5)_2$, $Ti(OC_3H_7)_2$, $Ti(OC_4H_9)_2$, $Fe(OC_2H_7)_2$, $Fe(OC_3H_5)_2$, $Fe(OC_4H_9)_2$, $Cu(OC_2H_5)_2$, $Cu(OC_3H_7)_2$, $Cu(OC_4H_9)_2$, $VO(OCH_3)_3$, $VO(OC_2H_5)_3$, $VO(OC_3H_7)_3$, $VO(OC_4H_9)_3$ and $Y(OC_4H_9)_3$.

The acetylacetonate of the transition metal is exemplified by $Cu(C_5H_7O_2)_2$, $Co(C_5H_7O_2)_2(H_2O)_2$, $Co(C_5H_7O_2)_3$, $Ni(C_5H_7O_2)_2(H_2O)_2$, $Mn(C_5H_7O_2)_2(H_2O)_2$, $Cr(C_5H_7O_2)_3$, $VO(C_5H_7O_2)_2$, $Fe(C_5H_7O_2)_3$, $Ti(OC_4H_9)_2(C_5H_7O)_2$, $La(C_5H_7O_2)_3$, $Y(C_5H_7O_2)_3$, and $Zr(C_5H_7O_2)_4$.

The octylate of the transition metal is exemplified by $Cu(C_7H_{15}COO)_2$, $Ni(C_7H_{15}COO)_2$, $Fe(C_7H_{15}COO)_2$, $Mn(C_7H_{15}COO)_2$, $Co(C_7H_{15}COO)_2$, $Zr(C_7H_{15}COO)_2$, $Y(C_7H_{15}COO)_2$, and $La(C_7H_{15}COO)_2$.

The naphthalate of the transition metal is exemplified by the salt of naphthalate expressed by a general formula $C_nH_{2n-2}O_2$ that is, cobalt naphthenate, copper naphthenate, manganese naphthenate, iron naphthenate, nickel naphthalenate, vanadium naphthenate, yttrium naphthenate and lanthanum naphthenate.

The alcohol is exemplified by methyl alcohol, ethyl alcohol, isopropyl alcohol, ethylene glycol and propylene glycol.

Dehydrating Reaction

In order to obtain the oxide of the transition metal by dehydration from the transition metal hydroxide prepared by the foregoing solution reactions, it is preferable that the transition metal hydroxide is immersed in an organic solvent such as alcohol or acetone which is mixed with water to sufficiently substitute water, and then it is dried in a vacuum-state at 100° C. or higher. As ar alternative to this, heating and dehydration is performed by using microwaves. If the drying temperature is too high, crystallization is enhanced and therefore the hydroxide groups are decreased. Therefore, it is preferable that the temperature be 400° C. or lower. It is preferable that the frequency of the microwaves be a frequency which can easily be absorbed by water.

In order to enlarge the specific area, another method may be employed in which the dehydration is performed by freezing and drying.

Hydrogen Treatment

Hydrogen is mixed into the dried atmosphere at the time of drying the transition metal oxide followed by performing heat treatment. As an alternative to this, a method is employed in which the transition metal hydroxide or the transition metal oxide is subjected to hydrogen plasma treatment The hydrogen plasma can be generated by a hydrogen gas discharge method or by a method of exciting and decomposing the hydrogen gas by laser beams.

Introduction of Group VIA Element Except Oxygen

A method is employed in which the transition metal hydroxide or the transition metal oxide is treated with hydrogen sulfide or hydrogen selenide or the group VIA element is mixed at the time of preparing the transition metal hydroxide.

Gas Phase Reaction Method

As a method of preparing a compound of the transition metal and the group VIA element, a gasified transition metal salt or an organic transition metal compound or vapor of the transition metal and the group VIA element or the group VIA element compound are caused to react with each other ii the gas phase to prepare powder. Another method may be employed in which the gasified transition metal at or the organic transition metal compound containing he group VIA element is decomposed in the gas phase to prepare the compound of the transition metal and the group VIA element.

If the transition metal salt or the organic transition metal compound is in the form of a solid, it is heated so as to be formed into vapor or it is heated so as to be formed into liquid. Then, carrier gas is bubbled so as to be introduced into the reaction chamber. If the transition metal salt or the organic transition metal compound is in the form of liquid, it may be heated so as to be formed into vapor or carrier gas is bubbled so as to be introduced into the reaction chamber.

The salt of the transition metal may mainly be a halide such as a chloride. As an alternative to this, a carbonate, a nitrate, a sulfate, sulfonate, acetate, citrate, tartrate, formate or ammoniate. The chloride is exemplified by $VOCl_3$, $MnCl_2$, $MoCl_5$, $TiCl_4$, $NiCl_2$, $CoCl_2$, $FeCl_3$, $WCl_6$, $YCl_3$ and $ZrCl_4$.

The raw material from which the group VIA element can be obtained is exemplified by the group VIA element, the hydroxide of the group VIA element and the halide of the group VIA element.

By mixing hydrogen gas in the foregoing gas phase reaction, a compound of the transition metal and the group VIA element containing hydrogen can be prepared.

In the foregoing gas phase reaction, it is preferable to employ any ore of the following methods: a heat CVD (Chemical Vapor Deposition) method, a plasma CVD method, a laser CVD method, a filament method, a reactive sputtering method and the electron beam method.

The sputtering is performed by heat in the heat CVD method, by glow discharge in the plasma CVD method, by heat energy or light energy of laser beams in the laser CVD method, by heat of a filament made of tungsten or the like in the filament method, and in the reactive sputtering method in the reactive gas atmosphere, and by electron beam heating in the electron beam method. As a result, gas phase reaction s are respectively performed so that the material is prepared. It is preferable that the raw material be in the form of a solid in the reactive sputtering method or the electron beam method.

Rapid Cooling Method

In this case, any one of the following methods may be employed: a gun method comprising the steps of generating, while breaking a Mylar film, shock waves by helium gas, in which oxygen or hydrogen sulfide is mixed, so as to be sprayed to the transition metal or the transition metal compound melted with high frequency waves, and causing blown compound powder to impact against a cooling steel plate in the form of a slide disposed below so that the temperature is rapidly cooled; a method in which a molten bath is dispersed by spraying with inactive gas jet in which oxygen or hydrogen sulfide is mixed; and an atomization method in which molten bath-of the transition metal or the transition metal compound is sprayed in an atmosphere containing the group VIA element such as oxygen or group VIA element compound such as hydrogen sulfide as to be formed into powder. By mixing hydrogen gas into the inactive gas, hydrogen can be introduced into the product.

It is preferable that the rapid cooling rate be $10^1$ to $10^8$K, more preferably $10^2$ to $10_8$K.

The melting and heating furnace may be a crucible furnace, an induction furnace, an arc furnace or an electron beam furnace.

The method of causing the alkali to directly react with the transition metal is exemplified by a method in which metal such as vanadium is caused to react with molten alkali to prepare an oxide.

Conductor Core

When conductor powder is mixed at the time of preparing the compound of the transition metal and the group VIA element to cause the compound of the transition metal and the group VIA element to grow while using the conductor powder as the core, the collecting efficiency can be raised. Therefore, the introduction and discharge of lithium ions can be made easier, and therefore the battery capacity can be enlarged.

The conductor powder may be made of one or more types of materials selected from a group consisting of carbon, titanium, nickel, cobalt, iron, chrome, manganese, vanadium, platinum, palladium, copper, silver, gold, zinc, tin, indium, lead, tungsten and molybdenum. It is preferable to use one or more types of elements selected from a group consisting of carbon, titanium, nickel, cobalt, iron, chrome, manganese, vanadium and platinum.

The shape of the conductor powder is formed into one or more types of shapes selected from a group consisting of a spherical shape, a flake shape, a needle shape and a fiber shape. As a result, also the compound powder of the transition metal and the group VIA element can be formed into the spherical, flake, needle or fiber shape. Therefore, the efficiency of the electron movement between the positive pole activating material can be raised, and therefore the charging and discharging efficiency can be improved.

It is preferable that the diameter of the conductor powder be 10 Å to 100 μ when measured by an electron microscope, more preferably 10 Å to 10 μ.

Crushing of Positive Pole Activating Material

The prepared positive pole activating material must be crushed so as to have an adequate grain size if obtained positive pole activating material is in the form of a block.

It is preferable to crush the positive pole activating material by using, while combining, means selected from a group consisting of a compression crushing machine, a shearing crushing machine, an impact crushing machine, a roll mill, a roller mill, a high-speed rotational mill, a ball mill, a medium stirring mill, a jet mill, a mortar and a stamping mill.

Coating Film Made of Conductor

The prepared compound of the transition metal and the group VIA element is covered with a conductor thin film by chemical plating (electroless plating) or by evaporation. As a result of the foregoing process, the current collecting efficiency can be raised, the intercalation/deintercalation of lithium ion can be facilitated and the battery capacity can be enlarged.

The conductor thin film may be made of one or more types of materials selected from a group consisting of carbon, titanium, nickel, cobalt, iron, chrome, manganese, vanadium, platinum, palladium, copper, silver, gold, zinc, tin, indium, lead, tungsten and molybdenum. It is preferable to use one or more types of elements selected from a group consisting of carbon, titanium, nickel, cobalt, iron, chrome, manganese, vanadium and platinum.

The chemical plating method is a method in which metal ions are deoxidized by a deoxidizer such as formaldehyde to precipitate the metal film.

The evaporation is performed by any one of the following methods: a method in which vapor of metal is generated by electron beans or laser beams so as to be applied to the subject; a method in which a carbon or metal target is sputtered so as to be applied to the subject; a method in which hydrocarbon or organic solvent or an organic metal compound is decomposed by discharge or laser or heat so as to be applied to the subject. The decomposition of the hydrocarbon and the organic solvent enables a carbon film to be formed, while the decomposition o I the organic metal compound enables a metal film to be formed.

It is preferable that the thickness of the conductor film ranges from 50 Å to 1μ.

Lipophilic Treatment

The positive pole activating material is subjected to the lipophilic treatment in such a manner that the organic metal compound is immersed in a solution, in which an organic solvent is dissolved, and then it is dried.

It is preferable that the organic metal compound for use in the lipophilic treatment be an organic metal compound such as silane coupling material or organic titanate. If dilution is performed, the dilution concentration with respect to the solvent ranges from 0.05 to 2 wt %.

The silane coupling material is exemplified by vinyltrimethoxysilane, vinylethoxysilane, N-(2-aminoethyl)-3-aminopropylmethyl dimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxytrimethoxysilane, 3-mercaptotrimethoxysilane, and N-[2-(vinylbenzylamino) ethyl]-3-aminopropyltrimethoxysilane.

The organic titanate is exemplified by tetra-i-propoxytitanium, tetra-n-butoxytitanium, tetra-(2-ethylhexyloxy)titanium, tetrastearyloxytitanium, di-i-proxy-bis(acetylacetate)titanium, dihydroxy.bis(lactato)titanium, titanium-i-propoxyoctylene glycol, titanium stearate, propane dioxytitanbis (ethylacetoacetate), propanedioxytitanium (acetylacetonate) (ethylacetoacetate), oxotitanbis (monoammonium oxalate), tri-n-butoxytitanmonostearate, and titan polymer.

Analysis of Transition Metal and Group VIA Element
Measurement of Size of Crystal Grain The size of crystal grains was evaluated from the peak half width and the angle of diffraction of X-ray diffraction curve in accordance with the following Scherrer's Formula:

$$t = 0.9\lambda/B \cos \Theta_B \qquad \text{(Scherrer's Formula)}$$

where t: size of crystal grain

Θ: wave length of X-ray beam

B: peak half width $\lambda_B$: angle of diffraction

It is preferable that the average size of the crystal grain of the positive pole activating material which is the compound of the transition metal and the group VIA element for use in the secondary battery according to the present invention be 500 Å or less when calculated by using the foregoing Scherrer's Formula, more preferably 200 Å or less.

Observation of Crystal Structure

The crystal structure of the positive pole activating material and the group VIA element prepared by the method according to the present invention can be observed in such a manner that the waveform of the radial distribution function can be observed by X-ray diffraction, the diffraction pattern can be observed by reflecting high speed electron beam diffraction (RHEED) and the waveform of the X-ray diffraction curve can be observed.

The radial distribution function can be obtained by Fourier transforming the dispersion intensity of measured X-ray or neutron beam. The radial distribution function is expressed by the presence possibility of atoms with respect to an arbitrary atom or a function of the deviation distance from an average numerical density. If the specimen is made of amorphous material, a moderate peak curve can be obtained. If the specimen is crystal material, a discontinuous or sharp peak can be obtained.

The RHEED enables a halo pattern to be observed if the specimen is made of amorphous material, enables a ring pattern to be observed if the specimen is made of microcrystal material and enables a spot pattern to be observed if the specimen is made of a multi-crystal material.

The dispersion angle and the dispersion intensity obtainable in the X-ray small angle dispersion method also enables fluctuation of ununiform density peculiar to the amorphous material.

Further, the differential thermal analysis enables heat absorption or heat generation due to the structural relaxation or the crystallization structural change occurring to the temperature rise to be observed if the specimen is amorphous material. If a hydroxide group is present, heat absorption due to dehydration can be observed.

By using the foregoing means, the structure of the compound of the transition metal and the group VIA element prepared by the manufacturing method according to the present invention can be analyzed so that the amorphous structure, the microcrystal structure and the multi-crystal structure are confirmed.

Analysis of Hydrogen

The compound of the transition metal containing hydrogen and the group VIA Element is subjected to being qualitatively analyzed by SIMS (Secondary Ion Mass Spectrometry) analysis.

Manufacturing of Positive Pole

The positive pole is manufactured in such a manner that the bonding material, and conductive powder if necessary, is mixed with the powder of the compound of the transition metal and the group VIA element manufactured by the foregoing method, and then formed into the positive pole together with the collector. It is preferable that the foregoing forming process be performed in dry air from which water has sufficiently been removed, more particularly in an inactive gas atmosphere.

The conductive powder acts to enhance the electron conduction and facilitate the current collection because the active material, which is the compound of the-transition metal and the group VIA element, does not substantially have the electron conductivity.

The conductive powder may be carbon material, such as acetylene black, ketjen black or graphite powder, or metal, such as nickel, titanium, copper or stainless steel. It is preferable that the mixture ratio of the conductive powder with respect to the positive pole active material be 1 or less.

The bonding material bonds the positive pole active material powder to one another and prevents generation of cracks in the charge and discharge cycle to prevent the separation from the collector. The bonding material may be one or more types of resin which are stable against the organic solvent and which are selected from a group consisting of fluororesin, polyethylene, polypropylene and silicone resin. It is preferable that the foregoing resin be in the form of liquid or solution or have a low melting point. Further, it is preferable that the solvent be removed and the resin is crosslinked during the process of manufacturing the positive pole. As a result, the content of the bonding material in the positive pole can be lowered and the capacity of the battery can be improved. The liquid resin or the resin which can be dissolved in the solvent is exemplified by fluororesin having an ether bond and silicone resin. If the fluororesin having the ether bond is used, the concentration can be lowered when it is dissolved in a solvent. Therefore, the content in the positive pole can be lowered as much as possible and the porosity can be raised. Further, the state is very stable after crosslinking has been performed so that a satisfactory effect can be obtained upon the charge and discharge cycle.

It is also preferable that dehydration is performed with heat generated by microwaves and a vacuum dryer is used to dehydrate the positive pole after the positive pole has been formed.

It is preferable that the mixture ratio of the bonding material with respect to the positive active material be 0.1 or less.

EXAMPLES

Examples of the present invention will now be described. It should be toted that the present invention is not limited to the examples below.

Example 1-1

A flat type battery having a simple structure, exhibiting assembling easiness and having a cross-sectional structure schematically shown in FIG. 2 was assembled to evaluate the characteristics of the secondary battery while mainly evaluating the life against cycle operation.

First, a solution in which colloidal silica manufactured by Shokubai Kasei and subjected to hydrophobic treatment in an atmosphere of dry argon gas was dispersed in N,N-dimethylformamide was dehydrated by active alumina. Then, lithium metal foil to which titanium mesh collector 200 was pressed against the reverse side was immersed in the colloidal silica solution prepared by the foregoing method, and then dried at 120° C. so that a lithium negative pole 201 covered with silica was manufactured.

A positive pole activating material 203 was manufactured in such a manner that a mixture of dehydrated and electrolyzed manganese dioxide and lithium carbonate was heated so that a lithium-manganese composite oxide was prepared. Then, tetrafluoroethylene polymer powder was mixed, and then pressed against the titanium mesh as to be formed into a designed shape.

The electrolytic solution was obtained by dissolving, by 1 M (mol/l), lithium arsenate hexafluoride salt in an equally mixed solvent of propylene carbonate (PC) and dimethoxyethane (DME).

A separator 208 was formed in such a manner that a separator made of polypropylene and having small apertures was sandwiched by unwoven polypropylene sheets.

The assembling process was performed in such a manner that the separator 208 was placed between the negative pole 201 and the positive pole 203 followed by inserting them into a positive pole case 207 made of titanium clad stainless steel. Then, an electrolytic solution was injected followed by sealing the positive pole case 207 with a negative cap 206 made of titanium clad stainless steel and an insulating packing 210 made of fluororubber so that a secondary battery was manufactured.

Comparative Example 1-1

A lithium secondary battery was manufactured by a method similar to Example 1-1 except for excluding the surface covering treatment using the metal lithium foil performed in Example 1-1.

Example 1-2

A battery similar to that according to Example 1-1 was manufactured.

The preparation of the materials and assembly were performed in an atmosphere of dry argon similarly to Example 1-1.

First, aluminum trichloride and phosphoric acid were allowed to react with each other in ethyl alcohol, and gradually heated to 100° C. so that glass-form aluminum phosphate was obtained. Then, it was dispersed in n-hexane so that a film forming solution was prepared. The film forming solution was applied to a lithium metal foil to which the titanium mesh collector was pressed. Then, a film was formed at 120° C. Then, similar processes to those according to Example 1-1 were performed so that a lithium battery was manufactured.

Example 1-3

A battery similar to that according to Example 1-1 was manufactured.

The preparation of the materials and assembly were performed in an atmosphere of dry argon similarly to Example 1-1.

First, acetic acid and water were added to an ethyl alcohol solution of tetrabutoxytitanium to be hydrolyzed. Then, diethylamine was added so that colloidal titanium oxide was formed. Then, colloidal titanium oxide was dissolved in a xylene solution of polyethylene so that a film forming solution was prepared. The film forming solution was applied to the lithium metal foil to which the stainless mesh collector was pressed followed by drying it at 1000° C. Then, electron beams were applied to crosslink the polyethylene so that a film was formed. Then, similar processes to those according to Example 1-1 were performed so that a lithium battery was manufactured.

Example 1-4

A battery similar to that according to Example 1-1 was manufactured.

The preparation of the materials and assembly were performed in an atmosphere of dry argon similarly to Example 1-1.

A toluene solution of triethylaluminum. was mixed with an isopropyl alcohol solution of tetrabutoxytitanium, followed by adding acetic acid and water so as to be hydrolyzed. Then, diethylamine was added so that colloidal titanium oxide-alumina was formed. Then, the colloidal titanium oxide-alumina was dispersed in a toluene solution in which acrylic resin and epoxy resin were dissolved so that the film forming solution was prepared. The film forming solution was applied to a lithium metal foil to which the stainless mesh collector was pressed, and then a film was formed at 80° C. Then, similar processes to those according to Example 1-1 were performed so that a lithium battery was manufactured.

Example 1-5

A battery similar to that according to Example 1-1 was manufactured.

The preparation of the materials and assembly were performed in an atmosphere of dry argon similarly to Example 1-1.

First, acetic acid and water were added to an ethyl alcohol solution of tetraethoxysilane so as to be hydrolyzed. Then, diethyl amine was added so that colloidal silica oxide was formed. Then, the colloidal silica was dispersed in an acetonitrile solution of polyethylene glycol, followed by adding azobisisobutyronitrile and arsenic hexafluoride lithium salt so that a film forming solution was prepared. The film forming Solution was Applied to the lithium metal foil to which the stainless mesh collector was pressed, followed by drying it at 100° C. so as to crosslink polyethylene glycol so that a film was formed. Then, similar processes to those according to Example 1-1 were performed so that a lithium battery was manufactured.

Example 1-6

A battery similar to that,according to Example 1-1 was manufactured.

First, felt-shape carbon was immersed in silica coating solution NT-G326, which was manufactured by Nissan Kagaku and to which boron tetrafluoride lithium salt was added, and taken cut from it. Then, it was hardened at 110° C. for 20 minutes and 300° C. for 30 minutes so that silica coating was performed. The obtained felt-shape carbon covered with the silica was used as the cathode and the lithium metal was used as the anode in an electrolytic solution in which arsenic hexafluoride lithium salt was, by 1 M (mol/l), dissolved in an equal-quantity mixture solvent of propylene carbonate and dimethoxyethane dehydrated sufficiently. As a result, lithium was introduced and allowed to adhere to the felt-shape carbon covered with silica so that the negative pole 201 was manufactured.

Then, similar processes to those according to Example 1-1 were performed so that a battery was manufactured. Example 1-7 A battery similar to that according to Example 1-1 was manufactured.

First, paste obtained by mixing zinc oxide powder, metal zinc powder and water glass was injected into foamed nickel (Celmet) manufactured by Sumitomo Denko. Then, the, material was hardened at 80° C. for 20 minutes and 200° C. for 30 minutes so that the negative pole 201 was formed.

Then, paste obtained by mixing, with nickel hydroxide, nickel powder, cobalt powder, carboxylic methyl cellulose serving as the bonding material, ethylene glycol and water was injected into the Celmet manufactured by Sumitomo Denko. Then, it was dried and pressed so that the positive pole 203 was formed.

The separator was formed in which a manner that polypropylene film subjected to hydrophilic treatment and having small apertures was sandwiched by unwoven polyamide sheets. The electrolytic solution was a 30 wt % potassium hydroxide solution. The assembly was performed similarly to Example 1-1 so that a nickel-zinc secondary battery was manufactured.

Comparative Example 1-2

A nickel-zinc secondary battery was manufactured by a method similar to Example 1-7 except that the negative pole was manufactured by mixing polyethylene serving as the bonding material and ethylene glycol in place of the water glass.

Example 1-8

A battery having a structure similar to that according to Example 1-1 was manufactured. However, a positive pole case having small apertures for receiving oxygen in air was employed.

The negative pole 01 was formed similarly to that according to Example 1-7.

The positive pole 203 was formed in such a manner that the positive catalyzer layer was formed by adding manganese dioxide to active carbon, and a water-repellant film made of polytetrafluoroethylene and cellulose-type diffusion paper were stacked on the positive catalyzer layer.

The separator 208 comprises a cellophane film, while the electrolytic solation comprises a 30 wt % potassium hydroxide solution.

The battery was assembled in such a manner that the separator 208 was held between the negative pole 201 and the positive pole 203, followed by inserting them into the positive pole case 207 having small apertures for receiving oxygen in air and made of titanium clad stainless steel. Then the electrolytic solution was injected, and sealing was performed by the negative cap 206 made of the titanium (lad stainless steel and the insulating packing 210 made of fluorine rubber so that the air-zinc secondary battery was manufactured.

Comparative Example 1-3

An air-zinc secondary battery was manufactured by a method similar to that according to Example 1-8 except that the negative pole according to Comparative Example 1-2 was used.

Evaluation of Performance of Secondary Battery

The performance of lithium secondary batteries according to Examples 1-1 to 1-6 and Comparative Example 1-1, the nickel-zinc secondary battery according to Example 1-7 and Comparative Example 1-2, and the air-zinc secondary battery according to Example 1-8 and Comparative Example 1-3 was evaluated. The evaluation was performed by a charge and discharge cycle test under the following conditions with respect to the cycle life of the batteries according to Comparative Examples 1-1, 1-2 and 1-3. The conditions for the cycle test were made as follows: the charge and discharge was performed by 0.2 C (electric current which was 0.2 times capacity/time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less.

The cycle life of each battery with respect to the cycle life of the battery according to Comparative Example 1-1 which was made to be 1 was as shown in Table 1.

As can be understood from the results of comparisons made between Examples 1-1 to 1-6 and Comparative Example 1-1, between Example 1-7 and Comparative Example 1-2 and between Example 1-8 and Comparative Example 1-3, the cycle life can considerably be lengthened due to use of the foil made of the negative pole activating material according to the present invention and arranged in such a manner that the surface is covered with the film having an inorganic glass structure through which lithium ions can be passed.

TABLE 1

| Secondary Battery Manufactured | | Cycle Life according to the present invention Cycle Life according to Comparative Example |
|---|---|---|
| Example | Comparative Example | |
| Example 1-1 | Comparative Example 1-1 | 2.5 |
| Example 1-2 | Comparative Example 1-1 | 2.0 |
| Example 1-3 | Comparative Example 1-1 | 1.5 |
| Example 1-4 | Comparative Example 1-1 | 1.5 |
| Example 1-5 | Comparative Example 1-1 | 3.0 |
| Example 1-6 | Comparative Example | 3.4 |
| Example 1-7 | Comparative Example 1-1 | 1.5 |
| Example 1-8 | Comparative Example 1-3 | 2.0 |

Example 2-1

A flat battery which had a simple structure, which could be assembled simply and which had a cross-sectional shape schematically shown in FIG. 2 was assembled to evaluate the characteristics of the secondary battery while evaluating the cycle life.

First, a peroxide benzoyl was, in an atmosphere of dry argon gas, dissolved in a toluene solution of poly (2-vinyl naphthalene) manufactured by Aldrich Chemical Company, Inc. Then, a lithium metal foil to which the stainless mesh collector 200 was pressed from the reverse side was immersed in it. Then, heat treatment at 100° C. was performed so that a lithium pole 201 covered with the poly (2-vinyl naphthalene) was manufactured.

The positive pole Activating material 203 comprised a lithium-manganese composite oxide prepared by heat treatment subjected to a mixture of dehydrated electrolytic manganese dioxide and lithium carbonate and a graphite mixture. Then, tetrafluoroethylene polymer powder was mixed and then pressed against a titanium mesh so as to be formed.

The electrolytic solution was prepared by dissolving, by 1 M (mol/l) arsenate hexafluoride lithium salt in an. equal-quantity mixture solvent of propylene carbonate (PC) and dimethoxyethane (DME).

The separator 208 was formed by sandwiching a separator made of propylene and having small apertures by unwoven polypropylene sheets.

Comparative Example 2-1

A lithium secondary battery was manufactured by a method similar to Example 2-1 except that the metal lithium foil surface covering treatment according to Example 2-1 was omitted Example 2-2

A battery similar to that according to Example 2-1 was manufactured.

The preparation of materials and assembling of the battery were performed in an atmosphere of dry argon similarly to Example 2-1.

First, 0.03 M azobisisobutyronitrile was added to a 5 M tetrahydrofuran solution of 9-vinyl anthracene, following by performing polymerization at 45° C. so that a polymer solution was obtained. Then, the polymer solution was applied to lithium metal foil to which a titanium mesh collector was pressed followed by drying the polymer solution. Then, ultraviolet rays were applied so that a lithium pole covered with the polyvinyl anthracene film was manufactured. Then, similar processes to those according to Example 2-1 were performed so that the lithium secondary battery was manufactured.

Example 2-3

A battery similar to that,according to Example 2-1 was manufactured.

The preparation of materials and assembling of the battery were performed in an atmosphere of dry argon similarly to Example 2-1.

First, 9, 10-anthracene dipropionic acid and ethylene glycol of the same mol and a small quantity of zinc acetate were injected into a reaction chamber followed by dehydrating and condensing them at 200° C. in an argon gas flow. Then, azobisisobutyronitrile was added, and the lithium metal foil to which a stainless steel mesh collector was pressed was immersed followed by taking out it. Then, it was heated to 100° C. so that a film was formed on the surface of lithium. Then, similar processes to those according to Example 2-1 were performed so that the lithium secondary battery was manufactured.

Example 2-4

A battery similar to that according to Example 2-1 was manufactured.

The preparation of materials and assembling of the battery were performed in an atmosphere of dry argon similarly to Example 2-1.

Tantalum pentachloride was dissolved in toluene at 80° C., and a toluene solution of 5, 12-bits (phenylethynyl) naphthalene was added followed by polymerizing them at 80° C. An obtained polymer was cleaned with methyl alcohol, dried and again dissolved in toluene so that a film forming solution was prepared. Then, a lithium metal foil to which a stainless steel mesh collector was pressed was immersed, followed by raising it and drying the same. Then, electron beams were Applied to crosslink the material so that a film was formed on the surface of lithium. Then, similar processes to those according to Example 2-1 were performed so that the lithium secondary battery was manufactured.

Example 2-5

A lithium secondary battery similar to that according to Example 2-1 was manufactured except that peroxide benzoyl was dissolved in a toluene solution of poly (2-vinyl naphthalene), and then arsenate hexafluoride lithium salt was added so that the film forming solution was prepared.

Example 2-6

A battery similar to that according to Example 2-1 was manufactured.

The preparation of materials and assembling of the battery were performed in an atmosphere of dry argon similarly to Example 2-1.

Felt-form carbon, which had been dehydrated and dried was immersed in lithium dissolved in a stainless container, followed by cooling the same so that felt-form carbon was manufactured. Then, it was immersed in a toluene solution of poly (2-vinyl naphthalene) to which azobisisobutyronitrile was added, followed by raising the felt carbon. It was then dried at 80° C., irradiated with ultraviolet rays to be crosslinked so that the negative pole 201 was manufactured. Then, similar processes to those according to Example 2-1 were performed so that the lithium secondary battery was manufactured.

Evaluation of Performance of Lithium Secondary Battery

The performance of lithium secondary batteries according to Examples 2-1 to 2-5 and Comparative Example 2-1 was evaluated. The evaluation was performed by a charge and discharge cycle test under the following conditions with respect to the cycle life of the batteries according to Comparative Example 2-1. The conditions for the cycle test were made as follows: the charge and discharge was performed by 0.2 C (electric current which was 0.2 times capacity/time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less.

The cycle life of each battery with respect to the cycle life of the battery according to Comparative Example 1-1 which was made to be 1 was as shown in Table 2.

As can be understood from the results of comparisons made between Examples 2-1 to 2-5 and Comparative Example 2-1, the cycle life can considerably be lengthened due to use of the negative pole comprising the lithium foil covered with the polymer of the derivative of the aromatic hydrocarbon compound according to the present invention.

TABLE 2

| Manufactured Lithium Battery | Cycle Life of Example Cycle Life of Comparative Example |
| --- | --- |
| Comparative Example 2-1 | 1.0 |
| Example 2- | 3.0 |
| Example 2-2 | 1.5 |
| Example 2-3 | 2.0 |
| Example 2-4 | 3.0 |
| Example 2-5 | 3.5 |
| Example 2-6 | 3.7 |

Example 3-1

A flat battery which had a simple structure, which could be assembled simply and which had a cross-sectional shape schematically shown in FIG. 2 was assembled to evaluate the characteristics of the secondary battery while evaluating the cycle life.

First, a titanium mesh collector 200 was pressed from the reverse side of the lithium metal foil in an atmosphere of dry argon gas. Then, the lithium metal foil was immersed in a dioxane solution of tetrabutoxytitanium, followed by drying it so that the lithium pole 201 having a film formed as described above was manufactured.

The positive pole activating material 203 was prepared in such a manner that a mixture of a dehydrated and electrolyzed manganese dioxide and a lithium carbonate were heated so that a lithium-manganese composite oxide was prepared. Then, tetrafluoroethylene polymer powder was mixed, and then it was pressed against a titanium mesh so as to be formed as designed.

The electrolytic solution was prepared in such a manner that arsenate hexafluoride lithium salt, by 1 M (mol/l), was dissolved in an equal quantity mixture solvent of propylene carbonate (PC) and dimethoxyethane (DME).

The separator 208 was manufactured in such a manner that a propylene separator having small apertures was sandwiched by unwoven polypropylene sheets.

Comparative Example 3-1

A battery similar to that according to Example 31 was manufactured except that the metal lithium foil surface treatment was omitted.

Example 3-2

A battery similar to that according to Example 31 was manufactured.

The preparation of materials and assembling of the battery were performed in an atmosphere of dry argon similarly to Example 31. A solution in which peroxide benzoyl was added to a hexane solution of Tirano Coat (polytitanocarbosilane) manufactured by Ube Kosan was applied to a lithium metal foil to which a titan mesh collector was pressed, followed by drying it. Then, it wad heated to 80° C., and then heated to 150° C. so that a lithium pole having a Tirano Coat film formed thereon was manufactured.

Then, similar processes to those according to Example 3-1 were performed so that the lithium secondary battery was manufactured.

Example 3-3

A battery similar to that according to Example 3-1 was manufactured.

The preparation of materials and assembling of the battery were performed in an atmosphere of dry argon similarly to Example 3-1.

First, 2,4,6-trimethyl-tris (3,3,3-trifluoropropyl) cyclotrisiloxane was heated to 76° C. in an argon gas. Then, calcium silate catalyzer was added and polymerization was performed so that a polymer was obtained. Then, peroxide benzoyl was added to the polymer, and then a lithium metal foil to which the stainless steel mesh collector was pressed was immersed in the solution, and rayed from the solution. Then, heat treatment at 100° C. was performed so that a lithium pole having a polysiloxane film formed thereon was manufactured.

Then, similar processes to those according to Example 3-1 were performed so that the lithium secondary battery was manufactured.

Example 3-4

A battery similar to that according to Example 3-1 was manufactured.

The preparation of materials and assembling of the battery were performed in an atmosphere of dry argon similarly to Example 3-1.

First, azobisisobutyronitrile was added to tetramethyldivinyldisiloxane, and then a lithium metal foil to which a stainless steel mesh collector was pressed was immersed, followed by raising it. Then, ultraviolet rays were applied so that a lithium pole covered with the polysiloxane film was manufactured.

Then, similar processes to those according to Example 3-1 were performed so that the lithium secondary battery was manufactured.

Example 3-5

A battery similar to that according to Example 3-1 was manufactured.

The preparation of materials and assembling of the battery were performed in an atmosphere of dry argon similarly to Example 3-1.

A lithium secondary battery was manufactured similarly to Example 3-2 except that lithium was immersed in a solution in which arsenate hexafluoride lithium salt was added to a solution in which peroxide benzoyl was added to a hexane solution of Tirano Coat (polytitanocarbosilane) manufactured by Ube Kosan.

Evaluation of Performance of Lithium Secondary Battery

The performance of lithium secondary batteries according to Examples 3-1 to 3-5 and Comparative Example 3-1 was evaluated. The evaluation was performed by a charge and discharge cycle test under the following conditions with respect to the cycle life of the batteries according to Comparative Example 2-1. The conditions for the cycle test were made as follows: the charge and discharge was performed by 0.2 C (electric current which was 0.2 time capacity/time), pause for 30 minutes and a cutoff voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less.

The cycle life Of Each battery with respect to the cycle life of the battery according to Comparative Example 1-1 which was made to be 1 was as shown in Table 3.

As can be understood from the results of comparisons made between Examples 3-1 to 3-5 and Comparative Example 3-1, the cycle life can considerably be lengthened due to use of the negative pole comprising the lithium foil covered with the organic metal compound according to the present invention.

TABLE 3

| Manufactured Lithium Battery | Cycle Life of Example Cycle Life of Comparative Example |
| --- | --- |
| Comparative Example 3-1 | 1.0 |
| Example 3-1 | 3.0 |
| Example 3-2 | 2.5 |
| Example 3-3 | 1.5 |
| Example 3-4 | 2.0 |
| Example 3-5 | 3.0 |

Example 4-1

A flat battery which had a simple structure, which could be assembled simply and which had a cross-sectional shape schematically shown in FIG. 2 was assembled to evaluate the characteristics of the secondary battery while evaluating the cycle life.

First, a titanium mesh collector 200 was pressed against the lithium metal foil from the reverse side in an atmosphere of dry argon. Then, the lithium metal foil was immersed in teflon AF solution which was a copolymer of tetrafluoroethylene and 2,2-bistrifluoromethyl-4,5 -difluoro-1,3 -dioxysol and which was manufactured by Dupont. As a result, the lithium negative pole 201 covered with amorphous fluororesin was manufactured. The positive pole activating material 203 comprised a lithium-manganese composite oxide prepared by heating a mixture of dehydrated and electrolyzed manganese dioxide and lithium carbonate and a mixture of graphite. Then, tetrafluoroethylene polymer powder was mixed, and pressed against the titanium mesh as to be formed as designed. The electrolytic solution was prepared by dissolving, by 1 M (mol/l), arsenate hexafluoride lithium salt in an equal quantity mixture solvent of propylene carbonate (PC) and dimethoxyethane (DME). The separator 208 was manufactured in such a manner that a propylene separator having small apertures was sandwiched by unwoven polypropylene sheets. The battery was assembled in such a manner that the separator 208 was held between the negative pole 201 and the positive pole 203, followed by inserting them into a positive pole case 207 made of titanium clad stainless steel, followed by injecting the electrolytic solution. Then, the negative pole cap 206 made of the titanium clad stainless steel and the insulating packing 210 made of fluorine rubber were used for sealing so that the lithium secondary battery was manufactured.

Comparative Example 4-1

A lithium secondary battery was manufactured under the same conditions are those according to Example 4-1 except that the metal lithium foil surface covering was omitted.

Example 4-2

A battery similar to that according to Example 4-1 was manufactured.

The preparation of materials and assembling of the battery were performed in an atmosphere of dry argon similarly to Example 4-1. The lithium metal foil to which a titanium mesh collector was pressed was inserted into a chamber of a sputtering apparatus, and then retained gas was exhausted to a vacuum level of $5 \times 10^{-6}$ Torr. Then, argon gas was allowed to flow to control the internal pressure to $3 \times 10^{-3}$ Torr, followed by performing, RF discharge to generate plasma for use in sputtering using Neoflon PFA which was a copolymer of tetrafluoroethylene and perfluoro-alkylvinyl ether and manufactured by Daikin as a target. As a result, a lithium pole having a film formed thereon was manufactured. Then, similar processes to those according to Example 4-1 were performed so that the lithium secondary battery was manufactured.

Example 4-3

A battery similar to that according to Example 2-1 was manufactured.

The preparation of materials and assembling of the battery were performed in an atmosphere of dry argon similarly to Example 4-1. The lithium metal foil to which a stainless steel mesh collector was pressed was inserted into a chamber of an RF (Radio Frequency) plasma CVD apparatus, and then the retained gas was exhausted to realize a vacuum level of $2 \times 10^{-6}$ Torr. Then, vinylidene fluoride was introduced into the chamber, and isobutyl vinyl ether was introduced into the chamber while using hydrogen gas as the carrier gas. While controlling the internal pressure to 1 Torr, RF discharge was caused to take place so that a plasma polymer film was formed on the surface of lithium. Then, similar processes to those according to Example 41 were performed so that the lithium secondary battery was manufactured.

Example 4-4

A battery similar to that according to Example 4-1 was manufactured.

The preparation of materials and assembling of the battery were performed in an atmosphere of dry argon similarly to Example 4-1. A lithium secondary battery was manufactured similarly to Example 4-1 except that the titanium mesh collector was pressed from the reverse side, and then it was immersed in a xylene solution of Lumiflon which was a copolymer of tetrafluoroethylene and non-fluorine-type vinyl ether, which was manufactured by Asahi Glass and to which isocyanate and graphite powder were added. Then, it was dried at 140° C. for 10 minutes so that the lithium pole covered with the amorphous fluororesin was manufactured.

Example 4-5

A battery similar to that according to Example 4-1 was manufactured.

The preparation of materials and assembling of the battery were performed in an atmosphere of dry argon similarly to Example 4-1. First, coating fluororesin was prepared. An autoclave having a stirring machine received 200 parts of pure water, 40 parts of vinyl fluoride, 60 parts of ethylvinyl ether, 0.6 parts of perfluorocarboxylic acid, 0.2 parts of persulfuric ammonium and 3 parts of water. Then, the solution was heated to 46° C. while maintaining the pressure at 42.5 atmosphere to perform polymerization for 8 hours. An obtained polymer was cleaned with hot methanol, followed by drying it. Then, it was dissolved in tetrahydrofuran dehydrated sufficiently, followed by adding peroxide benzoyl. Then, the lithium metal foil to which a stainless steel mesh collector was pressed was immersed followed by raising it. Then, it was heated to 100° C. so that a lithium pole covered with fluororesin was manufactured.

Then, similar processes to those according to Example 4-1 were performed so that the lithium secondary battery was manufactured.

Example 4-6

A battery similar to that according to Example 2-1 was manufactured.

First, a lithium pole was manufactured. The lithium metal foil to which a stainless steel mesh collector was pressed was injected into a vacuum chamber of a parallel and flat type plasma CVD apparatus to which a 13.56 MHz high frequency power source was connected in such a manner that it was placed perpendicular to the parallel and flat electrode. Then, retained gas was exhausted to realize a vacuum level of $10^{-5}$ Torr. Then, 10 sccm of tetrafluoroethylene, 2 sccm of ethylene, 2 sccm of hydrogen, 1 sccm of helium and 1 sccm of oxygen were introduced into the vacuum chamber, which was a reaction chamber, and then the internal pressure was maintained at 0.8 Torr. Then, 200 watts of high frequency power was supplied to the parallel and flat electrode so that a plasma polymer film of the fluororesin was formed on the surface of lithium. By using the lithium pole covered with the fluororesin prepared by the foregoing method, a lithium secondary battery was manufactured by the similar processes to those according to Example 4-1.

Evaluation of Performance of Lithium Secondary Battery

The performance of lithium secondary batteries according to Examples 4-1 to 4-6 and Comparative Example 4-1 was evaluated. The evaluation was performed by a charge and discharge cycle test under the following conditions with respect to the cycle life of the batteries according to Comparative Example 4-1. The conditions for the cycle test were made as follows: the charge and discharge was performed by 0.2 C (electric current which was 0.2 times capacity/time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated as quantity of the third discharge, and the cycle life was evaluated by the number of cycles when the battery capacity had deteriorated to 60% or less.

The cycle life of each battery with respect to the cycle life of the battery according to Comparative Example 4-1 which was made to be 1 was as shown in Table 4.

As can be understood from the results of comparisons made between Examples 4-1 to 4-6 and Comparative Example 4-1, the cycle life can considerably be lengthened due to use of the negative pole comprising the lithium foil covered with the fluororesin having the ether bond according to the present invention.

TABLE 4

| Manufactured Lithium Battery | Cycle Life of Example Cycle Life of Comparative Example |
|---|---|
| Comparative Example 4-1 | 1.0 |
| Example 4-1 | 3.5 |
| Example 4-2 | 1.5 |
| Example 4-3 | 2.0 |
| Example 4-4 | 3.0 |
| Example 4-5 | 2.5 |
| Example 4-6 | 1.5 |

Example 5-1

A flat battery which had a simple structure, which could be assembled simply and which had a cross-sectional shape schematically shown in FIG. 2 was assembled to evaluate the characteristics of the secondary battery while evaluating the cycle life.

In an atmosphere of dried argon gas, the titanium mesh collecting pole 200 was pressed to the reverse side of the lithium metal foil. Then, the lithium metal foil was immersed in a tetrahydrofuran solution of Cryptofix 222 B Polymer which was a large ring compound polymer and which was manufactured by E. Merch. Then, it was dried and then heated to 150° C. so that a lithium pole 201 covered with the large ring compound polymer was manufactured.

The positive pole activating material comprised a lithium-manganese composite oxide prepared by heat treatment applied to a mixture of dehydrated and electrolyzed manganese dioxide and lithium carbonate and a mixture of graphite. Then, tetrafluoroethylene polymer was mixed, and then pressed against the stainless steel mesh so as to be formed as designed.

The separator 208 Was manufactured in such a manner that a propylene separator having small apertures was sandwiched by unwoven polypropylene sheets.

The electrolytic solution was prepared by dissolving, by 1 M (mol/l), arsenate hexafluoride lithium salt in an equal quantity mixture solvent of propylene carbonate (PC) and dimethoxyethane (DME).

Assembling of the battery were performed similarly to Example 1-1.

Comparative Example 5-1

A lithium secondary battery was manufactured similarly to Example 5-1 except that the metal lithium foil surface covering was omitted.

Example 5-2

A battery similar to that according to Example 5-1 was manufactured.

The preparation of materials and assembling of the battery were performed in an atmosphere of dry argon similarly to Example 2-1. A lithium metal foil, to which a titanium mash collector was pressed, was placed in acetonyl solution in which 0.1 M of a monomer of benzo-15-crown-5 and 0.2 M of boron tetrafluoride tetrabutylammonium salt so as to be electrolyzed and polymerized with a voltage level of 3 V while using a platinum electrode as the cathode electrode. As a result, a lithium pole having a large ring compound polymer film formed thereon was manufactured.

Then, similar processes to those according to Example 5-1 were performed so that the lithium secondary battery was manufactured.

Example 5-3

A battery similar to that according to Example 5-1 was manufactured.

The preparation of materials and assembling of the battery were performed in an atmosphere of dry argon similarly to Example 5-1. First, (+) 18 crown -6-tetracarbocylic acid (0.4 mol), 1,4 butanediol (0.8 mol), tetratitanate-n-butylester (0.08 g) and butylhydroxytinoxide (0.03 g) were mixed. Then, the temperature was maintained at 220° C., and distillation was performed for 60 minutes to remove products such as water. Then, the product and titanate tetra-n-butylester (0.02 g) were injected into an autoclave, and the pressure was lowered and heating to 250° C. was performed for 22 hours so that a polymer was obtained.

Toluenediisocyanate was added to the thus-obtained polymer, and then the lithium metal foil, to which a titanium mesh collector was pressed, was immersed. Then, the lithium metal foil was raised, and then it was heated, and dried at 80° C. so that the surface of the lithium foil was covered with a large ring compound polymer, Then, similar processes to those according to Example 5-1 were performed so that the lithium secondary battery was manufactured.

Example 5-4

A battery similar to that according to Example 2-1 was manufactured.

The preparation of materials and assembling of the battery were performed in an atmosphere of dry argon similarly to Example 5-1. A lithium metal foil, to which a titanium steel mesh collector was pressed, was immersed in a toluene solution of 3,3'-dibenzyl 1, 4,8,11 -tetraoxacyclotetradecane to which azobisisobutyronitrile and arsenate hexafluoride lithium salt were added. Then, the lithium metal was raised from the solution, and then ultraviolet rays were applied to crosslinking so that the surface of the lithium metal foil was covered.

Then, similar processes to those according to Example 5-1 were performed so that the lithium secondary battery was manufactured.

Example 5-5

A battery similar to that according to Example 2-1 was manufactured.

The preparation of materials and assembling of the battery were performed in an atmosphere of dry argon similarly to Example 5-1. Styrene and 4,7,13,16,21,24-hexaoxa-1,10-diazobicyclo[8.8.8]hexacosane were dissolved in a tetrahydrofuran solution of naphthalene degasified and dehydrated sufficiently. Then, graphite powder was mixed. The lithium metal foil, to which a titanium mesh collector was pressed, was immersed to perform polymerization reaction, followed by drying so as to be hardened. As a result, the surface of lithium was covered with a large ring compound polymer.

Then, similar processes to those according to Example 5-1 were performed so that the lithium secondary battery was manufactured.

Example 5-6

A battery similar to that according to Example 5-1 was manufactured.

The preparation of materials and assembling of the battery were performed in an atmosphere of dry air.

A porous nickel sheet manufactured by Osaka Gas was dehydrated and dried as to be used as an anode, while a platinum electrode was used as a cathode so that electrolytic polymerization was performed in an acetonitrile solution in which 0.1 M of benzo-18-crown-6 and 0.2 M or boron tetrafluoride tetrabutylammonia salt were dissolved. As a result, a porous nickel sheet covered with a crown ether polymer was manufactured. Then, an electrolytic solution was prepared in such a manner that 1M of boron tetrafluoride lithium salt was dissolved in an equal quantity mixture solvent of propylene carbonate and dimethoxyethane. An obtained porous nickel sheet thus covered was used as a cathode and lithium metal was used as an anode. Then, lithium was inserted between the porous nickel sheet cover and the nickel as to be allowed to adhere so that the negative pole 203 was formed.

Then, similar processes to those according to Example 5-1 were performed so that the lithium secondary battery was manufactured.

Example 5-7

A nickel zinc battery having a similar structure as that of the battery according to Example 5-1 was manufactured.

First, paste was prepared by mixing polyvinyl alcohol, phthalocyanine zinc, zinc oxide powder, zinc powder, formaldehyde, formic acid and water. The paste was applied to a nickel mesh and heated so that the negative pole 201 was manufactured.

Then, paste obtained by mixing nickel powder, cobalt powder, carboxylic cellulose serving as a bonding material, ethylene glycol and water with nickel hydroxide was injected into foamed nickel (Celmet) manufactured by Sumitomo Denko. Then, it was dried and pressed so that a positive pole 203 was formed.

The separator 208 was formed in such a manner that a polyamide film subjected to hydrophilic treatment and having small apertures was sandwiched by unwoven polyamide sheets. The electrolytic solution was a 30 wt % potassium hydroxide solution. The assembly was performed similarly to Example 5-1 so that a nickel-zinc secondary battery was manufactured.

Comparative Example 5-2

A nickel-zinc secondary battery was manufactured except that the negative pole 201 was formed by applying paste obtained by mixing zinc oxide powder, zinc powder, polyvinyl alcohol and ethylene glycol to the nickel mesh followed by drying.

Example 5-8

A battery having a structure similar to that according to Example 5-1 was manufactured. However, a positive pole case having small apertures for receiving oxygen in air was used.

The negative pole 201 was manufactured in such a manner that paste was applied to a nickel mesh followed by heating to dry the negative pole 201, the paste being obtained by mixing zinc oxide powder, zinc powder, polyacrylamide, water, formaldehyde, lithium hydroxide and phthalocyanine zinc.

The positive pole 203 was formed in such a manner that a positive catalyzer layer was formed by adding manganese dioxide to active carbon, and a water-repellant film made of polytetrafluoroethylene and cellulose dispersed paper were stacked on the positive catalyzer layer.

The separator 209 comprised a cellophane film and the electrolytic solution comprised 30 wt % solution of potassium hydroxide.

Assembling was performed in such a manner that the separator 208 was held between the negative pole 201 and the positive pole 203, and they were inserted into the positive pole case 207 having small apertures for receiving oxygen in air and made of titanium clad stainless steel. Then, the electrolytic solution was injected and sealing was performed by using the negative pole cap 206 made of titanium clad stainless steel and the insulating packing made of fluorine rubber. As a result, an air-zinc secondary battery was manufactured.

Comparative Example 5-3

An air-zinc secondary battery was manufactured similarly to Example 5-8 except that the negative pole according to Comparative Example 5-2 was used.

Evaluation of Performance of Lithium Secondary Battery

The performance of lithium secondary batteries according to Examples 5-1 to 5-5 and Comparative Example 5-1 was evaluated. The evaluation was performed by a charge and discharge cycle test under the following conditions with respect to the cycle life of the batteries according to Comparative Example 1. The conditions for the cycle test were made as follows: the charge and discharge was performed by 0.2 C (electric current which was 0.2 times capacity/time), pause for 30 minutes and a cutoff voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less.

The cycle life of each battery with respect to the cycle life of the battery according to Comparative Example 5-1 which was made to be 1 was as shown in Table 2.

As can be understood from the results of comparisons made between Examples 5-1 to 5-6 and Comparative Example 2-1 and those between Example 5-7 and Comparative Example 5-3, the cycle life can considerably be lengthened due to use of the negative pole comprising the lithium or zinc covered with the large ring compound polymer according to the present invention.

TABLE 5

| Lithium Battery Manufactured | | Cycle Life of Example Cycle Life of Comparative Example |
|---|---|---|
| Example | Comparative Example | |
| Example 5-1 | Comparative Example 5-1 | 3.0 |
| Example 5-2 | Comparative Example 5-1 | 2.5 |
| Example 5-3 | Comparative Example 5-1 | 3.5 |
| Example 5-4 | Comparative Example 5-1 | 4.0 |
| Example 5-5 | Comparative Example 5-1 | 3.0 |
| Example 5-6 | Comparative Example 5-1 | 4.2 |
| Example 5-7 | Comparative Example 5-2 | 2.8 |
| Example 5-8 | Comparative Example 5-2 | 2.7 |

Example 6-1

A flat battery which had a simple structure, which could be assembled simply and which had a cross-sectional shape schematically shown in FIG. 2 was assembled to evaluate the characteristics of the secondary battery while evaluating the cycle life.

First, the titanium collector 200 was pressed against the reverse side of the lithium metal foil in an atmosphere of dry argon gas, and then the lithium metal foil was immersed in a toluene solution PPZ-U1001 manufactured by Idemitsu. Then, it was previously dried, and ultraviolet rays were applied so that the lithium pole 201 covered with phosphazene was manufactured.

The positive pole active material 204 was prepared in such a manner that a lithium-manganese composite oxide was prepared by heating a mixture of dehydrated and electrolyzed manganese dioxide and lithium carbonate. Then, tetrafluoroethylene polymer powder was mixed followed by pressing to a titanium mesh so as to be formed as designed.

The electrolytic solution was prepared by dissolving, by 1 M (mol/l), arsenate hexafluoride lithium salt in an equal quantity mixture solvent of propylene carbonate (PC) and dimethoxyethane (DME). The separator 208 was manufactured in such a manner that a propylene separator having small apertures was sandwiched by unwoven polypropylene sheets.

Comparative Example 6-1

A lithium secondary battery was manufactured similarly to Example 6-1 except that the surface covering of the metal lithium foil was omitted.

Comparative Example 6-2

A battery similar to that according to Example 6-1 was manufactured. The preparation of materials and assembling of the battery were performed in an atmosphere of dry argon similarly to Example 6-1. First, hexachlorotriphosphazene was repeatedly degasified, melted and solidified, and then it was heated to 250° C. as to be polymerized so that polydichlorophosphazene was obtained. Then, a tetrahydrofuran solution of aniline was added to a benzene solution of polychlorophosphazene, followed by heating and refluxed. Then, the solution was allowed to stand to remove aniline hydrochloride by filtering followed by again sedimenting it and drying it. Then, it was again dissolved in tetrahydrofuran so that a solution of poly [bis (phenylamino)phosphazene] was prepared. Then, the foregoing solution was applied to the lithium metal foil, to which a titanium mesh collector was pressed, followed by drying the solution. Then, ultraviolet rays were applied so that a lithium pole covered with polyphosphazene was manufactured. Then, similar processes to those according to Example 6-1 were performed so that the lithium secondary battery was manufactured.

Example 6-3

A battery similar to that according to Example 5-1 was manufactured. The preparation of materials and assembling of the battery were performed in an atmosphere of dry argon similarly to Example 6-1. First, a benzene solution of polydichlorophosphazene was, while being stirred, slowly dropped in a tetrahydrofuran solution of sodium alkoxide of trifluoroethanol, followed by,heating and refluxing it. Then, it was neutralized, filtered, cleaned with water and ethyl alcohol, and again sedimented with acetone and water, followed by drying. As a result, polybis (trifluoroethoxy) phosphazene was obtained. The acetone solution of the polyfluoroethoxyphosphazene was applied to the lithium metal foil, to which a stainless steel mesh collector was pressed. Then, it was dried and then irradiated with electron beams so that a lithium pole covered with polyphosphazene was manufactured. Then, similar processes to those according to Example 6-1 were performed so that the lithium secondary battery was manufactured.

Example 6-4

A battery similar to that according to Example 5-1 was manufactured. The preparation of materials and assembling of the battery were performed in an atmosphere of dry argon similarly to Example 6-1. First, sodium alkoxide of naphthalene ethanol was, in dioxane, prepared from naphthalene ethanol and sodium hydroxide. Then, tetra-n-butyl ammonia bromide was added to the sodium alkoxide, and then a dioxane solution of polydichlorophosphazene was added while being dripped. The thus-obtained mixed was subjected to a heating reactions at 80° C., and the solvent was somewhat removed. Then, it was again sedimented with tetrahydrofuran and water, and then it was refined, followed by Soxhlet-extracting it. As a result, polydiphenoxyphosphazene was obtained. Then, azobisisobutyronitrile was added to a tetrahydrofuran solution of the obtained polymer. Then, the lithium metal foil, to which a stainless steel mesh collector was pressed, was immersed and raised from it followed by drying it and subjecting to a heat treatment set to 80° C. As a result, a lithium pole covered with polyphosphazene was, manufactured. Then, similar processes to those according to Example 6-1 were performed so that the lithium secondary battery was manufactured.

Example 6-5

A battery similar to that according to Example 5-1 was manufactured. The preparation of materials and assembling of the battery were performed in an atmosphere of dry argon similarly to Example 6-1. A lithium secondary battery was manufactured similarly to Example 6-1 except that arsenate hexafluoride lithium salt was added to a toluene solution of PPZ-U1001 manufactured by Idemitsu, and then lithium was immersed in the thus-prepared solution.

Evaluation of Performance of Lithium Secondary Battery

The performance of lithium secondary batteries according to Examples 6-1 to 6-5 and Comparative Example 6-1 was evaluated. The evaluation was performed by a charge and discharge cycle test under the following conditions with respect to the cycle life of the batteries according to Comparative Example 6-1. The conditions for the cycle test were made as follows: the charge and discharge was performed by 0.2 C (electric current which was 0.2 times capacity/time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less. The cycle life of each battery with respect to the cycle life of the battery according to Comparative Example 6-1 which was made to be 1 as shown in Table 6. As can be understood from the results of comparisons made between Examples 6-1 to 6-5 and Comparative Example 6-1 the cycle life can considerably be lengthened due to use of the negative pole comprising the lithium or zinc covered with the large ring compound polymer according to the present invention.

TABLE 6

| Manufactured Lithium Battery | Cycle Life of Example Cycle Life of Comparative Example 2-1 |
| --- | --- |
| Comparative Example 6-1 | 1.0 |
| Example 6-1 | 2.0 |
| Example 6-2 | 1.5 |
| Example 6-3 | 2.0 |
| Example 6-4 | 3.0 |
| Example 6-5 | 2.5 |

Example 7-1

A flat battery which had a simple structure, which could be assembled simply and which had a cross sectional shape schematically shown in FIG. 2 was assembled. The preparation of materials and assembling of the battery were performed in an atmosphere of dry argon.

First, the titanium mesh collector 200 having a lead was pressed against the reverse side of the lithium metal foil in an atmosphere of dry argon. Then, it was immersed in a nitromethane solution of acetyl cellulose to which azobisisobutyronitrile and boron tetrafluoride lithium salt. Then, it was dried, and irradiated with ultraviolet rays so that a film was formed. As a result, the lithium negative pole 201 was manufactured.

The positive pole activating material was prepared in such a manner that a lithium-manganese oxide was prepared by mixing electrolyzed manganese dioxide and lithium carbonate at a ratio of 1:0.4 and by heating the mixture At 800° C. Then, ketjen black and Super Konak, which is a fluororesin paint manufactured by Nihon Yushi were mixed to the prepared lithium-manganese oxide. Then, it was pressed against a nickel mesh so as to be formed as designed followed by performing heat treatment set to 170° C. As a result, the positive pole 203 was manufactured.

The separator 208 was manufactured in such a manner that a porous layer-shape alumina film, an unwoven polypropylene sheet and polypropylene separator having small apertures were sandwiched.

The electrolytic solution was prepared by dissolving, by 1 M (mol/l), tetrafluoride borate lithium salt in an equal quantity mixture solvent of propylene carbonate (PC) and dimethoxyethane (DME).

The assembly was performed in such a manner that the negative pole 201, the positive pole 203 and the separator 208 were sandwiched so as to be inserted into the positive pole case 207 made of titanium clad stainless steel, and then the electrolytic solution was injected. Then, sealing was performed by the negative cap 206 made of the titanium clad stainless steel and the insulating packing 210 made of fluorine rubber so that a lithium secondary battery was manufactured.

Example 7-2

A battery similar to that according to Example 7-1 and shown in FIG. 2 was manufactured.

The preparation of materials and assembling of the battery were performed in an atmosphere of dry argon similarly to Example 7-1.

A lithium secondary battery was manufactured by a method similar to that according to Example 7-1.

First, the titanium mesh collector 200 having a lead was pressed against the reverse side of the lithium metal foil in an atmosphere of dry argon gas. Then, it was immersed in a tetrahydrofuran solution of a polyethylene oxide to which peroxide benzoyl was added, and then it was dried at 110° C., and ultra-violet rays were applied so that a film was formed. As a result, the lithium negative pole 201 was manufactured.

The positive pole activating material was prepared in such a manner that a lithium-manganese oxide was prepared by mixing electrolyzed manganese dioxide and lithium carbonate at a ratio of 1:0.4 and by heating the mixture at 800° C. Then, ketjen black and tetrafluoroethylene polymer powder were mixed with the prepared lithium-manganese oxide. Then, it was pressed against a nickel mesh so as to be formed as designed followed by performing heat treatment set to 250° C. As a result, the positive pole 203 was manufactured.

The separator 208 was manufactured by sandwiching an unwoven polypropylene sheet and a polypropylene separator having small apertures.

The electrolytic solution was prepared by dissolving, by 1 M (mol/l), tetrafluoride borate lithium salt in a solvent of propylene carbonate (PC).

Then, similar processes to those according to Example 7-1 were performed so that the lithium secondary battery was manufactured.

Example 7-3

A battery similar to that according to Example 7-1 and shown in FIG. 2 was manufactured.

The preparation of materials and assembling of the battery were performed in an atmosphere of dry argon similarly to Example 7-1.

First, the lithium surface film was manufactured in such a manner that lithium foil to which the nickel mesh collector 200 was pressed was placed in a sputtering apparatus. Then, a degree of vacuum of $1.5 \times 10^{-4}$ pascal was applied by lowering the pressure and by degasifying the inside of the sputtering apparatus. Then, argon gas was introduced at 5 sccm, and the internal pressure in the film forming chamber was maintained at $6 \times 10^{-1}$ pascal to perform sputtering while using polyether sulfone as a target so that the lithium negative pole 201 covered with polyether sulfone having a thickness of 500 Å was obtained.

Then, similar processes to those according to Example 7-2 were performed so that the lithium secondary battery was manufactured.

Example 7-4

A battery was manufactured under similar conditions as those according to Example 7-3 in that lithium foil to which the nickel mesh collector 200 was pressed was placed in a sputtering apparatus. Then, a degree of vacuum of $1.5 \times 10^{-4}$ pascal was applied by lowering the pressure and by degasifying the inside of the sputtering apparatus. Then, argon gas was introduced at 5 sccm, and the internal pressure in the film forming chamber was maintained at $6 \times 10^{-1}$ pascal to perform sputtering while using chitosan as a target so that the lithium negative pole 201 covered with chitosan having a thickness of 1000 Å was obtained.

Then, similar processes to those according to Example 7-2 were performed so that the lithium secondary battery was manufactured.

Example 7-5

A flat nickel-zinc secondary battery which had a simple structure, which could be assembled simply and which had a cross-sectional shape schematically shown in FIG. 2 was manufactured.

The negative pole was manufactured in such a manner that ethylene tetrafluoride polymer powder serving as a bonding material was added to a mixture of zinc powder and zinc oxide powder so as to be pressed against the two sides of a upper punching metal plate so that the negative pole was formed. The negative pole was immersed in an acetone-ethylalcohol solution of acetyl cellulose to which azobi-sisobutyronitrile was added, and then it was dried and heated to 110° C. Then, ultraviolet rays were applied so that a film was formed. As a result, the zinc negative pole 201 was manufactured.

The positive pole 203 was manufactured in such a manner that nickel hydroxide was impregnated in a sintered nickel pole plate and it was covered with an acetylcellulose film similarly to the negative pole.

The separator 208 was manufactured in such a manner that a hydrophilic unwoven nylon sheet and a nylon film having small apertures were sandwiched.

The electrolytic solution comprised 30 wt % potassium hydroxide water solution to which lithium hydroxide was added.

The battery was assembled similarly to Example 7-1.

Example 7-6

A flat nickel-zinc secondary battery which had a simple structure, which could be assembled simply and which had a cross-sectional shape schematically shown in FIG. 2 was manufactured under the same conditions as those according to Example 7-5 except that the formed zinc negative pole was placed in a sputtering apparatus, and the inside pressure was lowered to a degree of vacuum of $1.5 \times 10^{-4}$ pascal by lowering and degasifying the inside. Then, argon gas was introduced at 5 sccm, and the internal pressure ii the film forming chamber was maintained at 6×10$^{-1}$ pascal. Then, sputtering was performed while using collagen as a target so that a zinc negative pole covered with collagen having a thickness of 1000 Å was obtained.

The positive pole 203 was manufactured by impregnating nickel hydroxide into a sintered nickel pole plate.

Then, similar processes to those according to Example 2-1 were performed so that the nickel-zinc secondary battery was manufactured.

In order to evaluate the performance of the batteries according to the foregoing Examples, batteries according to Comparative Examples were manufactured.

Comparative Example 7-1

A lithium secondary battery was manufactured by a method similar to Example 7-2 except that the surface of the metal lithium foil was not covered.

Comparative Example 7-2

A nickel-zinc secondary battery was manufactured by a method similar to Example 7-6 except that the surface of the zinc negative pole was not covered.

Evaluation of Performance of Lithium Secondary Battery

The performance of lithium secondary batteries and nickel-zinc secondary batteries according to Examples and Comparative Examples was evaluated. The evaluation was performed by a charge and discharge cycle test under the following conditions with respect to the cycle life of the batteries according to Comparative Examples.

The conditions far the cycle test were made as follows: the charge and discharge was performed by 0.2 C (electric current which was 0.2 times capacity/ time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less.

The cycle life of batteries according to Examples of the present invention with respect to the cycle life of the batteries according to Comparative Examples which was made to be 1.0 was as shown in Table 7.

TABLE 7

| Lithium Battery Manufactured | | Cycle Life of Example |
|---|---|---|
| Example | Comparative Example | Cycle Life of Comparative Example |
| Example 7-1 | Comparative Example 7-1 | 3.6 |
| Example 7-2 | Comparative Example 7-1 | 1.7 |
| Example 5-3 | Comparative Example 7-1 | 1.3 |
| Example 7-4 | Comparative Example 7-1 | 1.6 |
| Example 7-5 | Comparative Example 7-2 | 1.8 |
| Example 7-6 | Comparative Example 7-2 | 1.4 |

As can be understood from the results of comparisons made between Examples 7-1 to 7-4 and Comparative Example 7-1 and those between Examples 7-5 and 7-6 and Comparative Example 7-2, the cycle life can considerably be lengthened due to use of the secondary battery according to the present invention.

Example 8

A battery which had a simple structure, which could be assembled simply and which had a cross-sectional shape schematically shown in FIG. 2 was manufactured.

Figure 6:
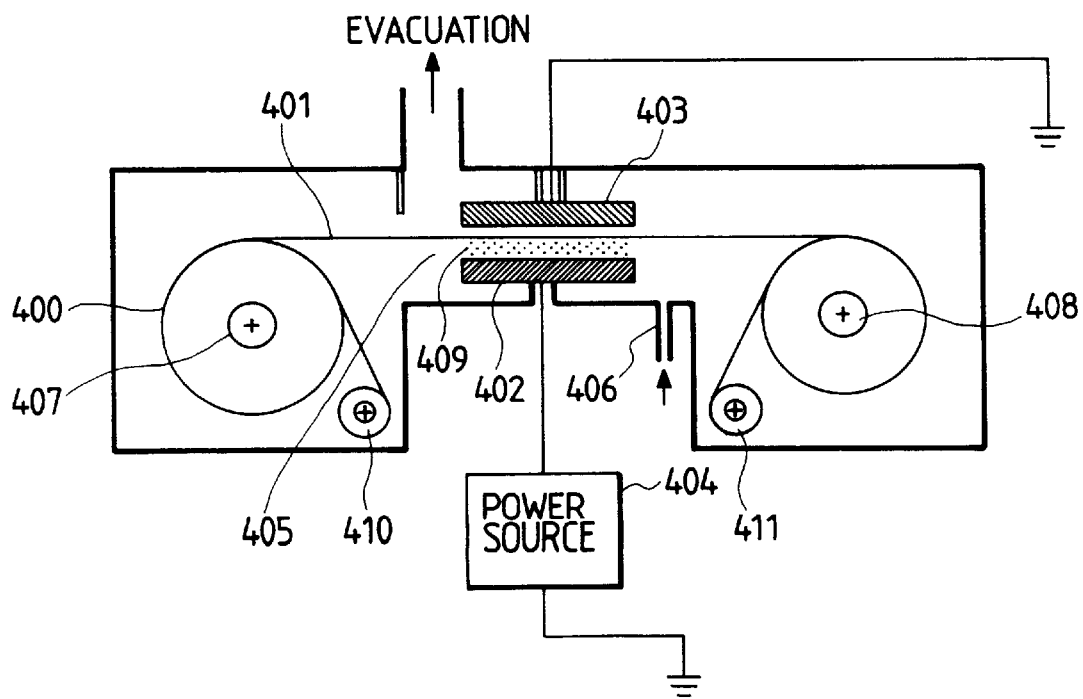
FIG. 6 is a schematic structural view which illustrates an apparatus for subjecting lithium for use in the secondary battery according to the present invention to surface treatment.

First, an RF (Radio Wave Frequency) discharge plasma processing apparatus having a structure schematically shown in FIG. 6 was used to apply surface treatment to a lithium negative pole. In an atmosphere of dry argon gas, a nickel mesh collector was pressed against the reverse side of the lithium metal foil. In order to protect the surface of lithium, a polyester film was interposed at the time of coiling them. The coil-shape lithium foil 400 was mounted on a conveyance roll 407 of the plasma processing apparatus, and then the retained gas was exhausted to realize a degree of vacuum of 2×10$^{-6}$ Torr. Then, 20 sccm of nitrogen gas and 10 sccm of argon gas were introduced to a plasma processing chamber 4(5 through a gas introduction pipe 406. While controlling the internal pressure in the plasma processing chamber to 0.5 Torr, waves having a high frequency of 13.56 MHz were supplied by 200 watts to cause discharge to take place. Then, a winding roll 408 was used to hold and take up the protection film comprising the polyester film so that the surface of lithium was plasma-treated. Then, the lithium foil subjected to the plasma treatment was cut so that a negative pole was manufactured. As the protection film to be interposed at the time of the winding operation in the plasma process, a separator for a battery may be used.

The positive pole activating material 203 was prepared in such a manner that a lithium-manganese oxide was prepared by mixing electrolyzed manganese dioxide and lithium carbonate at a ratio of 1:0.4 and by heating the mixture at 850° C. Then, graphite and tetrafluoroethylene polymer powder were mixed to the prepared lithium-manganese oxide. Then, it was pressed against a nickel mesh so as to be formed into a desired positive pole.

The electrolytic solution was prepared by dissolving, by 1 M (mol/l), tetrafluoride borate lithium salt in an equal quantity mixture solvent of propylene carbonate (PC) and dimethoxyethane (DME).

The separator 208 was manufactured in such a manner that a polypropylene separator having small apertures was sandwiched.by unwoven polypropylene sheets.

Example 9

A battery similar to that according to Example 8 and shown in FIG. 2 was manufactured.

The preparation of materials and assembling of the battery were performed in an atmosphere of dry argon similarly to Example 8.

A lithium secondary battery was manufactured by a method similar to that according to Example 8.

Figure 7:
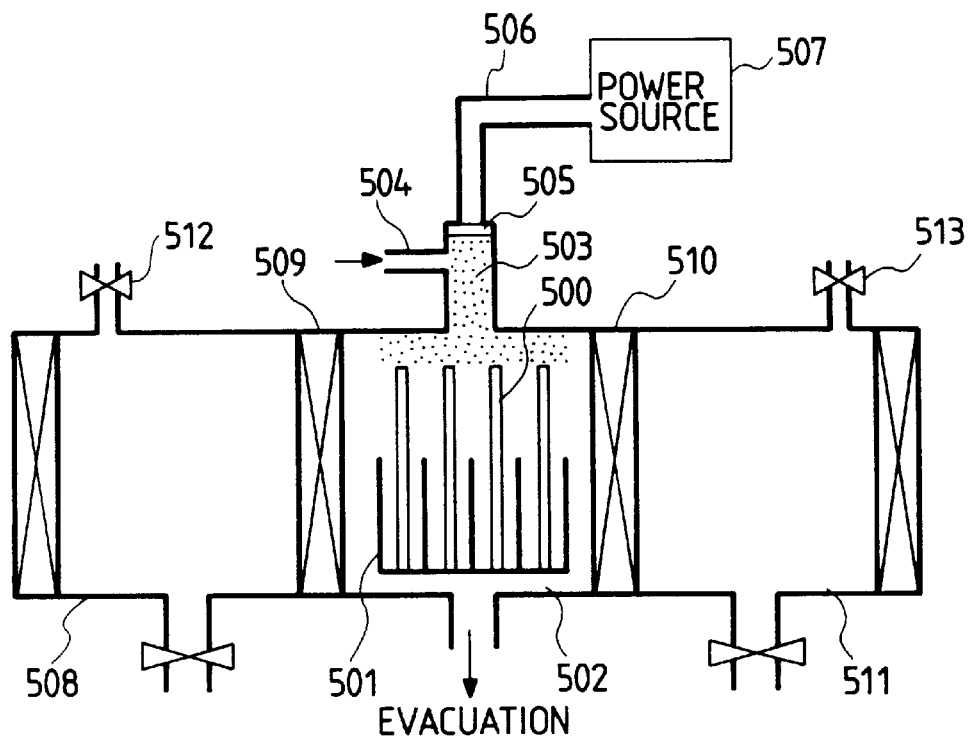
FIG. 7 is a schematic structural view which illustrates an apparatus for subjecting lithium for use in the secondary battery according to the present invention to surface treatment.

First, a microwave discharge plasma processing apparatus having a structure schematically shown in FIG. 7 was used to apply surface treatment to a lithium negative pole. In an atmosphere of dry argon gas, a nickel mesh collector was pressed against the reverse side of the lithium metal foil, and then disposed on a sheet processing substrate holder 501 followed by injecting them in a load chamber 508 of the microwave discharge plasma processing apparatus. Then, the retained gas in the load chamber 508 was exhausted to realize a degree of vacuum of 1×10$^{-6}$ Torr. Then, a gate valve 509 was opened, and the substrate holder was conveyed to the plasma processing chamber 502 and the gate valve 509 was closed. Then, 10 sccm of carbon tetrafluoride gas and 5 sccm of hydrogen gas were introduced into the plasma processing chamber 502 through the gas introduction pipe 504. While controlling the internal pressure in the plasma processing chamber to 0.01 Torr, microwaves having a frequency of 2.45 GHz were supplied by 100 watts through a wave guide pipe 506 and a microwave introduction window 505 to cause discharge to take place. As a result, the surface of lithium was plasma-processed. The lithium foil plasma-process was used as the negative pole.

Then, similar processes to those according to Example 8 were performed so that the lithium secondary battery was manufactured.

Example 10

Under the same conditions as those according to Example 9 except that 10 sccm of gas of nitrogen trifluoride was, as the lithium surface treatment gas, introduced through the gas introduction pipe 504 in place of the 10 sccm of the carbon tetrafluoride gas and the 5 sccm of the hydrogen gas. As a result, the surface of lithium was processed similarly to Example 9. Then, similar processes to those according to Example 8 were performed so that the lithium secondary battery was manufactured.

Example 11

Under the same conditions as those according to Example 8 except that 5 sccm of chlorine trifluoride gas, 2 sccm of oxygen gas and 100 sccm of helium gas were, as the lithium surface treatment gas, introduced through the gas introduction pipe 504 in place of the 5 sccm of chlorine trifluoride gas and 2 sccm of oxygen gas. Then, the surface of lithium was processed while omitting discharge.

Then, similar processes to those according to Example 8 were performed so that the lithium secondary battery was manufactured.

In order to compare and evaluate the performance of the batteries according to the foregoing Examples, the following comparative battery was manufactured.

Comparative Example 8

A lithium secondary battery was manufactured similarly to Example 8 except that the metal lithium foil, to which the nickel mesh was pressed, was used as the negative pole.

Evaluation of Performance of Secondary Battery

The performance of lithium secondary batteries according to Examples and Comparative Example was evaluated. The evaluation was performed by a charge and discharge cycle test under the following conditions with respect to the cycle life of the batteries according to Comparative Example.

The conditions for the cycle test were made as follows: the charge and discharge was performed by 0.2 C (electric current which was 0.2 times capacity/time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated the quantity of the third discharge and the cycle life was evaluated by the number of cycles when the battery capacity had deteriorated to 60% or less.

The cycle life of batteries according to Examples of the present invention with respect to the cycle life of the battery according to Comparative Example which was made to be 1.0 was as shown in Table 8.

As can be understood from the results of comparisons made between Examples 8 to 11 and Comparative Example 8, the cycle life can considerably be lengthened due to use of the secondary battery according to the present invention.

TABLE 8

| Lithium Manufactured Battery | Cycle Life of Example Cycle Life of Comparative Example 8 |
|---|---|
| Comparative Example 8 | 1.0 |
| Example 8 | 2.5 |
| Example 9 | 2.0 |
| Example 10 | 3.0 |
| Example 11 | 1.7 |
| Example 6-5 | 2.5 |

Example 12

A liquid-rich test cell similar to the apparatus shown in FIG. 1 was used to conduct tests.

The preparation of materials and assembly of the battery were performed in an atmosphere of dry Ar. Lithium metal foil, to which a titanium collector was pressed, was inserted into the chamber of an RF plasma CVD apparatus. Then, the retained gas was exhausted to realize a degree of vacuum of $2 \times 10^{-6}$ Torr. Then, tetrafluoroethylene, ethylene, hydrogen, helium and oxygen were introduced into the chamber, and the internal pressure was maintained at 0.8 Torr. Then, high frequency power of 200 watts was supplied to a parallel and flat electrode so that a plasma polymer film of fluororesin was formed on the foregoing sample to have a thickness of 100 Å.

Figure 9A:
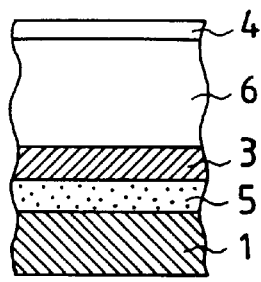
FIGS. 9A to 9H are views which illustrate examples of layer stacking patterns according to the present invention including a conductor layer, a semiconductor layer and an insulating layer between the negative pole and the separator thereof.

Then, acetylene gas was, as raw material gas, introduced into the chamber, and the pressure in the chamber was controlled to 0.1 Torr, and then RF discharge was performed so that a carbon film was formed on the surface of lithium to have a thickness of 200 Å so that a sample negative electrode was manufactured (see FIG. 9A).

The positive pole activating material was prepared by heating a mixture of dehydrated and electrolyzed manganese dioxide, lithium carbonate and black lead. The lithium-manganese composite oxide was mixed with tetrafluoroethylene polymer powder, and then it was pressed against titanium mesh to be formed into a desired positive pole.

The separator was manufactured by sandwiching a polypropylene separator having small apertures and unwoven polypropylene sheets.

The electrolytic solution was prepared by dissolving 1 M of arsenate hexafluoride lithium salt in an equal-quantity mixture solvent of propylene carbonate and dimethoxyethane. A lithium secondary battery was manufactured as shown in FIG. 1.

Example 13

Under the same conditions as those according to Example 12 except that lithium metal foil covered with a plasma polymer film of fluorine resin was inserted into the chamber of the RF plasma CVD apparatus. Then, the retained gas was exhausted to realize a degree of vacuum of $2 \times 10^{-6}$ Torr. Monosilane gas was, as the raw material gas, introduced into the chamber, and then the pressure in the chamber was controlled to 0.1 Torr. Then, RF discharge was performed so that an amorphous silicon film was formed on the surface of the lithium metal foil to have a thickness of 100 Å as to be used as a sample pole. A battery similar, to that according to Example 12 was manufactured except that the foregoing sample pole was used as the negative pole.

Example 14

Petroleum type pitch was spun by a flow method, and subjected to heat treatment in an atmosphere of inactive gas so that black lead fiber having a specific area of 10 m²/g was obtained. The fiber was heated to completely remove water and dispersed in toluene dehydrated by a molecular sieve so as to be applied to the lithium metal foil. Then, the material was dried and pressed by a pressing machine so that a sample was obtained (comprising a fiber layer having a thickness of 50 µm). Then, a titanium mesh collector was pressed against the reverse side of the sample so that a negative pole was obtained. A battery similar to that according to Example 12 was manufactured except that the foregoing negative pole was used as the negative pole.

Example 15

A solution in which Lumifron, which was fluororesin paint manufactured by Asahi Glass, and lithium hexafluoride salt were dissolved was applied to the surface of the separator, and then it was pressed. A battery similar to that according to Example 12 was manufactured except that the separator was disposed as shown in FIG. 9F.

Example 16

Figure 9B:
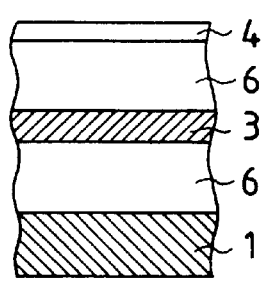

A battery was manufactured under the same conditions as those according to Example 12 except that black lead fiber having a specific area of 10 m²/g or more was paper-made and thus-obtained black lead paper (having a thickness of 200 µm) was disposed between the negative pole and the separator as shown in FIG. 9B.

Example 17

The preparation of materials and assembling of the battery were performed in an atmosphere of dry argon. Lithium metal foil, to which a titanium mesh collector was pressed, was inserted into the chamber of an RF plasma CVD apparatus. Then, the retained gas was exhausted to realize a degree of vacuum of $2 \times 10^{-6}$ Torr. A hexane solution of acetylacetone complex of nickel was used as the material, and it was bubbled with hydrogen gas so as to be introduced into the chamber. The pressure in the chamber was controlled to 1 Torr, and RF discharge was performed so that a nickel film was formed on the surface of the metal foil to have a thickness of 200 Å so as to serve as a sample pole. A battery was manufactured under the same conditions as those according to Example 12 except that the foregoing sample pole was used as the negative pole.

Example 18

RF discharge was performed under the same conditions as those according to Example 17 except that oxygen gas was used as the material together with the hexane solution of acetylacetone complex of nickel. As a result, a nickel oxide film was formed on the surface of the lithium metal foil to have a thickness of 50 Å to serve as a sample pole. A battery was manufactured under the same conditions as those according to Example 12 except that the foregoing sample pole was used as the negative pole.

Example 19

The preparation of materials and assembling of the battery were performed in an atmosphere of dry argon. Lithium metal foil, to which a titanium mesh collector was pressed, was inserted into the chamber of the RF plasma CVD apparatus. Then, the retained gas was exhausted to realize a degree of vacuum of $2 \times 10^{-6}$ Torr. Monosilane gas and ammonia gas were, as raw material gas, introduced into the chamber, and then the pressure in the chamber was controlled to 0.1 Torr to perform IRF discharge. As a result, a silicon nitride film was formed on the lithium metal foil to have a thickness of 200 Å so as to serve as a sample pole. A battery was manufactured under the same conditions as those according to Example 12 except that the foregoing sample pole was used as a negative pole.

Example 20

The RF discharge was performed under the same conditions as those according to Example 17 except that methane gas was used as the raw material together with the hexane solution of acetylacetone complex of titanium. As a result, a composite film of titanium and carbon was formed on the surface of the lithium metal foil to have a thickness of 250 Å to serve as a sample pole. A battery was manufactured under the same conditions as those according to Example 12 except that the foregoing sample pole was used as the negative pole.

Example 21

A polypropylene separator was inserted into the chamber of the RF plasma CVD apparatus. Then, the retained gas was exhausted to realize a degree of vacuum of $2 \times 10^{-6}$ Torr. Acetylene gas was introduced into the chamber, and then the pressure in the chamber was controlled to 0.1 Torr and RF discharge was performed. As a result, a carbon film was formed on the surface of the separator to have a thickness of 200 Å. A battery was manufactured under the same conditions as those according to Example 12 except that the foregoing separator was used and disposed as shown in FIG. 9F.

Example 22

A battery was manufactured under the same conditions as those according to Example 21 except that monosilane gas was used as the raw material gas to cover the separator with an amorphous silicon film. The battery was manufactured under the same conditions as those according to Example 12 except that the separator was used and disposed as shown in FIG. 9F.

Example 23

Figure 9C:
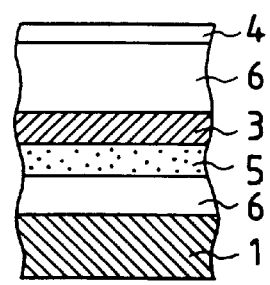
Figure 9D:
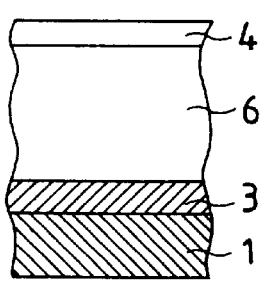
Figure 9E:
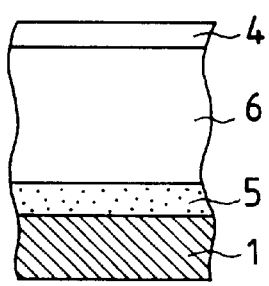
Figure 9F:
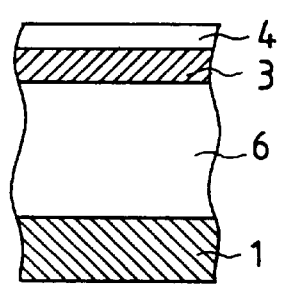
Figure 9G:
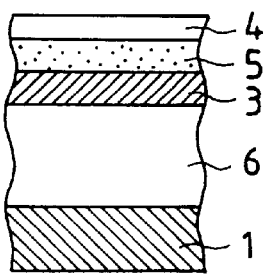

The preparation of materials and assembling of the battery were performed in an atmosphere of dry argon. A polypropylene separator was inserted into the chamber of the RF plasma CVD apparatus. Then, the retained gas was exhausted to realize a degree of vacuum of $10^{-5}$ Torr. Then, tetrafluoroethylene, ethylene, $H_2$, helium and oxygen were introduced into the chamber, and the internal pressure was maintained at 0.8 Torr. High frequency power was, by 200 watts, supplied to a parallel and flat electrode so that a plasma polymer film of fluororesin was formed on the separator. Then, acetylene gas was, as the raw material gas, introduced into the chamber, and the internal pressure in the chamber was controlled to 0.1 Torr to perform RF discharge. As a result, a carbon film was formed to have a thickness of 200 Å. A battery was manufactured under the same conditions as those according to Example 12 except that the foregoing separator was used and disposed as shown in FIG. 9G.

Example 24

The preparation of materials and assembling of the battery were performed in an atmosphere of dry argon. A fluororesin film having micropores was inserted into the chamber of the RF plasma CVD apparatus. Then, the retained gas was exhausted to realize a degree of vacuum of $2 \times 10^{-6}$ Torr. A hexane solution of acetylacetone complex of nickel was, as the raw material, used so as to be bubbled with hydrogen gas as to be introduced into the chamber. The pressure in the chamber was controlled to 1 Torr to perform RF discharge so that a nickel film was formed on the surface of the separator to have a thickness of 300 Å. A battery was manufactured under the same conditions as those according to Example 12 except that the foregoing film was used and disposed as shown in FIG. 9C.

Example 25

A battery was manufactured under the same conditions as those according to Example 24 except that monosilane gas was used as the raw material gas to form an amorphous silicon film on the fluororesin film having micropores. The battery was manufactured under the same conditions as those according to Example 12 except that the foregoing film was used and disposed as shown in FIG. 9C.

Example 26

The preparation of materials and assembling of the battery were performed in an atmosphere of dry argon. Lithium metal foil, to which a titanium mesh collector was pressed, was inserted into the chamber of the RF plasma CVD apparatus. Then, the retained gas was exhausted to realize a degree of vacuum of $2 \times 10^{-6}$ Torr. Monosilane gas and acetylene gas were, as the raw material gas, introduced into the chamber, and then the pressure in the chamber was controlled to 0.1 Torr to perform RF discharge. As a result, the surface of the lithium metal foil was covered with silicon carbide film having a thickness of 300 Å to serve as a sample pole. A battery was manufactured under the same conditions as those according to Example 12 except that the foregoing sample pole was used as the negative pole.

Example 27

The preparation of materials and assembling of the battery were performed in an atmosphere of dry argon. Lithium metal foil, to which a titanium mesh collector was pressed, was inserted into the chamber of the RF plasma CVD apparatus. Then, the retained gas was exhausted to realize a degree of vacuum of $5 \times 10^{-6}$ Torr. Then, Ar gas was allowed to flow to make the inside of the chamber to be an inactive atmosphere. Then, the pressure in the chamber was lowered to $3 \times 10^{-3}$ Torr, and black lead and Si were used as the target for use in the RF discharge. Sputtering of Si was commenced at the initial stage of the discharge and the proportion of black lead sputtering was gradually raised so that a composite layer of carbon and Si was formed on the surface of the lithium metal foil to have a thickness of 300 Å to serve as a sample pole. A battery was manufactured under the same conditions as those according to Example 12 except that the foregoing sample pole was used as the negative pole.

Example 28

A battery was manufactured under the same conditions as those according to Example 27 except that black lead, Si and polytetrafluoroethylene were used as target and the thus-formed composite film was stacked on the surface of the lithium metal foil.

Example 29

The preparation of materials and assembling of the battery were performed in an atmosphere of dry argon. The sample according to Example 12 was inserted into the chamber of the RF plasma CVD apparatus. Then, the retained gas was exhausted to realize a degree of vacuum of $10^{-5}$ Torr. Then, tetrafluoroethylene, ethylene, hydrogen, helium and oxygen were introduced into the chamber, and the internal pressure was maintained at 0.8 Torr. Then, high frequency power was, by 200 watts, supplied to a parallel and flat electrode to form a plasma polymer film of fluororesin on the foregoing sample so that a sample pole was obtained. A battery was manufactured under the same conditions as those according to Example 12 except that the foregoing sample pole was used as the negative pole.

Example 30

The preparation of materials and assembling of the battery were performed in an atmosphere of dry argon. Lithium metal foil, to which a titanium mesh collector was pressed, was inserted into the chamber of sputtering apparatus. Then, the retained gas was exhausted to realize a degree of vacuum of $5 \times 10^{-6}$ Torr. Ar gas was allowed to flow to make the inside of the chamber to be an inactive atmosphere. Then, pressure in the chamber was lowered to $3 \times 10^{-3}$ Torr, and black lead and $LiAsF_6$ were used as the targets to perform RF discharge. As a result, carbon and $LiAsF_6$ were formed on the surface of the lithium metal foil to have a thickness of 300 Å so that a sample pole was obtained. A battery was manufactured under the same conditions as those according to Example 12 except that the foregoing sample pole was used as the negative pole.

Example 31

Figure 9H:
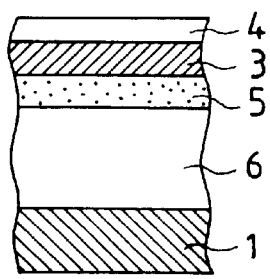

The separator according to Example 21 and covered with carbon was used, and a fluororesin film having micropores was stacked on the coated carbon as shown in FIG. 9H. A battery was manufactured under the same conditions as those according to Example 12 except that the foregoing film was used.

Example 32

The spiral and cylindrical battery shown in FIG. 3 was used in the test, the battery being a KR-A type battery having a contour of 17.0 mm and 50.5 mm high.

Paste obtained by, together with ethylene glycol, kneading zinc oxide and metal zinc serving as the main activating material and polyvinyl alcohol serving as the bonding material was applied to an iron plate applied with nickel plating having apertures. Then, drying and pressing were performed so that a zinc pole plate was obtained.

The zinc pole plate was inserted into the chamber of the RF plasma CVD apparatus to perform RF discharge in such a manner that the proportion of tetrafluoroethylene was high in the initial stage of the discharge process and the proportions of acetylene and oxygen were raised in the following stage of the discharge process. As a result, a fluororesin film having a thickness of 200 Å was formed on the surface of the zinc pole plate so that a sample pole was obtained.

The positive pole plate was manufactured in such a manner that paste was obtained by kneading a solution in which nickel and cobalt were added to nickel hydroxide and carboxydimethyl cellulose serving as a bonding material, and water was added to the kneaded solution. The paste was injected into foamed metal (Celmet manufactured by Sumitomo Denko), and it was dried and pressed.

A separator (Cell Guard manufactured by Cellanese) was used which was manufactured by integrating a film having small apertures and unwoven polypropylene sheet.

The electrolytic solution comprised 30 wt % potassium solution.

Assembly was performed in such a manner that a wound group in which a separator was interposed between the negative pole and the positive pole was inserted into a battery case made of titanium clad stainless steel. Then, the electrolytic solution was injected, and the negative pole cap made of titanium stainless steel and an insulating packing made of fluorine rubber were inserted and they were caulked so that a nickel-zinc secondary battery was manufactured.

Example 33

The flat type battery shown in FIG. 2 was used to conduct the test.

Tetrafluoroethylene polymer powder was mixed to zinc oxide and metal zinc, and then was pressed against a nickel mesh so as to be formed into a zinc pole plate. The zinc negative pole was inserted into the chamber of the RF plasma CVD apparatus, and then fluororesin having a thickness of 50 Å and carbon having a thickness of 200 Å were formed on the surface of the zinc pole plate so that a negative pole was formed.

A positive pole catalyzer layer was formed by adding manganese dioxide to active carbon. Then, a water-repellant film made of polytetrafluoroethylene and dispersed paper made of cellulose were stacked on the positive pole catalyzer layer so that a positive pole was formed. A separator made of cellophane and 30 wt % potassium hydroxide serving as the electrolytic solution were employed.

Assembly was performed in such a manner that a separator was interposed between the negative pole and the positive pole and they were inserted into a battery case made of stainless steel and having small apertures. Then, the electrolytic solution was injected, and then a negative pole cap made of titanium clad stainless steel and an insulating packing made of fluorine rubber were used to perform sealing. As a result, an air-zinc secondary battery was manufactured.

Comparative Example 12

A battery was manufactured under the same conditions as those according to Example 12 except that a negative pole, which comprised lithium metal foil having no carbon film, was used.

Comparative Example 13

A battery was manufactured under the same conditions as those according to Example 31 except that a negative pole, which comprised a zinc pole plate which was not covered with the composite film of the fluororesin and carbon, was used.

Comparative Example 14

A battery was manufactured under the same conditions as those according to Example 33 except that a negative pole, which comprised a zinc pole plate which was not covered with the composite film of the fluororesin and carbon, was used.

The batteries respectively according to Examples 12 to 31 and Comparative Example 12 were charged with a current of 0.2 C to a level of 4.0 V, then paused for 30 minutes, and then discharged with a current of 0.2 C to a level of 2.8 V. The foregoing test was repeated, the results being shown in Table 9.

The batteries respectively according to Examples 32 and 33 and Comparative Examples 13 and 14 were charged with a current of 0.2 C to 150%, then paused for 30 minutes, and then discharged with a current of 0.2 C to 1.0 V.

The results of the cycle life tests of the respective Examples with respect to Comparative Examples are shown in Table 9 while making the cycle life of the batteries according to Comparative Examples 12 to 14 to be 1. As can be understood from the results shown in Table 9, the charge/discharge cycle life can significantly be lengthened as compared with Comparative Examples when a single layer, a multi-layer or a composite layer is disposed between the negative pole, and the separator, the single layer, the multi-layer or the composite layer being the conductor layer made of carbon or nickel or titanium, the semiconductor layer made of silicon or the metal oxide, and the insulating layer made of the halide, nitride, carbide or the organic polymer (according to respective Examples).

TABLE 9

| Manufactured Secondary Battery | | Cycle Life of Example Cycle Life of |
|---|---|---|
| Examples | Comparative Examples | Comparative Example |
| Example 12 | Comparative Example 12 | 2.5 |
| Example 13 | Comparative Example 12 | 2.1 |
| Example 14 | Comparative Example 12 | 1.5 |
| Example 15 | Comparative Example 12 | 1.3 |
| Example 16 | Comparative Example 12 | 1.3 |
| Example 17 | Comparative Example 12 | 2.2 |
| Example 18 | Comparative Example 12 | 2.3 |
| Example 19 | Comparative Example 12 | 2.0 |
| Example 20 | Comparative Example 12 | 2.1 |
| Example 21 | Comparative Example 12 | 1.6 |
| Example 22 | Comparative Example 12 | 1.5 |
| Example 23 | Comparative Example 12 | 1.7 |
| Example 24 | Comparative Example 12 | 1.5 |
| Example 25 | Comparative Example 12 | 1.5 |
| Example 26 | Comparative Example 12 | 2.2 |
| Example 27 | Comparative Example 12 | 2.1 |
| Example 28 | Comparative Example 12 | 2.2 |
| Example 29 | Comparative Example 12 | 2.0 |
| Example 30 | Comparative Example 12 | 2.6 |
| Example 31 | Comparative Example 12 | 1.6 |
| Example 32 | Comparative Example 13 | 2.2 |
| Example 33 | Comparative Example 14 | 2.2 |

Example 34

A polysiloxane film was formed by the following method.

As the film forming compound, 0.05 M (mol/l) an amphipathic compound N-[b-(trimethylammonio)ethyloxybenzoyl]-didodecyl-L-glutamic acid bromide and 0.15 M of trimethoxymethyl silane were processed with supersonic waves for 3 minutes as to be dispersed in water. The dispersion solution was developed on a tetrafluoroethylene polymer sheet (Goatex manufactured by Japan Goa Tex) and allowed to stand at 25° C. and 60% relative humidity for 3 days so that a multi-layer bimolecular film was obtained. The film was treated with ammonia gas in a sealed glass container to hydrolyze and condense the methoxysilane group. Ethyl alcohol was used to extract and remove the amphipathic compound so that a polysiloxane film was obtained on the Goa Tex sheet.

Manufacturing of Secondary Battery

A lithium secondary battery which had a simple structure, which could be assembled simply and which had a cross-sectional shape schematically shown in FIG. 2 was manufactured.

The positive pole activating material 203 was prepared in such a manner that electrolyzed manganese dioxide and lithium carbonate were mixed at a ratio of 1:0.4, and then heated at 800° so that a lithium-manganese oxide was prepared. Then, graphite and tetrafluoroethylene polymer powder were mixed to the prepared lithium-manganese oxide, and then pressed against a nickel mesh so as to be formed into the positive pole.

Then, silica sol dispersion ethyl alcohol (manufactured by Shokubai Kasei) was mixed in water in which N-[b-(trimethylammonio)ethyloxybenzoyl]-didodecyl-L-glutamicacid bromide, which was the film forming compound, was dispersed. The positive pole was dipped in the foregoing dispersion solution, dried at room temperature, further dried at 80° C., and cleaned with hexane to remove the film forming compound. Then, it was dried at 250° C. in a vacuum atmosphere so that the positive pole 203 covered with the multi-layer silica film was manufactured.

In an atmosphere of dry argon gas, titanium mesh collector 200 was pressed against the reverse side of the lithium metal foil, and then the lithium metal foil was immersed in a solution of Lumiflon, which was a copolymer, of ethylene tetrafluoride and vinyl ether and which was manufactured by Asahi Glass, and then dried so as to be hardened. As a result, the lithium negative pole 201 covered with fluororesin was manufactured.

The electrolytic solution was prepared by dissolving, by 1 M (mol/l), boron tetrafluoride lithium salt in an equal quantity mixture solvent of propylene carbonate (PC) and dimethoxyethane (DME).

The separator 208 comprised a composite member of the polysiloxane film prepared as described above and the Goa Tex sheet.

Assembly was performed in such a manner that the separator 208 was interposed between the negative pole 201 and the positive pole 203 so as to be inserted into the positive pole case 207 made of titanium clad stainless steel. Then, the electrolytic solution was injected, and then the negative pole cap 206 made of titanium clad stainless steel and the insulating packing 210 made of fluorine rubber were used to seal so that a lithium secondary battery was manufactured.

Example 35
Preparation of Multi-Layer Metal Oxide

A titanium oxide was prepared by the following method. A film forming compound, that is, dihexadecylphosphate was mixed to a sol dispersed solution of very small particles of titanium oxide (manufactured by Idemitsu), and dispersed with ultrasonic waves similarly to Example 34. Then, it was developed on a tetrafluoroethylene polymer membrane filter. Then, it was dried at room temperature, resulting in a cast film to be obtained which was then cleaned with. ethyl alcohol. Then, it was baked at 300° C. so that a titanium oxide film was formed.

The separator 208 was manufactured in such a manner that the thus-formed titanium oxide, unwoven polypropylene sheets and a polypropylene separator having small apertures were sandwiched.

A battery was manufactured under the same conditions as those according to Example 34 except for the foregoing arrangements.

Example 36

A lithium secondary battery was manufactured under the same conditions as those according to Example 35 except that the titanium oxide film was immersed in 0.1% ethylalcohol solution of silane coupling SH6020 (manufactured by Toray Dowconing).

Example 37
Preparation of Multi-Layer Metal Oxide

A cast film obtained similarly to Example 35 was heated at 800° C. so that an alumina film was manufactured, the cast film being obtained from a film forming compound brought into class four from N-(11-bromoundecanoyl)-L-glutamic acid didodecylester with triethyl amine and amorphous alumina super fine particle sol.

The N-(11-bromoundecanoyl)-L-glutamic acid didodecylester was prepared in such a manner that L-glutamic acid didodecylester hydrochloride salt was synthesized from L-glutamic acid and dodecylalcohol, and then the L-glutamic acid didodecylester hydrochloride salt, triethylamine, cyanophosphoric acid diethyl and 11-bromoundecan acid were used.

Assembly of Secondary Battery

A nickel-zinc secondary battery which had a simple structure, which could be assembled simply and which had a cross-sectional shape schematically shown in FIG. 2 was manufactured.

The positive pole was manufactured by impregnating nickel hydroxide into a sintered nickel pole plate.

The negative pole was formed in such a manner that tetrafluoride ethylene polymer powder serving as the bonding material was added to a mixture of zinc powder and zinc oxide powder and they were pressed against the two sides of a copper punching metal to be formed into the desired shape. Then, alumina trichloride and phosphoric acid were, in ethyl alcohol, caused to react with each other at 0° C. so as to dip the negative pole. Then, it was gradually heated up to 100° C. so that glass-type aluminum phosphate film was formed on the negative pole.

The electrolytic solution comprised 30 wt % potassium hydroxide containing lithium hydroxide added thereto.

The battery was assembled similarly to Example 34.

Example 38

A nickel-zinc secondary battery was manufactured under the same conditions as those according to Example 37 except that the surface of the negative pole was not covered with the aluminum phosphate.

Example 39

A nickel-zinc secondary battery was manufactured under the same conditions as those according to Example 37 except that a positive pole manufactured as follows was used.

A dispersion solution in which was mixed a film forming compound obtained by bringing N-(11-bromoundecanoyl)-L-glutamic acid didodecylester into class four with triethylamine, amorphous alumina very small particles sol and polyvinyl alcohol water solution containing crosslinking material added thereto was developed on the surface of the positive pole formed by causing a sintered nickel plate to impregnate nickel hydroxide, followed by drying the developed solution. Then, crosslinking reactions were caused to take place at 120° C., and cleaned with ethyl alcohol. Then, the material was dried in a vacuum atmosphere so that a positive pole covered with a composite film of alumina and polyvinyl alcohol was manufactured.

In order to compare and evaluate the foregoing batteries, the following comparative batteries were manufactured.

Comparative Example 34

A lithium secondary battery was manufactured under the same conditions as those according to Example 35 except that no titanium oxide was used and the lithium of the negative pole was not covered.

Comparative Example 35

A nickel-zinc secondary battery was manufactured under the same conditions as those according to Example 37 except that no alumina was used and zinc of the negative pole was not covered.

Evaluation of Performance of Secondary Battery

The performance of lithium secondary batteries according to Examples and Comparative Examples was evaluated. The evaluation was performed by a charge and discharge cycle test under the following conditions with respect to the cycle life of the batteries according to Comparative Examples.

The conditions for the cycle test were made as follows: the charge and discharge was performed by 0.2C (electric current which was 0.2 times capacity/time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less.

The cycle life of each battery with respect to the cycle life of the battery according to Comparative Examples which was made to be 1 was as shown in Table 2.

As can be understood from the results of comparisons made between Examples 34 to 36 and 5 Comparative Example 34 and those between Examples 37 to 39 and Comparative Example 35, the cycle life can be lengthened due to use of the secondary battery having the structure according to the present invention.

TABLE 10

| Secondary Battery Manufactured | | Cycle Life of Example Cycle Life of |
|---|---|---|
| Example | Comparative Example | Comparative Example |
| Example 34 | Comparative Example 34 | 5.4 |
| Example 35 | Comparative Example 34 | 2.1 |
| Example 36 | Comparative Example 34 | 2.3 |
| Example 37 | Comparative Example 35 | 2.6 |
| Example 38 | Comparative Example 35 | 1.9 |
| Example 39 | Comparative Example 35 | 2.2 |

Example 40

A lithium secondary battery which had a simple structure, which could be assembled simply and which had a cross-sectional shape schematically shown in FIG. 2 was manufactured.

The positive pole activating material 203 was manufactured in such a manner that electrolyzed manganese dioxide and lithium carbonate were mixed at a ratio of 1:0.4. Then, the mixture was heated to 800° C. so that a lithium-manganese oxide was prepared. Graphite and tetrafluoroethylene polymer powder were added to the prepared lithium-manganese oxide, and pressed against a nickel mesh so as to be formed into the positive pole.

Then, the positive pole was immersed in a solution of Teflon AF which was a copolymer of tetrafluoroethylene and 2,2-bistrifluoromethyl-4,5-difluoro-1,3-dioxol and which was manufactured by Dupont, and then it was dried. As a result, the positive pole 203 covered with the fluororesin was manufactured.

In an atmosphere of dry argon gas, the titanium mesh collector 200 was pressed against the reverse side of the lithium metal foil, and then the lithium metal foil was immersed in a solution which was a copolymer of ethylene tetrafluoride and vinyl ether and which was manufactured by Asahi Glass. Then, it was dried so as to be hardened so that the lithium negative pole 201 covered with the fluororesin was manufactured.

The electrolytic solution was prepared by dissolving, by 1 M (mol/l), boric acid tetrafluoride lithium salt in an equal quantity mixture solvent of propylene carbonate (PC) and dimethoxyethane (DME).

The separator 208 was manufactured in such a manner that a polypropylene separator having small apertures was sandwiched by unwoven polypropylene sheets.

The assembly was performed in such a manner that the separator 208 was held between the negative pole 201 and the positive pole 203 so as to be inserted into the positive case 207 made of titanium clad stainless steel. Then, the electrolytic solution was injected, and then the negative pole cap made of titanium clad stainless steel and the insulating packing 210 made of fluorine rubber were used for sealing so that a lithium secondary battery was manufactured.

Example 41

A lithium battery was manufactured under the same conditions as those according to Example 40 except for the process for covering the positive pole.

The positive pole was manufactured similarly to Example 40. Then, the positive pole was immersed in an acetonitrile solution, in which were dissolved 0.1 M of monomer of benzo-15-crown-5 and 2.0 M of electrolytic boronic acid tetrafluoride tetrabutyl ammonium salt. Then, the platinum electrode was used as the cathode pole, and voltage of 3 V was applied to perform electrolysis and polymerization so that a large ring compound polymer covering film was formed on the surface of the positive pole.

In an atmosphere of dry argon gas, the titanium mesh collector 200 was pressed against the lithium metal foil so that the negative pole was manufactured.

Then, similar processes to those according to Example 40 were performed so that the lithium secondary battery was manufactured.

Example 42

A lithium secondary battery which had a simple structure, which could be assembled simply and which had a cross-sectional shape schematically shown in FIG. 2 was manufactured.

The positive pole was manufactured by a similar process according to Example 40. Then, peroxide benzoyl and boronic acid tetrafluoride lithium were dissolved in a tetrahydrofuran solution of poly (2-vinyl naphthalene) manufactured by Aldrich Chemical Company, Inc. Then, the positive pole was immersed in it, and then heated to 100° C. so that the positive pole 203 covered with poly (2-vinyl naphthalene) was manufactured.

Then, similar processes to those according to Example 41 were performed so that the lithium secondary battery was manufactured.

Example 43

The positive pole was manufactured by a process similar to that according to Example 40. Then, boronic acid tetrafluoride lithium salt was added and dissolved in a toluene solution PPZ-U1001 manufactured by Idemitsu. Then, the positive pole was immersed, and previously dried, and then ultraviolet rays were applied so that the positive pole 203 covered with polyphosphazene was manufactured.

Then, similar processes to those according to Example 41 were performed so that the lithium secondary battery was manufactured.

Example 44

The positive pole was manufactured by a process similar to that according to Example 40. The thus manufactured positive pole was injected into a sputtering apparatus. Then, the retained gas was exhausted to realize a degree of vacuum of $2\times10^{-6}$ Torr. Then, argon gas, which was a mixture of 10% nitrogen gas and 5% acetylene gas, was allowed to flow. The internal pressure was controlled to $3\times10-3$ Torr, and lithium fluoride was made to be a target of sputtering. As a result, the positive pole covered with carbon and a film made of lithium nitride containing fluorine were formed.

Then, similar processes to those according to Example 41 were performed so that the lithium secondary battery was manufactured.

Example 45

A nickel-zinc secondary battery which had a simple structure, which could be assembled simply and which had a cross-sectional shape schematically shown in FIG. 2 was manufactured.

The positive pole was manufactured in such a manner that nickel hydroxide was impregnated in a sintered nickel pole plate. Then, acetic acid and water were added to an ethyl alcohol solution of tetraethoxy silane to be dehydrated. Then, diethylamine was added so that colloidal silica was formed. Then, the positive pole was immersed in the colloidal solution of the silica, and dried at 100° C. As a result, a silica film was formed on the surface of the positive pole.

The negative pole was manufactured in such a manner that ethylene tetrafluoride polymer powder serving as a bonding material was added to a mixture of zinc powder and zinc oxide powder, then they were pressed to the two sides of a copper punching metal as to be formed into the negative pole.

The electrolytic solution comprised 30 wt % potassium hydroxide water solution to which lithium hydroxide was added.

The battery was assembled similarly to Example 40.

In order to compare and evaluate the performance of the batteries according to Examples, the following comparative batteries were manufactured.

Comparative Example 40

A lithium secondary battery was manufactured under the same conditions as those according to Example 40 except that the positive pole and the negative pole were not covered.

Comparative Example 41

A nickel-zinc secondary battery was manufactured under the same conditions as those according to Example 45 except that the surface coating was omitted.
Evaluation of Performance of Secondary Battery The performance of the secondary batteries according to Examples and Comparative Examples was evaluated. The evaluation was performed by a charge and discharge cycle test under the following conditions with respect to the cycle life of the batteries according to Comparative Examples. The conditions for the cycle test were made as follows: the charge and discharge was performed by 0.2 C (electric current 0.2 which was 0.2 times capacity/time), pause for 30 minutes and a cut-off voltage of 1.0V was applied. A charging/discharging apparatus HJ-101M6 manufactured by Hokuto Electric was used.

The charge/discharge test was commenced at discharge, the battery capacity was evaluated as the quantity of the third discharge, and the cycle life was evaluated by the number of cycles when the battery capacity had deteriorated to 60% or less.

The cycle life of each battery with respect to the cycle life of the battery according to Comparative Examples which was made to be 1 was as shown in Table 11.

As can be understood from the results of comparisons made between Examples 40 to 44 and Comparative Example 40 and those between Example 45 and Comparative Example 41, the cycle life can be lengthened due to use of the secondary battery having the structure according to the present invention.

TABLE 11

| Secondary Battery Manufactured | | Cycle Life of Example Cycle Life of |
|---|---|---|
| Example | Comparative Example | Comparative Example |
| Example 40 | Comparative Example 40 | 5.1 |
| Example 40 | Comparative Example 40 | 2.0 |
| Example 40 | Comparative Example 40 | 1.4 |
| Example 40 | Comparative Example 40 | 1.6 |
| Example 40 | Comparative Example 40 | 1.8 |
| Example 40 | Comparative Example 40 | 1.7 |

Preparation of Positive Pole Activating Material

Methods of preparing the positive pole activating material according to the present invention are exemplified in Preparation Methods 46 to 55 and the conventional. preparation methods are exemplified by Comparative Preparation Methods.

Preparation Method 46

A lithium-manganese oxide was prepared as follows.

Manganese acetate was dissolved in water, and then super fine nickel powder ENP-005 manufactured by Sumitomo Denko was suspended in a water solution of manganese nitrate. Then, a water solution of lithium hydroxide wets dripped until the pH was 8 or higher while vibrating the suspension solution with supersonic vibrations of 20 kHz so that sedimentation was generated. Then, ethyl alcohol was added, and supernatant liquid of the solution including the sediment was removed by decantation. The ethylalcohol cleaning and the decantation were repeated. Then, it was dissolved in 0.1% methyl alcohol solution of Sila Ace S210 (vinylethoxysilane) which was a silane coupling material manufactured by Chisso. Then, the solvent was removed by a centrifugal separator. The obtained sedimentation was dried at 120° C., and dried at 200° C. in a vacuum drier so that grains of manganese oxide were prepared.

The size of crystal grains was measured from the half value width of the X-ray analysis curve with respect to a manganese oxide and the angle of diffraction in accordance with the Scherrer's Equation. The size of the crystal grain was 60 Å or larger.

The RHEED pattern resulted in a ring pattern like a halo pattern.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 123 $m^2/g$.

Preparation Method 47

Vanadium oxide was prepared as follows.

Vanadium pentaoxide was gradually added to a water solution of lithium hydroxide so as to be dissolved. While applying supersonic vibrations, the water solution was sprayed into liquid nitrogen so as to be frozen. Then, the temperature was raised to −20° C., and the pressure was lowered so that freezing and drying were performed to dehydrate and dry the material. Obtained grains were dried at 150° C., and further dried in a vacuum dryer at 250° C. so that grains of vanadium oxide were obtained. Then, the sample was immersed in 0.1% isopropylalcohol solution of tetra-iso-propoxytitanium, and then the solvent was remove by a centrifugal separator. The obtained sedimentation was dried at 120° C., and then dried at 200° C. in a vacuum state so that grains of manganese oxide were prepared.

Although the size of crystal grains was intended to measure from the half value width of the X-ray analysis curve and the angle of diffraction in accordance with the Scherrer's Equation, it could not be measured because the diffraction curve resulted in a broad form.

The RHEED pattern resulted in a halo pattern.

The X-ray radial .distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 105 m$^2$/g.

Preparation Method 48

A lithium-nickel oxide was prepared as follows.

Nickel acetate was dissolved in a mixture solvent of acetic acid, ethyl alcohol and water. While vibrating the solution with supersonic vibrations of 20 kHz, an ethyl alcohol solution of ethoxylithium, which was alkoxide, was dripped so as to be mixed. Then, the solution was heated to 80° C. to enhance the hydrolysis decomposition reactions so that sol was generated. The supernatant liquid of the solution including the sol-shape sedimentation was removed by decantation, cleaned with ethyl alcohol, the decantation was repeated and the solvent was removed by a centrifugal separator. The obtained sedimentation was dried at 150° C., and then suspended in a non-electrolyzed nickel plating solution Ni-701 manufactured by Kojundo Kagaku. Then, it was heated to 70° C., nickel coating was performed, and water cleaning and decantation were repeated. Then, ethyl alcohol cleaning was performed, and decantation was repeated, and then the solvent was removed by a centrifugal separator. The sample was dried at 230° C. in a vacuum state so that grains of nickel oxide were obtained.

Although the size of crystal grains was intended to measure from the half value width of the X-ray analysis curve and the angle of diffraction in accordance with the Scherrer's Equation, it could not be measured because the diffraction curve with respect to an oxide resulted in a broad form.

The RHEED pattern resulted in a ring pattern considered due to nickel plating. The pattern before the nickel plating process resulted in a halo pattern.

The X-ray radial distribution function resulted in a continuous and moderate peak curve. The scattering angle and the scattering intensity obtainable from the X-ray small angle scattering method resulted in non-uniform density fluctuation to be observed.

The specific area was measured by the BET method, resulting in that the specific area was 210 m$^2$/g.

Preparation Method 49

A lithium-nickel-cobalt oxide was prepared by the following method.

Nickel nitrate and cobalt nitrate were dissolved in water, and then a water solution of lithium hydroxide was dripped to a solution of the nickel nitrate and cobalt nitrate while vibrating with supersonic vibrations of 20 kHz until the pH was 8 or higher so that sedimentation was generated. Then, ethyl alcohol was added so that the supernatant liquid of the solution including the sedimentation was removed by decantation. The ethyl alcohol cleaning and the decantation were repeated and the solvent was removed by a centrifugal separator. The obtained sedimentation was dried at 120° C., then dried at 200° C. in a vacuum state so that grains of a nickel cobalt oxide were prepared.

The size of crystal grains was measured from the half value width of the X-ray analysis curve and the angle of diffraction in accordance with the Scherrer's Equation. The size of the crystal grain was 140 Å.

The RHEED pattern resulted in a ring pattern like a halo pattern.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 160 m$^2$/g.

Preparation Method 50

Vanadium-molybdenum oxide was prepared as follows.

Vandyl sulfate and molybdenum sulfate were added to water so as to be suspended, and acetic acid was gradually added so as to be dissolved. Then, a water solution of lithium hydroxide was dripped to a solution of the vanadium oxide and acetic acid while vibrating with supersonic vibrations of 20 kHz until the pH was 8 or higher so that sedimentation was generated. Then, ethyl alcohol was added so that the supernatant liquid of the solution including the sedimentation was removed by decantation. The ethyl alcohol cleaning and the decantation were repeated and the solvent was removed by a centrifugal separator. The obtained sedimentation was dried at 120° C., then dried at 200° C. in a vacuum state so that grains of a vanadium oxide were prepared.

The size of crystal grains was measured from the half value width of the X-ray analysis curve and the angle of diffraction in accordance with the Scherrer's Equation. The size of the crystal grain was 80 Å.

The RHEED pattern resulted in a ring pattern like a halo pattern.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 100 m$^2$/g.

Preparation Method 51

Vanadium-molybdenum oxide was prepared by the following method.

The vanadium oxide and the molybdenum oxide were mixed at a ratio of 7:3, and heated up to 800° C. so as to be melted and mixed so that a molten bath was made. Then, the molten bath was dispersed by jet gas which was a mixture of 20% oxygen and 2% hydrogen with argon gas. It was sprayed at high speed to a cooled and retaining metal disc so that grains of vanadium oxide and molybdenum oxide were prepared.

The size of crystal grains was measured from the half value width of the X-ray analysis curve and the angle of diffraction in accordance with the Scherrer's Equation. The size of the crystal grain was 110 Å.

The RHEED pattern resulted in a ring pattern having weak intensity.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 60 m$^2$/g.

Preparation Method 52

Titanium sulfide was prepared by the following method.

Hydrogen gas was allowed to flow at 500 sccm into a reaction chamber of a plasma CVD apparatus degasified so as to be in a vacuum state. The pressure was maintained at 10 Torr and discharge was caused to take place at a high frequency wave of 13.56 MHz. Then, 200 sccm of helium gas was, as a carrier gas, bubbled in a hexane solution of tetrabutoxytitanium, and injected at 200 sccm through a nozzle into the reaction chamber of the plasma CVD apparatus. Simultaneously, 250 sccm of hydrogen sulfide was introduced so as to be reacted in a gas phase to capture grains of titanium sulfide by a capturing machine.

The size of crystal grains was measured from the half value width of the X-ray analysis curve and the angle of diffraction in accordance with the Scherrer's Equation. The size of the crystal grain was 200 Å.

The RHEED pattern resulted in a ring pattern having weak intensity.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 175 m$^2$/g.

Preparation Method 53

Lithium-iron-cobalt oxide was prepared by the following method.

A mixture solution of 0.5 mol/l cobalt chloride and 1 mol ferric chloride mixed at a ratio of 1:1 was gradually added to a 5 mol/l water solution of lithium hydroxide while stirring and bubbling argon gas. Then, reaction chamber was set to 100° C. to be matured. After the maturation, it was injected into cooled water, and cleaning was performed with water cooled by water by means of decantation until the pH of the solution was 8. It was dried at 200° C. in a vacuum state, and crushed by a ball mill in an atmosphere of argon gas.

The size of crystal grains was measured from the half value width of the X-ray analysis curve and the angle of diffraction in accordance with the Scherrer's Equation. The size of the crystal grain was 150 Å.

The RHEED pattern resulted in a ring pattern having weak intensity to be observed.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 2100 m$^2$/g.

Preparation Method 54

Manganese acetate, magnesium chloride and urea were added to a solution in which 300 g of vanadium pentoxide was dissolved in 2 liters of hydrochloric acid, followed by heating the solution to 95° C. for 10 minutes to generate ammonia. Lithium hydride solution was dripped to make the pH to generate sediment. Then, decantation and water cleaning were repeated, and then cleaning with ethyl alcohol was performed, and the material was dried by a spray dryer. Then, the sample was dried at 200° C. in a vacuum state.

The size of crystal grains was measured from the half value width of the X-ray analysis curve and the angle of diffraction in accordance with the Scherrer's Equation. The size of the crystal grain was 90 Å.

The RHEED pattern resulted in a ring pattern like a halo pattern.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 80 m$^2$/g.

Preparation Method 55

A lithium-copper-cobalt oxide was prepared by the following method.

An oxalic acid was added to a water solution in which a copper sulfate and a cobalt nitrate were dissolved. Then, supersonic vibrations were applied, and lithium hydroxide was dripped until the pH was 7 so that sedimentation was generated. Water cleaning and decantation were repeated, and then a water solution of lithium hydroxide was added, supersonic vibrations were applied, and an ethyl alcohol was added. Decantation and cleaning with ethyl alcohol were repeated, and the material was dried by using a spray dryer. Further, the material was dried at 200° C. in a vacuum state.

The size of crystal grains was measured from the half value width of the X-ray analysis curve and the angle of diffraction in accordance with the Scherrer's Equation. The size of the crystal grain was 160 Å.

The RHEED pattern resulted in a ring pattern having weak intensity.

The X-ray radial distribution function resulted in a continuous and moderate peak curve.

The scattering angle and the scattering intensity obtainable from the X-ray small angle scattering method resulted in non-uniform density fluctuation to be observed.

The specific area was measured by the BET method, resulting in that the specific area was 50 m$^2$/g.

Other Analyses

The SIMS analysis resulted in that the positive pole activating materials according to Preparation Methods 46 to 55 contained hydrogen and lithium. Also the dehydration peak of each TG (Thermogravimetric analysis), DTA (Differential Thermal Analysis) and DSC (Differential Scan Thermal Heating Value Measurement) and the absorption spectrum of FTIR (Fourier Transform Infrared) resulted in that a hydroxyl group was present.

Comparative Preparation Method 46

A lithium-manganese oxide was prepared by the following method.

Powder of electrolyzed manganese dioxide manufactured by Mitsui Kinzoku and lithium carbonate were mixed with each other at a ratio of 1:0.4 and they were heated at 800° C. so that lithium manganese oxide was prepared.

The size of crystal grains was measured from the half value width of the X-ray analysis curve and the angle of diffraction in accordance with the Scherrer's Equation. The size of the crystal grain was 600 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 40 m$^2$/g.

Comparative Preparation Method 47

A reagent manufactured by Wako was dried at 400° C. in a vacuum state.

The size of crystal grains was measured from the half value width 0 f the X-ray analysis curve and the angle of diffraction in accordance with the Scherrer's Equation. The size of the crystal grain was 800 Å.

The RHEED pattern resulted in a ring pattern in which a spot pattern could be confirmed.

The X-ray radial distribution function resulted in discontinuous peak curve.

The specific area was measured by the BET method, resulting in that the specific area was 4 m$^2$/g.

Comparative Preparation Method 48

A lithium-nickel oxide was prepared by the following method.

A lithium carbonate and nickel nitrate were mixed at an equal mol ratio of 1:1 and the mixture was heated to 800° C. so that a lithium-nickel oxide was prepared.

The size of crystal grains was measured from the half value width of the X-ray analysis curve and the angle of diffraction in accordance with the Scherrer's Equation. The size of the crystal grain was 2000 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 50 m$^2$/g.

Comparative Preparation Method 49

A lithium-nickel-cobalt oxide was prepared by the following method.

A lithium carbonate, nickel carbonate and cobalt carbonate were mixed at a mol ratio of 10:3:7 and the mixture was heated to 900° C. for 20 hours so as to be decomposed so that a nickel-cobalt oxide was prepared.

The size of crystal grains was measured from the half value width of the X-ray analysis curve and the angle of diffraction in accordance with the Scherrer's Equation. The size of the crystal grain was 1100 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 40 m$^2$/g.

Comparative Preparation Method 50

A vanadium-molybdenum oxide was prepared by the following method.

A vanadium oxide and a molybdenum oxide were mixed at a ratio of 7:3, and the mixture was heated to 800° C. in a platinum crucible so as to be melted and mixed. Then, the mixture was cooled gradually so that the block-shape vanadium oxide and molybdenum oxide were prepared. They were crushed by a roller mill so that grains of vanadium oxide-molybdenum oxide were prepared.

The size of crystal grains was measured from the half value width of the X-ray analysis curve and the angle of diffraction in accordance with the Scherrer's Equation. The size of the crystal grain was 700 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 10 m$^2$/g.

Comparative Preparation Method 51

A titanium sulfide was prepared by the following method.

A titanium disulfide powder manufactured by Kojundo Kagaku was dried at 400° C. in a vacuum state.

The size of crystal grains was measured from the half value width of the X-ray analysis curve and the angle of diffraction in accordance with the Scherrer's Equation. The size of the crystal grain was 900 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 50 m$^2$/g.

Comparative Preparation Method 52

A lithium-iron-cobalt oxide was prepared by the following method. Lithium carbonate, iron acetate and Cobalt carbonate were mixed at the same mole ratio, and decomposed at 600° C. in air so that an iron cobalt oxide was prepared. Then, it was crushed by a ball mill so that grains were obtained.

The size of crystal grains was measured from the half value width of the X-ray analysis curve and the angle of diffraction in accordance with the Scherrer's Equation. The size of the crystal grain was 1000 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 40 m$^2$/g.

Comparative Preparation Method 53

A manganese containing magnesium added thereto-vanadium oxide was-prepared by the following method.

A manganese dioxide, vanadium pentaoxide and magnesium hydroxide were mixed at a mol ratio of 10:10:1, and then they were decomposed at 700° C. in air. As a result, the manganese containing magnesium added thereto-vanadium oxide was prepared. Then, they were crushed by a ball mill so that grains were obtained.

The size of crystal grains was measured from the half value width of the X-ray analysis curve and the angle of diffraction in accordance with the Scherrer's Equation. The size of the crystal grain was 1300 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 27 m$^2$/g.

Comparative Preparation Method 54

A lithium-copper-cobalt oxide was prepared by the following method.

A lithium carbonate, cobalt carbonate and copper carbonate were mixed at the same mol ratio, and then they were decomposed at 600° C. in air. As a result, the manganese containing magnesium added thereto-vanadium oxide was prepared. Then, they were crushed by a ball mill so that grains were obtained.

The size of crystal grains was measured from the half value width of the X-ray analysis curve and the angle of diffraction in accordance with the Scherrer's Equation. The size of the crystal grain was 1100 Å or larger.

The RHEED pattern resulted in a ring pattern in which a spot pattern could be confirmed.

The X-ray radial distribution function resulted in discontinuous peak curve.

The specific area was measured by the BET method, resulting in that the specific area was 10 m²/g.

Analyzing Apparatus

The positive pole activating material prepared by Preparation Methods 46 to 55 and Comparative Preparation Methods 46 to 54 were analyzed by using the following apparatuses. The X-ray diffraction measurement was performed by using MXP3VA manufactured by MacScience.

The RHEED measurement was performed by using JEM-100SX manufactured by Nihon Denshi.

The specific area measurement by the BET method was performed by using GEMIN12300 manufactured by Micromeritex.

As a result of the comparisons between the transition metal and the group VIA element according to Preparation Methods according to the present invention and those according to Comparative Preparation Methods, the compounds according to the present invention exhibited smaller particle grain size as compared with the results of Comparative Preparation Methods while having an amorphous or microcrystal structure.

Manufacturing of Lithium Secondary Battery

Lithium secondary batteries were manufactured by using the positive pole activating materials prepared by the foregoing preparation methods.

Example 46

The positive pole activating material prepared by the foregoing Preparation Method 46 was used to manufacture a battery which had a simple structure, which could be assembled simply and which had a cross-sectional shape schematically shown in FIG. 2.

In an atmosphere of dry argon gas, the negative pole activating material 201 was used in such a manner that the titanium mesh collector 200 was pressed against the reverse side of the lithium metal foil. Then, the surface of lithium was covered with a fluororesin thin film by using thin solution of Lumiflon, which was a fluororesin paint manufactured by Asahi Glass, so that the negative pole was manufactured.

Acetylene black powder and xylene solution of the Lumiflon, which was a fluororesin paint manufactured by Asahi Glass, were mixed with the positive pole activating material which was prepared by Preparation Method 46 and which was lithium-manganese oxide. The mixture was applied to the titanium mesh, and it was hardened at 80° C., and then heated with microwaves. As a result, the positive pole 203 was formed.

The electrolytic solution was prepared by dissolving, by 1 M (mol/l), boronic acid tetrafluoride lithium salt in an equal quantity mixture solvent of propylene carbonate (PC) and dimethoxyethane (DME).

The separator 208 was manufactured in such a manner that a polypropylene separator having small apertures was sandwiched by unwoven polypropylene sheets.

The assembly was performed in such a manner that the separator 208 was sandwiched between the negative pole 201 and the positive pole 203, followed by inserting them into a positive pole case 207 made of titanium clad stainless steel. Then, the electrolytic solution was injected. Then, the negative pole cap 206 made of the titanium clad stainless steel and the insulating packing 210 made of fluorine rubber were used for sealing so that the lithium secondary battery was manufactured.

Example 47

The vanadium oxide prepared by Preparation Method 47 was used as the positive pole activating material, a battery having a cross-sectional shape schematically shown in FIG. 2 was manufactured.

First, the nickel mesh collector was pressed against the reverse side of the lithium metal foil in an atmosphere of dry argon gas so that the negative pole was manufactured.

Acetylene black powder and Super Konak F which was a fluorotesin paint manufactured by Nihon Yushi were mixed with the vanadium oxide serving as the positive pole activating material and prepared by Preparation Method 2, followed by adding xylene by a small quantity.

The mixture was applied to the nickel mesh, and it was hardened at 150° C. As a result, the positive pole was manufactured.

Then, similar processes to those according to Example 46 were performed so that the lithium secondary battery shown in FIG. 2 was assembled.

Example 48

By using the positive pole activating material prepared by Preparation Method 48, a battery which had a simple structure, which could be assembled simply and which had a cross-sectional shape schematically shown in FIG. 2 Was assembled.

First, the nickel mesh collector was pressed against the reverse side of the lithium metal foil in an atmosphere of dry argon gas so that the negative pole was manufactured.

Acetylene black powder and tetrafluoroethylene polymer powder were mixed with the lithium-nickel oxide prepared by Preparation Method 48 and serving as the positive pole activating material. The mixture was pressed against the nickel mesh with heat so as to be formed into the positive pole 203.

Then, similar processes to those according to Example 46 were performed so that the lithium secondary battery shown in FIG. 2 was assembled.

Example 49

The lithium-nickel-cobalt oxide prepared by Preparation Method 49 was used as the positive pole activating material so that the battery shown in FIG. 2 was manufactured by the process similar to that according to Example 48.

Example 50

The vanadium-molybdenum oxide prepared by Preparation Method 50 was used as the positive pole activating material so that the battery shown in FIG. 2 was manufactured by the process similar to that according to Example 48.

Example 51

The vanadium-molybdenum oxide prepared by Preparation Method 51 was used as the positive pole activating material so that the battery shown in FIG. 2 was manufactured by the process similar to that according to Example 48.

Example 52

The titanium sulfide prepared by Preparation Method 52 was used as the positive pole activating material so that the battery shown in FIG. 2 was manufactured by the process similar to that according to Example 48.

Example 53

The lithium-iron-cobalt oxide prepared by Preparation Method 53 was used as the positive pole activating material so that the battery shown in FIG. 2 was manufactured by the process similar to that according to Example 48.

Example 54

The manganese containing magnesium added thereto—vanadium oxide prepared by Preparation Method 54 was used as the positive pole activating material so that the battery shown in FIG. 2 was manufactured by the process similar to that according to Example 48.

Example 55

The lithium-copper-cobalt oxide prepared by Preparation Method 55 was used as the positive pole activating material so that the battery shown in FIG. 2 was manufactured by the process similar to that according to Example 48.

Comparative Example 46

By using the positive pole activating material prepared by Comparative Preparation method 46, the battery having a cross-sectional shape schematically shown in FIG. 2 was manufactured.

First, the titanium mesh collector 200 was pressed against the reverse side of the lithium metal foil in an atmosphere of dry argon so that the negative pole was manufactured.

Acetylene black powder and tetrafluoroethylene polymer powder were mixed to the lithium-manganese oxide prepared by Comparative Preparation Method 46 and serving as the positive pole activating material so as to be, with heat, pressed and formed into the positive pole 203.

Then, similar processes to those according to Example 46 were performed so that the lithium secondary battery was assembled.

Comparative Example 47

The vanadium oxide prepared by Comparative Preparation Method 47 was used as the positive pole activating material so that the battery shown in FIG. 2 was manufactured by the process similar to that according to Example 48.

Comparative Example 48

The lithium-nickel oxide prepared by Comparative Preparation Method 48 was used as the positive pole activating material so that the battery shown in FIG. 2 was manufactured by the process similar to that according to Example 48.

Comparative Example 49

The lithium-nickel-cobalt oxide prepared by Comparative Preparation Method 49 was used as the positive pole activating material so that the battery shown in FIG. 2 was manufactured by the process similar to that according to Example 48.

Comparative Example 50

The vanadium-molybdenum oxide prepared by Comparative Preparation Method 50 was used as the positive pole activating material so that the battery shown in FIG. 2 was manufactured by the process similar to that according to Example 48.

Comparative Example 51

The titanium sulfide prepared by Comparative Preparation Method 51 was used as the positive pole activating material so that the battery shown in FIG. 2 was manufactured by the process similar to that according to Example 48.

Comparative Example 52

The lithium-iron-cobalt oxide prepared by Comparative Preparation Method 52 was used as the positive pole activating material so that the battery shown in FIG. 2 was manufactured by the process similar to that according to Example 48.

Comparative Example 53

The manganese containing magnesium added thereto—vanadium oxide prepared by Comparative Preparation Method 53 was used as the positive pole activating material so that the battery shown in FIG. 2 was manufactured by the process similar to that according to Example 48.

Comparative Example 54

The lithium-copper-cobalt oxide prepared by Comparative Preparation Method 54 was used as the positive pole activating material so that the battery shown in FIG. 2 was manufactured by the process similar to that according to Example 48.

Evaluation of Performance of Lithium Secondary Battery

The performance of lithium secondary batteries according to Examples and Comparative Examples was evaluated. The evaluation was performed by a charge and discharge cycle test under the following conditions with respect to the cycle life of the batteries according to Comparative Examples.

The conditions for the cycle test were made as follows: the charge and discharge was performed by 0.2C (electric current which was 0.2 times capacity/time), pause for 30 minutes and a cut-off voltage of 1.0V was applied. A charging/discharging apparatus HJ-101M6 manufactured by Hokuto Electric was used. The charge/discharge test was commenced at discharge, the battery capacity was evaluated as the quantity of the third discharge, and the cycle life was evaluated by the number of cycles when the battery capacity had deteriorated to 60% or less.

The lithium batteries using the positive pole activating materials respectively according to the present invention and the comparative examples, that is, the battery capacities and cycle life of the examples of the present invention and the comparative examples were evaluated as shown in Table 12 while making the performance of the battery according to the comparative example to be a reference value of 1.

As can be understood from Table 12, the comparisons made between Examples 46 to 55 and Comparative Examples 46 to 54 resulted in that the use of the batteries according to the present invention enabled the capacity of the battery to be enlarged and the cycle life to be lengthened.

TABLE 12

| Lithium Battery Manufactured | | Capacity of Battery (Present Invention/ Comparative Example) | Cycle life (Present Invention/ Comparative Example) |
| --- | --- | --- | --- |
| Examples | Comparative Examples | | |
| Example 46 | Comparative Example 46 | 2.3 | 4.8 |
| Example 47 | Comparative Example 47 | 3.1 | 3.2 |
| Example 48 | Comparative Example 48 | 2.1 | 1.7 |
| Example 49 | Comparative Example 49 | 2.0 | 1.4 |

TABLE 12-continued

| Lithium Battery Manufactured | | Capacity of Battery (Present Invention/ Comparative Example) | Cycle life (Present Invention/ Comparative Example) |
|---|---|---|---|
| Examples | Comparative Examples | | |
| Example 50 | Comparative Example 50 | 4.1 | 2.9 |
| Example 51 | Comparative Example 50 | 3.2 | 2.1 |
| Example 52 | Comparative Example 51 | 2.4 | 1.4 |
| Example 53 | Comparative Example 52 | 2.3 | 1.5 |
| Example 54 | Comparative Example 53 | 1.7 | 2.0 |
| Example 55 | Comparative Example 54 | 2.2 | 1.8 |

Further, combinations of the embodiments of the present invention will enable further improved secondary batteries to be obtained.

According to the present invention, if dendrites of lithium or zinc grow at the time of charge, short circuits between the negative pole and the positive pole can be prevented. Therefore, a lithium secondary battery, a nickel-zinc secondary battery and an air-zinc secondary battery exhibiting a long charge/discharge cycle life can be manufactured. Further, the metal lithium can be used as the negative pole activating material. Therefore, a secondary battery exhibiting a high energy density can be manufactured while improving safety.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A method of manufacturing a positive electrode active material of a lithium secondary battery, said method comprising:
    forming a transition metal oxide compound having a crystal grain size of 500 Å or less, said crystal grain size having been evaluated from the peak half width and the angle of diffraction of x-ray diffraction curve in accordance with Scherrer's Formula, $t=0.9\lambda/B \cos \theta_B$, wherein t is the size of the crystal grain, $\lambda$ is the wavelength of the x-ray beam, B is the peak half width, and $\theta_B$ is the angle of diffraction, and composed of an oxide of a transition metal selected from the group consisting of titanium, vanadium, chromium, manganese, iron, cobalt, nickel, and copper, wherein the transition metal oxide having been formed by a solution reaction employing an oxygen source selected from the group consisting of water, alcohol, and hydroxide.

2. A method of manufacturing a positive electrode active material according to claim 1, wherein said compound of said transition metal and said oxygen is an aggregate having a structure selected from amorphous, microcrystalline, a mixture of amorphous and microcrystalline and a mixture of amorphous, microcrystalline and polycrystalline.

3. A method of manufacturing a positive electrode active material according to claim 1, wherein said positive electrode active material is substantially composed of a compound of said transition metal and said oxygen, the raw material of said transition metal element of said compound of said transition metal and said oxygen being at least one material selected from the group consisting of said transition metal, salt of said transition metal, an organic metal compound of said transition metal, hydride of said transition metal, hydroxide material of said transition metal, carbonyl compound of said transition metal and a transition metal oxide.

4. A method of manufacturing a positive electrode active material according to claim 1, wherein said process for forming said compound of said transition metal and said oxygen includes a process for causing hydrogen to react.

5. A method of manufacturing a positive electrode active material according to claim 1, wherein said positive electrode active material is composed of said transition metal and said oxygen and wherein a process for applying ultrasonication is provided.

6. A method of manufacturing a positive electrode active material according to claim 3, wherein said salt of said transition metal is at least one salt selected from the group consisting of nitrate, carbonate, sulfate, halide, phosphate, borate, salt of organic acid and ammonia salt.

7. A method of manufacturing a positive electrode active material according to claim 3, wherein said organic transition metal compound is at least one salt selected from the group consisting of metal alkoxide, acetylacetonate, salt of octyllic acid and naphthenate.

8. A method of manufacturing a positive electrode active material according to claim 1 and made of a compound of said transition metal and said oxygen further comprising at least a step of adding at least one element selected from the group consisting of lithium, carbon, magnesium, sodium, potassium, nitrogen, aluminum, calcium, barium, lead, indium, boron, silicon, tin, phosphorus, antimony, bismuth, fluorine and chlorine.

9. A method of manufacturing a positive electrode active material according to claim 8, wherein the raw material of the additive elements to be added to said positive electrode active material is at least one material selected from the group consisting of said additive element, salt of said additive element, organic compound of said additive element, hydride of said additive element and hydroxide of said additive element.

10. A method of manufacturing a positive electrode active material according to claim 1 further comprising a step of mixing conductor powder to be used as the core of said compound of said transition metal and said oxygen.

11. A method of manufacturing a positive electrode active material according to claim 1 further comprising a step of covering by using a conductor after said compound of said transition metal and said oxygen has been prepared.

12. A method of manufacturing a positive electrode comprising the step of:
    mixing one or more types or resins selected from the group consisting of fluorine resin, polyethylene, polypropylene and silicon resin into said positive electrode active material prepared by said manufacturing method according to claim 1.

13. A method of manufacturing a positive electrode according to claim 12, wherein said resin material is liquid or solution or readily melting resin.

14. A method of manufacturing a positive electrode according to claim 12, wherein said resin material is fluorine resin having an ether bond.

15. A method of manufacturing a positive electrode active material according to claim 1, wherein said solution reaction is an aqueous solution.

16. A method of manufacturing a positive electrode active material of a lithium secondary battery comprising:

forming a transition metal oxide compound composed of an oxide of a transition metal selected from the group consisting of titanium, vanadium, chromium, manganese, iron, cobalt, nickel, and copper employing a solution reaction for forming a hydroxide of said transition metal by using one or more reactions selected from the group consisting of a reaction between a salt of said transition metal and alkali, a hydrolysis reaction of an organic transition metal compound and a reaction between said transition metal and alkali.

17. A method of manufacturing a positive electrode active material according to claim 16, wherein acid and/or alkali is added in said hydrolysis reaction of said organic transition metal compound.

18. A method of manufacturing a positive electrode active material according to claim 16 further comprising a dehydrating reaction process.

19. A method of manufacturing a positive electrode active material according to claim 16 further comprising a process for causing hydrogen sulfide to react.

20. A method of manufacturing a positive electrode active material of a lithium secondary battery, said method comprising the step of:

forming a transition metal oxide compound having a crystal grain size of 500 Å or less, said crystal grain size having been evaluated from the peak half width and the angle of diffraction of x-ray diffraction curve in accordance with Scherrer's Formula, $t=0.9\lambda/B \cos \theta_B$, wherein t is the size of the crystal grain, $\lambda$ is the wavelength of the x-ray beam, B is the peak half width, and $\theta_B$ is the angle of diffraction, wherein said transition metal oxide compound contains hydrogen and is formed via a hydrogen reaction.

21. A method of manufacturing a positive electrode active material according to claim 20, wherein said transition metal is selected from the group consisting of titanium, vanadium, chromium, manganese, iron, cobalt, nickel and copper.

22. A method of manufacturing a positive electrode active material according to claim 20, wherein said transition metal oxide compound forming step is performed in a gas phase reaction.

23. A method of manufacturing a positive electrode active material according to claim 22, wherein a gasified transition metal salt, a gasified organic transition metal compound or a vapor of said transition metal reacts with oxygen or an oxygen-containing compound in a gas phase.

24. A method of manufacturing a positive electrode active material according to claim 22, wherein a transition metal salt containing oxygen or an organic transition metal compound is decomposed in a gas phase.

25. A method of manufacturing a positive electrode active material according to claim 20, wherein said transition metal oxide compound forming step is performed in a melting and rapid cooling reaction for melting one or more types of materials selected from the group consisting of said transition metal and a transition metal compound to react with one or more types of material selected from the group consisting of oxygen and an oxygen-containing compound and rapidly cooling said reactant.

26. A method of manufacturing a positive electrode of a lithium secondary batter, comprising the steps of:

forming a positive electrode comprising the transition metal compound as manufactured by the method of claim 1, 16 or 20 and a conductive collector.

* * * * *

UNITED STATES PATENT AND TRADEMARK OFFICE
CERTIFICATE OF CORRECTION

PATENT NO.    : 6,391,492 B1
DATED         : May 21, 2002
INVENTOR(S)   : Soichiro Kawakami et al.

It is certified that error appears in the above-identified patent and that said Letters Patent is hereby corrected as shown below:

Title page,
Item [30], Foreign Application Priority Data,
"Apr. 5, 1992" should read -- Apr. 5, 1993 --.

Item [56], OTHER PUBLICATIONS,

"V. Joshi, et al. "Microscopy studies of sol-gel derived lithium niobate" Proc. of the synthesis and processing of ceramics p. 459-464. (Abstract) Dec. 1991.*"
should be deleted;

"H. Franke, "Li+ ionic conductivity in LiNbO3", Phys. Status Solidi A v. 83(1), p. K73-K76. (Abstract) Dec. 1991.*" should be deleted;

After "Franke, H.," "LiNbO3"," should read -- $LiNbO_3$ --; and
After "Database WPI," "8202," should read -- 8202, Class L03, --.

Column 7,
Line 4, "Similarly-to" should read -- Similarly to --.

Column 8,
Line 24, "methods which" should read -- method, which --; and
Line 67, "Dr" should read -- or --.

Column 9,
Line 30, "napthalene," (second occurrence) should read -- napthacene --;
Line 63, "performed" should read -- is performed --; and
Line 67, "referable" should read -- preferable --.

Column 10,
Line 25, "to" should read -- to be --;
Line 51, "Ln" should read -- in --; and
Line 57, "alt" should read -- salt --.

Column 11,
Line 20, "ic.compound" should read -- is compound --; and
Line 59, "Life" should read -- life --.

UNITED STATES PATENT AND TRADEMARK OFFICE
CERTIFICATE OF CORRECTION

PATENT NO.    : 6,391,492 B1
DATED         : May 21, 2002
INVENTOR(S)   : Soichiro Kawakami et al.

It is certified that error appears in the above-identified patent and that said Letters Patent is hereby corrected as shown below:

<u>Column 12,</u>
Line 51, "with, he" should read -- with the --; and
Line 56, "the," should read -- the --.

<u>Column 13,</u>
Line 36, "prevented." should read -- prevented. Further, reactions between fresh lithium or zinc generated at the time of the charge with the solvent of the electrolytic solution can be prevented. --; and
Line 58, "of-the" should read -- of the --.

<u>Column 14,</u>
Line 2, "(dibenzo-l8-crown-6)-coformaldehyde]" should read -- [(dibenzo-18-crown-6)-co-formaldehyde] --;
Line 6, "croup" should read -- group --;
Line 16, "starting, material" should read -- starting material --;
Line 19, "SnCl4." should read -- $SnCl_4$. --; and
Line 50, "cross.inking" should read -- crosslinking --.

<u>Column 15,</u>
Line 6, "electrolytic:" should read -- electrolytic --;
Line 19, "alkaline" should read -- an alkali --; and
Line 54, "6." should read -- ¶6. --.

<u>Column 16,</u>
Line 11, "300" should read -- 300° --;
Line 13, "ammonia" should read -- ammonium --;
Line 33, "alkaline" should read -- an alkali --;
Line 65, "the" should read -- to the --; and
Line 67, "he" should read -- be --.

<u>Column 17,</u>
Line 6, "exemplified, by" should read -- exemplified by --;
Line 28, "polymerizes" should read -- polymerized --;
Line 29, "De" should read -- be --;
Line 62, "containing" should read -- contain--; and
Line 67, "inc," should read -- zinc, --.

UNITED STATES PATENT AND TRADEMARK OFFICE
CERTIFICATE OF CORRECTION

PATENT NO.   : 6,391,492 B1
DATED        : May 21, 2002
INVENTOR(S)  : Soichiro Kawakami et al.

It is certified that error appears in the above-identified patent and that said Letters Patent is hereby corrected as shown below:

Column 18,
Line 19, "po.-" should read -- poly- --;
Line 35, "(MyMo$_6$S$_{8-z}$" should read -- (M$_y$Mo$_6$S$_{8-z}$ --; and
Line 37, "partially" should read -- a partially filled --.

Column 19,
Line 18, "m$_2$/g." should read -- m$^2$/g. --;
Line 26, "ole" should read -- pole --; and
Line 27, "o" should read -- to -- .

Column 20,
Line 14, "Y-butyrolactone" should read -- γ-butyrolactone --;
Line 20, "alkaline" should read -- an alkali --;
Line 30, "salt of alkali" should read -- a salt of an alkali metal --; and
Line 31, " used" should read -- used, --.

Column 22,
Line 18, "insulting" should read -- insulating --; and
Line 55, "is exemplified" should read -- is exemplified --.

Column 23,
Line 12, "provide" should read -- provided --.

Column 24,
Line 41, "layer-may" should read -- layer may --;
Line 57, "sometime" should read -- sometimes --; and
Line 58, "alkaline" should read -- an alkali --.

Column 25,
Line 13, "are" should read -- is --;
Line 18, "as" should read -- is --; and
Line 45, "pressed" should read -- is pressed --.

Column 27,
Line 27, "or raw" should read -- of raw --;
Line 37, "change" should read -- changed --; and
Line 49, "car" should read -- can --.

UNITED STATES PATENT AND TRADEMARK OFFICE
CERTIFICATE OF CORRECTION

PATENT NO.    : 6,391,492 B1
DATED         : May 21, 2002
INVENTOR(S)   : Soichiro Kawakami et al.

It is certified that error appears in the above-identified patent and that said Letters Patent is hereby corrected as shown below:

Column 28,
Line 8, "gaps" should read -- of gaps --;
Line 9, "the" should read -- that the --;
Line 20, "ii" should read -- in --;
Line 39, "tetrahydrofuran, is added" should read -- tetrahydrofuran --;
Line 48, "diethylether or ethylalcohol," should read -- diethyl ether or ethyl alcohol --;
Line 52, "De" should read -- be --; and
Line 66, "ore." should read -- one --.

Column 29,
Line 5, "property) is used." should read -- property). --; and
Line 51, "colloid off" should read -- colloid of --.

Column 30,
Line 1, "ar alkali" should read -- an alkaline --; and
Line 33, "hole" should read -- holes --.

Column 31,
Line 49, "croup" should read -- group --.

Column 33,
Line 46, "manner," should read -- manner that, --.

Column 34,
Line 13, "By" should read -- by --; and
Line 28, "alkaline" should read -- an alkali --.

Column 35,
Line 21, "thiranopolymer" should read -- thianopolymer --;
Line 36, "ammonia" should read -- ammonium --;
Line 38, "benzonate" should read -- benzoate --; and
Line 45, "alkaline" should read -- an alkali --.

Column 36,
Line 9, "dissolved in" should read -- having--;
Line 35, "tie" should read -- the --;
Line 36, "poler," should read -- polymer, --; and
Line 45, "salt" should read -- salt, --.

UNITED STATES PATENT AND TRADEMARK OFFICE
CERTIFICATE OF CORRECTION

PATENT NO. : 6,391,492 B1
DATED : May 21, 2002
INVENTOR(S) : Soichiro Kawakami et al.

It is certified that error appears in the above-identified patent and that said Letters Patent is hereby corrected as shown below:

Column 37,
Line 8, "is" should read -- are --; and
Line 23, "silica." should read -- silica --.

Column 38,
Line 3, "cat" should read -- can --;
Line 26, "water-repellant" should read -- water-repellent --;
Line 64, "partially" should read -- a partially filled --; and
Line 65, "T," should read -- Ti, -- and "Wn," should read -- Mn, --.

Column 39,
Line 24, "preferably" should read -- preferable --;
Line 55, "transition.metal" should read -- transition metal --;
Line 56, "Or" should read -- or --; and
Line 66, "Method" should read -- method --.

Column 40,
Line 7, "or-lower." should read -- or lower. --;
Line 18, "ammonia" should read -- ammonium --;
Line 45, "$Fe(OC_2H_7)_2$," should read -- $Fe(OC_2H_5)_2$, --; and
Line 46, "$Fe(OC_3H_5)_2$," should read -- $Fe(OC_3H_7,)_2$, --.

Column 41,
Line 8, "ar" should read -- an --;
Line 9, "is" should read -- are --;
Line 24, "treatment" should read -- treatment. --;
Line 38, "ii" should read -- in --;
Line 40, "at" should be deleted;
Line 41, "he" should read -- the --;
Line 54, "this," should read -- this, there may be used --; and
Line 67, "ore" should read -- one --.

Column 42,
Line 27, "bath-of" should read -- bath of --; and
Line 34, "$10_8K$." should read -- $10^8K$. --.

Column 43,
Line 36, "beans" should read -- beams --; and
Line 43, "ol" should read -- of --.

UNITED STATES PATENT AND TRADEMARK OFFICE
CERTIFICATE OF CORRECTION

PATENT NO.      : 6,391,492 B1
DATED           : May 21, 2002
INVENTOR(S)     : Soichiro Kawakami et al.

It is certified that error appears in the above-identified patent and that said Letters Patent is hereby corrected as shown below:

Column 44,
Line 5, "proxy-" should read -- propoxy- --;
Line 6, "dihydroxy.bis" should read -- dihydroxy-bis --;
Line 21, "$\Theta$:" should read -- $\lambda$: --; and
Line 23, "$\lambda_B$:" should read -- $\Theta_B$: --.

Column 45,
Line 20, "the-transition" should read -- the transition --;
Line 29, "to one another" should read -- together --; and
Line 61, "toted" should read -- noted --.

Column 46,
Line 7, "was" should read -- and was --; and
Line 18, "as" should read -- so as --.

Column 47,
Line 21, "triethylaluminum." should read -- triethylaluminum --;
Line 49, "Solution was Applied" should read -- solution was applied --;
Line 56, "that,according" should read -- that according --; and
Line 62, "cut" should read -- out --.

Column 48,
Line 8, "Example 1-7" should be set out as a heading; and "A battery" should read
-- ¶A battery --;
Line 12, "the," should read -- the --;
Line 21, "which" should read -- such --;
Line 41, "01" should read -- 201 --;
Line 45, "water-repellant" should read -- water-repellent --;
Line 50, "solation" should read -- solution --; and
Line 58, "(lad" should read -- clad --.

Column 49,
Table 1, "Cycle Life according to the present invention" should read -- Ratio of cycle life according to the present invention to --; "Example 1-6 Comparative Example" should read -- Example 1-6 Comparative Example 1-1 --; and "Example 1-7 Comparative Example 1-1– " should read -- Example 1-7 Comparative Example 1-2 --.

UNITED STATES PATENT AND TRADEMARK OFFICE
CERTIFICATE OF CORRECTION

PATENT NO. : 6,391,492 B1
DATED : May 21, 2002
INVENTOR(S) : Soichiro Kawakami et al.

It is certified that error appears in the above-identified patent and that said Letters Patent is hereby corrected as shown below:

Column 50,
Line 6, "Activating" should read -- activating --;
Line 14, "an." should read -- an --;
Line 24, "omitted" should read -- omitted. --;
Line 33, "following" should read -- followed --;
Line 45, "that,according" should read -- that according --;
Line 51, "mol" should read -- molarity --; and
Line 56, "out it" should read -- it out --.

Column 51,
Line 9, "Applied" should read -- applied --.

Column 52,
Table 2, "Cycle Life of Example Cycle Life of Comparative Example" should read -- Ratio of Cycle Life of Example to Cycle Life of Comparative Example --; and "Example 2-" should read -- Example 2-1 --;
Line 41, "31" should read -- 3-1 --;
Line 46, "31" should read -- 3-1 --;
Line 50, "31" should read -- 3-1 --;
Line 53, "titan" should read -- titanium --; and
Line 54, "wad" should read -- was --.

Column 53,
Line 7, "rayed" should read -- raised --; and
Line 60, "Of each" should read -- of each --.

Column 54,
Table 3, "Cycle Life of Example Cycle Life of Comparative Example" should read -- Ratio of Cycle Life of Example to Cycle Life of Comparative Example --;
Line 35, "as" should read -- so as --; and
Line 54, "are" should read -- as --.

Column 55,
Line 1, "performing," should read -- performing --; and
Line 25, "41" should read -- 4-1 --.

Column 56,
Table 4, "Cycle Life of Example Cycle Life of Comparative Example" should read -- Ratio of Cycle Life of Example to Cycle Life of Comparative Example --.

UNITED STATES PATENT AND TRADEMARK OFFICE
CERTIFICATE OF CORRECTION

PATENT NO. : 6,391,492 B1
DATED : May 21, 2002
INVENTOR(S) : Soichiro Kawakami et al.

It is certified that error appears in the above-identified patent and that said Letters Patent is hereby corrected as shown below:

Column 57,
Line 14, "Was" should read -- was --;
Line 21, "were" should read -- was --;
Line 35, "mash" should read -- mesh --;
Line 52, "tetracarbocyclic" should read -- tetracarboxylic --; and
Line 54, "butylhydroxytinoxide" should read -- butylhydroxytin oxide --.

Column 58,
Line 44, "as" should read -- so as --; and
Line 57, "as" should read -- so as --.

Column 59,
Line 39, "water-repellant" should read -- "water-repellent --.

Column 60,
Line 11, "Table 2" should read -- Table 5 --; and
Table 5, "Cycle Life of Example" should read -- Ratio of Cycle Life of Example to --.

Column 61,
Line 13, "as" should read -- so as --;
Line 36, "by,heating" should read -- by heating --;
Line 59, "mixed" should read --  mixture --;
Line 60, "reactions" should read -- treatment --; and
Line 63, "Soxhlet-extracting it." should read -- Soxhlet extraction. --.

Column 62,
Line 1, "drying it and subjecting to a heat treatment set" should read -- drying and heat treatment at 80°C. --;
Line 2, "to 80°C." should be deleted;
Line 3, "was," should read -- was --;
Line 32, "which" should read -- , which --;
Line 33, "1" should read -- 1, --;
Table 6 "Cycle Life of Example" should read -- Ratio of Cycle Life of Example to -- and "Example 2-1" should read -- Example 6-1 --;
Line 57, "having a lead" should read -- having lead --; and
Line 60, "which" should read -- to which had been added --.

UNITED STATES PATENT AND TRADEMARK OFFICE
CERTIFICATE OF CORRECTION

PATENT NO. : 6,391,492 B1
DATED : May 21, 2002
INVENTOR(S) : Soichiro Kawakami et al.

It is certified that error appears in the above-identified patent and that said Letters Patent is hereby corrected as shown below:

Column 63,
Line 7, "set to 170°C." should read -- at 170°C. --; and
Line 35, "having a lead" should read -- having lead --.

Column 64,
Line 40, "a" should read -- an --.

Column 65,
Line 1, "ii" should read -- in --;
Line 30, "far" should read -- for --; and
Table 7, "Cycle Life of Example" should read -- Ratio of Cycle Life of Example to -- and "Example 5-3" should read -- Example 7-3 --.

Column 66,
Line 17, "4(5" should read -- 405 --.

Column 67,
Line 14, "Under" should read -- A battery was prepared under --;
Line 18, "As a" should read -- Next, --;
Line 19, "result," should be deleted;
Line 25, "Under" should read -- A battery was prepared under --;
Line 46, "Example" should read -- Examples --;
Line 49, "Example" should read -- Examples --; and
Line 56, "evaluated" should read -- evaluated by --.

Column 68,
Table 8, "Cycle Life of Example" should read -- Ratio of Cycle Life of Example to --; and
Line 61, "similar," should read -- similar --.

Column 69,
Line 67, "IRF" should read -- an RF --.

Column 72,
Line 22, "in," should read -- in --; and
Line 65, "Cellanese)" should read -- Celanese) --.

Column 73,
Line 23, "water-repellant" should read -- water-repellent --.

UNITED STATES PATENT AND TRADEMARK OFFICE
CERTIFICATE OF CORRECTION

PATENT NO. : 6,391,492 B1
DATED : May 21, 2002
INVENTOR(S) : Soichiro Kawakami et al.

It is certified that error appears in the above-identified patent and that said Letters Patent is hereby corrected as shown below:

Column 74,
Table 9, "Cycle of Life Example" should read -- Ratio of Cycle of Life Example to --;
Line 42, "an" should read -- of an --;
Line 46, "as" should read -- so as --;
Line 48, "(Goatex" should read -- Goa Tex --; and
Line 65, "to" should read -- with --.

Column 75,
Line 4, "glutamicacid" should read -- glutamic acid --;
Line 37, "to" should read -- with --;
Line 41, "with." should read -- with --;
Line 55, "ethyla-" should read -- ethyl alcohol --;
Line 56, "lcohol" should be deleted; and
Line 57, "Dowconing)." should read -- Dow Corning). --.

Column 76,
Line 4, "dodecylalcohol," should read -- dodecyl alcohol --;
Line 7, "11-bomoundecan" should read -- 11-bomoundecanoic --; and
Line 49, "and" should read -- and the product was --.

Column 77,
Line 19, "2." should read -- 10. --;
Line 21, "5" should be deleted; and
Table 10, "Cycle of Life Example" should read -- Ratio of Cycle of Life Example to --.

Column 78,
Line 25, "boronic" should read -- boric --;
Line 46, "boronic" should read -- boric- --;
Line 58, "boronic" should read -- boric --; and
Line 61, "previously" should be deleted.

Column 79,
Line 4, "injected" should read -- inserted --;
Line 8, "3x10-3" should read -- $3x10^{-3}$ --; and
Line 34, "as" should read -- so as --.

UNITED STATES PATENT AND TRADEMARK OFFICE
CERTIFICATE OF CORRECTION

PATENT NO. : 6,391,492 B1
DATED : May 21, 2002
INVENTOR(S) : Soichiro Kawakami et al.

It is certified that error appears in the above-identified patent and that said Letters Patent is hereby corrected as shown below:

Column 80,
Table 11, "Cycle of Life Example" should read -- Ratio of Cycle of Life Example to --,

```
"      Example 40                       -- Example 40
       Example 40                          Example 41
       Example 40     should read          Example 42
       Example 40                          Example 43
       Example 40                          Example 44
       Example 40"                         Example 45 --; and
```

"Comparative Example 40 1.7" should read -- Comparative Example 41  1.7 --.
Line 31, "conventional." should read -- conventional --;
Line 40, "wets" should read -- was --; and
Line 45, "ethylalcohol" should read -- ethyl alcohol --.

Column 81,
Line 12, "isopropylalcohol" should read -- isopropyl alcohol --;
Line 13, "remove" should read -- removed --; and
Line 23, ".distribution" should read -- distribution --.

Column 82,
Line 31, "Vandyl" should read -- Vanadyl --.

Column 83,
Line 46, "be matured" should read -- permit the reaction to be effectively completed -- and "After the maturation, it was" should read -- Then, the contents of the reaction vessel were --; and
Line 48, "water cooled by water by means of decantation" should read -- water cooled by decantation --.

Column 85,
Line 8, "0 f" should read -- of --.

Column 86,
Line 19, "Cobalt" should read -- cobalt --; and
Line 36, "was-prepared" should read -- was prepared --.

Column 88,
Line 10, "fluorotesin" should read -- fluororesin --.

UNITED STATES PATENT AND TRADEMARK OFFICE
CERTIFICATE OF CORRECTION

PATENT NO.    : 6,391,492 B1
DATED         : May 21, 2002
INVENTOR(S)   : Soichiro Kawakami et al.

It is certified that error appears in the above-identified patent and that said Letters Patent is hereby corrected as shown below:

Column 91,
Line 34, "particularly," should read -- particularity, --; and
Line 56, "having" should read -- has --.

Column 92,
Line 29, "and made of a compound of" should be deleted; and
Line 30, "said transition metal and said oxygen" should be deleted.

Signed and Sealed this

Twenty-sixth Day of November, 2002

Attest:

Attesting Officer

JAMES E. ROGAN
Director of the United States Patent and Trademark Office